(12) United States Patent
Yavid

(10) Patent No.: US 12,399,278 B1
(45) Date of Patent: Aug. 26, 2025

(54) HYBRID LIDAR WITH OPTICALLY ENHANCED SCANNED LASER

(71) Applicant: Red Creamery LLC, Massapequa Park, NY (US)

(72) Inventor: Dmitriy Yavid, Stony Brook, NY (US)

(73) Assignee: Red Creamery LLC, Massapequa Park, NY (US)

( * ) Notice: Subject to any disclaimer, the term of this patent is extended or adjusted under 35 U.S.C. 154(b) by 1099 days.

(21) Appl. No.: 17/356,676

(22) Filed: Jun. 24, 2021

Related U.S. Application Data

(63) Continuation-in-part of application No. 17/000,464, filed on Aug. 24, 2020, now Pat. No. 11,556,000.
(Continued)

(51) Int. Cl.
  *G01C 3/08* (2006.01)
  *G01S 7/481* (2006.01)
  (Continued)

(52) U.S. Cl.
  CPC ............ *G01S 17/89* (2013.01); *G01S 7/4817* (2013.01); *G01S 7/4863* (2013.01); *G01S 7/4865* (2013.01)

(58) Field of Classification Search
  CPC ...... G01S 17/89; G01S 7/4817; G01S 7/4863; G01S 7/4865
  See application file for complete search history.

(56) References Cited

U.S. PATENT DOCUMENTS

| 3,636,250 A | 1/1972 | Haeff |
| 4,240,746 A | 12/1980 | Courtenay |

(Continued)

FOREIGN PATENT DOCUMENTS

| CN | 1106534 A | 8/1995 |
| CN | 1576123 A | 2/2005 |

(Continued)

OTHER PUBLICATIONS

US 11,068,723 B1, 07/2021, Beijbom (withdrawn)

*Primary Examiner* — Mark Hellner
(74) *Attorney, Agent, or Firm* — Thomas A. O'rourke; James Bongiorno; O'Rourke IP Law, PLLC

(57) ABSTRACT

An autonomous vehicle LIDAR system includes: a laser; optical transmission system to shape/scan the light beam along light paths toward a target; an optical reception system collecting reflected laser light; and an electronic system synchronizing the beam scan, performing time-of-arrival measurements, and determining target range. The reception system includes an objective lens and a one-dimensional sensor array, each sensor formed of a grid of sub-pixels. A first transmission system includes: a cylindrical lens, scanning mirror, and collimating lens. The cylindrical lens expands the laser beam only in a first orthogonal direction to the optical path, producing an oval beam. A second transmission system includes: a focusing lens, scanning mirror, and second lens with lenslets being sequentially illuminated by the optical paths that individually focus the light that's collimated by a third lens creating spots on the target. Each sensor includes an FET that selectively couples sub-pixels to a readout channel.

13 Claims, 21 Drawing Sheets
(2 of 21 Drawing Sheet(s) Filed in Color)

Related U.S. Application Data which is a continuation-in-part of application No. 16/744,410, filed on Jan. 16, 2020, now Pat. No. 11,156,716, which is a continuation of application No. 15/432,105, filed on Feb. 14, 2017, now Pat. No. 10,571,574.

(60) Provisional application No. 63/154,990, filed on Mar. 1, 2021, provisional application No. 62/890,189, filed on Aug. 22, 2019, provisional application No. 62/295,210, filed on Feb. 15, 2016.

(51) Int. Cl.
*G01S 7/4863* (2020.01)
*G01S 7/4865* (2020.01)
*G01S 17/89* (2020.01)

(56) References Cited

U.S. PATENT DOCUMENTS

| | | |
|---|---|---|
| 4,397,549 A | 8/1983 | Morgan |
| 4,627,734 A | 12/1986 | Rioux |
| 4,820,914 A | 4/1989 | Allen |
| 4,862,257 A | 8/1989 | Ulich |
| 4,941,719 A | 7/1990 | Hisada |
| 4,964,721 A | 10/1990 | Ulich |
| 4,967,270 A | 10/1990 | Ulich |
| 5,006,721 A | 4/1991 | Cameron |
| 5,013,917 A | 5/1991 | Ulich |
| 5,091,778 A | 2/1992 | Keeler |
| 5,096,293 A | 3/1992 | Cecchi |
| 5,157,257 A | 10/1992 | Geiger |
| 5,159,225 A | 10/1992 | Um |
| 5,164,784 A | 11/1992 | Waggoner |
| 5,164,823 A | 11/1992 | Keeler |
| 5,166,507 A | 11/1992 | Davis |
| 5,192,978 A | 3/1993 | Keeler |
| 5,198,657 A | 3/1993 | Trost |
| 5,200,606 A | 4/1993 | Krasutsky |
| 5,206,698 A | 4/1993 | Werner |
| 5,220,164 A | 6/1993 | Lieber |
| 5,221,927 A | 6/1993 | Palmer |
| 5,221,956 A | 6/1993 | Patterson |
| 5,231,401 A | 7/1993 | Kaman |
| 5,231,480 A | 7/1993 | Ulich |
| 5,233,415 A | 8/1993 | French |
| 5,239,352 A | 8/1993 | Bissonnette |
| 5,241,314 A | 8/1993 | Keeler |
| 5,243,541 A | 9/1993 | Ulich |
| 5,250,810 A | 10/1993 | Geiger |
| 5,255,065 A | 10/1993 | Schwemmer |
| 5,257,085 A | 10/1993 | Ulich |
| 5,270,780 A | 12/1993 | Moran |
| 5,270,929 A | 12/1993 | Paulson |
| 5,272,351 A | 12/1993 | Andressen |
| 5,303,084 A | 4/1994 | Pflibsen |
| 5,311,272 A | 5/1994 | Daniels |
| 5,335,070 A | 8/1994 | Pflibsen |
| 5,343,284 A | 8/1994 | Keeler |
| 5,353,054 A | 10/1994 | Geiger |
| 5,384,589 A | 1/1995 | Ulich |
| 5,442,358 A | 8/1995 | Keeler |
| 5,450,125 A | 9/1995 | Ulich |
| 5,457,639 A | 10/1995 | Ulich |
| 5,467,122 A | 11/1995 | Bowker |
| 5,534,993 A | 7/1996 | Ball |
| 5,546,183 A | 8/1996 | Fegley |
| 5,570,224 A | 10/1996 | Endo |
| 5,574,553 A | 11/1996 | McManamon |
| 5,608,514 A | 3/1997 | Stann |
| 5,644,386 A | 7/1997 | Jenkins |
| 5,667,304 A | 9/1997 | Gelbwachs |
| 5,670,935 A | 9/1997 | Schofield |
| 5,682,225 A | 10/1997 | DuBois |
| 5,724,125 A | 3/1998 | Ames |
| 5,767,519 A | 6/1998 | Gelbwachs |
| 5,778,019 A | 7/1998 | Churnside |
| 5,796,471 A | 8/1998 | Wilkerson |
| 5,822,047 A | 10/1998 | Contarino |
| 5,825,464 A | 10/1998 | Feichtner |
| 5,831,719 A | 11/1998 | Berg |
| 5,831,724 A | 11/1998 | Cordes |
| 5,835,199 A | 11/1998 | Phillips |
| 5,847,815 A | 12/1998 | Albouy |
| 5,847,816 A | 12/1998 | Zediker |
| 5,847,817 A | 12/1998 | Zediker |
| 5,870,180 A | 2/1999 | Wangler |
| 5,877,851 A | 3/1999 | Stann |
| 5,898,483 A | 4/1999 | Flowers |
| 5,914,776 A | 6/1999 | Streicher |
| 5,989,087 A | 11/1999 | Cordes |
| 6,042,050 A | 3/2000 | Sims |
| 6,084,659 A | 7/2000 | Tulet |
| 6,147,747 A | 11/2000 | Kavaya |
| 6,246,468 B1 | 6/2001 | Dimsdale |
| 6,302,355 B1 | 10/2001 | Sallee |
| 6,323,941 B1 | 11/2001 | Evans |
| 6,371,405 B1 | 4/2002 | Sallee |
| 6,381,007 B2 | 4/2002 | Fabre |
| 6,388,739 B1 | 5/2002 | Rice |
| 6,396,397 B1 | 5/2002 | Bos |
| 6,396,577 B1 | 5/2002 | Ramstack |
| 6,404,494 B1 | 6/2002 | Masonis |
| 6,441,889 B1 | 8/2002 | Patterson |
| 6,448,572 B1 | 9/2002 | Tennant |
| 6,522,396 B1 | 2/2003 | Halmos |
| 6,556,282 B2 | 4/2003 | Jamieson |
| 6,559,932 B1 | 5/2003 | Halmos |
| 6,577,417 B1 | 6/2003 | Khoury |
| 6,593,582 B2 | 7/2003 | Lee |
| 6,608,669 B2 | 8/2003 | Holton |
| 6,608,677 B1 | 8/2003 | Ray |
| 6,618,125 B2 | 9/2003 | Stann |
| 6,619,406 B1 | 9/2003 | Kacyra |
| 6,634,600 B2 | 10/2003 | Krawczyk |
| 6,636,300 B2 | 10/2003 | Doemens |
| 6,646,725 B1 | 11/2003 | Eichinger |
| 6,664,529 B2 | 12/2003 | Pack |
| 6,711,475 B2 | 3/2004 | Murphy |
| 6,714,286 B1 | 3/2004 | Wheel |
| 6,717,655 B2 | 4/2004 | Cheng |
| 6,724,470 B2 | 4/2004 | Barenz |
| 6,781,683 B2 | 8/2004 | Kacyra |
| 6,836,285 B1 | 12/2004 | Lubard |
| 6,844,924 B2 | 1/2005 | Ruff |
| 6,873,716 B1 | 3/2005 | Bowker |
| 6,875,978 B2 | 4/2005 | Halmos |
| 6,882,409 B1 | 4/2005 | Evans |
| 6,963,354 B1 | 11/2005 | Scheps |
| 7,010,339 B2 | 3/2006 | Mullen |
| 7,046,358 B2 | 5/2006 | Barker |
| 7,064,810 B2 | 6/2006 | Anderson |
| 7,064,817 B1 | 6/2006 | Schmitt |
| 7,067,812 B2 | 6/2006 | Gelbwachs |
| 7,104,453 B1 | 9/2006 | Zhu |
| 7,130,028 B2 | 10/2006 | Pain |
| 7,135,672 B2 | 11/2006 | Land |
| 7,164,468 B2 | 1/2007 | Correia Da Silva Vilar |
| 7,164,787 B1 | 1/2007 | Nevis |
| 7,164,788 B1 | 1/2007 | Nevis |
| 7,187,452 B2 | 3/2007 | Jupp |
| 7,190,854 B1 | 3/2007 | Novotny |
| 7,195,163 B2 | 3/2007 | Yoo |
| 7,203,339 B1 | 4/2007 | Nevis |
| 7,206,062 B2 | 4/2007 | Asbrock |
| 7,215,826 B1 | 5/2007 | Nevis |
| 7,227,625 B2 | 6/2007 | Kobayashi |
| 7,242,460 B2 | 7/2007 | Hsu |
| 7,248,342 B1 | 7/2007 | Degnan |
| 7,248,343 B2 | 7/2007 | Cardero |
| 7,260,507 B2 | 8/2007 | Kalayeh |
| 7,274,448 B2 | 9/2007 | Babbin |
| 7,281,891 B2 | 10/2007 | Smith |
| 7,301,608 B1 | 11/2007 | Mendenhall |

(56) References Cited

U.S. PATENT DOCUMENTS

| | | | |
|---|---|---|---|
| 7,312,855 B1 | 12/2007 | Hintz |
| 7,313,506 B2 | 12/2007 | Kacyra |
| 7,333,184 B2 | 2/2008 | Kalayeh |
| 7,336,345 B2 | 2/2008 | Krasutsky |
| 7,339,670 B2 | 3/2008 | Carrig |
| 7,345,744 B2 | 3/2008 | Halmos |
| 7,359,039 B2 | 4/2008 | Kloza |
| 7,361,922 B2 | 4/2008 | Kameyama |
| 7,375,804 B2 | 5/2008 | Liebman |
| 7,375,877 B1 | 5/2008 | Di Teodoro |
| 7,397,568 B2 | 7/2008 | Bryce |
| 7,400,384 B1 | 7/2008 | Evans |
| 7,411,196 B2 | 8/2008 | Kalayeh |
| 7,411,662 B1 | 8/2008 | Ruff |
| 7,417,717 B2 | 8/2008 | Pack |
| 7,428,041 B2 | 9/2008 | Kallio |
| 7,436,494 B1 | 10/2008 | Kennedy |
| 7,440,084 B2 | 10/2008 | Kane |
| 7,463,340 B2 | 12/2008 | Krishnaswamy |
| 7,463,341 B2 | 12/2008 | Halldorsson |
| 7,474,332 B2 | 1/2009 | Byren |
| 7,474,964 B1 | 1/2009 | Welty |
| 7,485,862 B2 | 2/2009 | Danziger |
| 7,495,764 B1 | 2/2009 | McMillan |
| 7,505,488 B2 | 3/2009 | Halmos |
| 7,532,311 B2 | 5/2009 | Henderson |
| 7,561,261 B2 | 7/2009 | Hilde |
| 7,570,347 B2 | 8/2009 | Ruff |
| 7,571,081 B2 | 8/2009 | Faulkner |
| 7,580,127 B1 | 8/2009 | Mayor |
| 7,583,364 B1 | 9/2009 | Mayor |
| 7,630,062 B2 | 12/2009 | Mori |
| 7,649,616 B2 | 1/2010 | Michael |
| 7,652,752 B2 | 1/2010 | Fetzer |
| 7,656,526 B1 | 2/2010 | Spuler |
| 7,675,610 B2 | 3/2010 | Redman |
| 7,675,619 B2 | 3/2010 | Danehy |
| 7,683,928 B2 | 3/2010 | Lubard |
| 7,688,348 B2 | 3/2010 | Lubard |
| 7,688,374 B2 | 3/2010 | Land |
| 7,692,775 B2 | 4/2010 | Treado |
| 7,697,125 B2 | 4/2010 | Swenson |
| 7,697,794 B2 | 4/2010 | Dragic |
| 7,701,558 B2 | 4/2010 | Walsh |
| 7,720,580 B2 | 5/2010 | Higgins-Luthman |
| 7,720,605 B2 | 5/2010 | Welty |
| 7,739,823 B2 | 6/2010 | Shapira |
| 7,741,618 B2 | 6/2010 | Lee |
| 7,742,151 B2 | 6/2010 | Krasutsky |
| 7,746,450 B2 | 6/2010 | Willner |
| 7,755,745 B2 | 7/2010 | Urata |
| 7,760,334 B1 | 7/2010 | Evans |
| 7,800,736 B2 | 9/2010 | Pack |
| 7,821,619 B2 | 10/2010 | Krikorian |
| 7,827,861 B2 | 11/2010 | La White |
| 7,830,442 B2 | 11/2010 | Griffis |
| 7,847,235 B2 | 12/2010 | Krumpkin |
| 7,894,044 B1 | 2/2011 | Sullivan |
| 7,933,002 B2 | 4/2011 | Halldorsson |
| 7,936,448 B2 | 5/2011 | Albuquerque |
| 7,944,547 B2 | 5/2011 | Wang |
| 7,948,610 B2 | 5/2011 | Hintz |
| 7,961,301 B2 | 6/2011 | Earhart |
| 7,969,558 B2 | 6/2011 | Hall |
| 7,974,813 B2 | 7/2011 | Welty |
| 7,983,738 B2 | 7/2011 | Goldman |
| 7,986,397 B1 | 7/2011 | Tiemann |
| 8,010,300 B1 | 8/2011 | Stearns |
| 8,024,135 B2 | 9/2011 | Lee |
| 8,054,454 B2 | 11/2011 | Treado |
| 8,054,464 B2 | 11/2011 | Mathur |
| 8,072,581 B1 | 12/2011 | Breiholz |
| 8,072,582 B2 | 12/2011 | Meneely |
| 8,072,663 B2 | 12/2011 | O'Neill |
| 8,077,294 B1 | 12/2011 | Grund |
| 8,081,301 B2 | 12/2011 | Stann |
| 8,090,153 B2 | 1/2012 | Schofield |
| 8,098,889 B2 | 1/2012 | Zhu |
| 8,115,622 B2 | 2/2012 | Stolarczyk |
| 8,115,925 B1 | 2/2012 | Mathur |
| 8,120,754 B2 | 2/2012 | Kaehler |
| 8,121,798 B2 | 2/2012 | Lippert |
| 8,125,367 B2 | 2/2012 | Ludwig |
| 8,125,622 B2 | 2/2012 | Gammenthaler |
| 8,135,513 B2 | 3/2012 | Bauer |
| 8,139,863 B1 | 3/2012 | Hsu |
| 8,164,742 B1 | 4/2012 | Carrieri |
| 8,179,521 B2 | 5/2012 | Valla |
| 8,198,576 B2 | 6/2012 | Kennedy |
| 8,224,097 B2 | 7/2012 | Matei |
| 8,229,663 B2 | 7/2012 | Zeng |
| 8,229,679 B1 | 7/2012 | Matthews |
| 8,242,428 B2 | 8/2012 | Meyers |
| 8,244,026 B2 | 8/2012 | Nahari |
| 8,269,950 B2 | 9/2012 | Spinelli |
| RE43,722 E | 10/2012 | Kennedy |
| 8,279,420 B2 | 10/2012 | Ludwig |
| 8,284,382 B2 | 10/2012 | Krasutsky |
| 8,294,881 B2 | 10/2012 | Hellickson |
| 8,306,273 B1 | 11/2012 | Gravseth |
| 8,306,941 B2 | 11/2012 | Ma |
| 8,325,328 B2 | 12/2012 | Renard |
| 8,332,134 B2 | 12/2012 | Zhang |
| 8,344,942 B2 | 1/2013 | Jin |
| 8,362,889 B2 | 1/2013 | Komori |
| 8,386,876 B2 | 2/2013 | Khoshnevis |
| 8,427,649 B2 | 4/2013 | Hays |
| 8,441,622 B2 | 5/2013 | Gammenthaler |
| 8,446,571 B2 | 5/2013 | Fiess |
| 8,465,478 B2 | 6/2013 | Frey |
| 8,478,386 B2 | 7/2013 | Goldman |
| 8,493,445 B2 | 7/2013 | Degnan |
| 8,494,687 B2 | 7/2013 | Vanek |
| 8,508,721 B2 | 8/2013 | Cates |
| 8,537,337 B2 | 9/2013 | Welty |
| 8,537,338 B1 | 9/2013 | Medasani |
| 8,538,695 B2 | 9/2013 | Welty |
| 8,541,744 B1 | 9/2013 | Liu |
| 8,558,993 B2 | 10/2013 | Newbury |
| 8,577,611 B2 | 11/2013 | Ma |
| 8,587,637 B1 | 11/2013 | Cryder |
| 8,599,365 B2 | 12/2013 | Ma |
| 8,599,367 B2 | 12/2013 | Canham |
| 8,600,589 B2 | 12/2013 | Mendez-Rodriguez |
| 8,605,262 B2 | 12/2013 | Campbell |
| 8,610,881 B2 | 12/2013 | Gammenthaler |
| 8,629,975 B1 | 1/2014 | Dierking |
| 8,629,977 B1 | 1/2014 | Phillips |
| 8,648,702 B2 | 2/2014 | Pala |
| 8,655,513 B2 | 2/2014 | Vanek |
| 8,659,747 B2 | 2/2014 | Goodman |
| 8,659,748 B2 | 2/2014 | Fakin |
| 8,670,591 B2 | 3/2014 | Mendez-Rodriguez |
| 8,675,181 B2 | 3/2014 | Hall |
| 8,675,184 B2 | 3/2014 | Schmitt |
| 8,692,980 B2 | 4/2014 | Gilliland |
| 8,692,983 B1 | 4/2014 | Chapman |
| 8,712,147 B2 | 4/2014 | Rahmes |
| 8,717,545 B2 | 5/2014 | Sebastian |
| 8,724,099 B2 | 5/2014 | Asahara |
| 8,736,818 B2 | 5/2014 | Weimer |
| 8,767,187 B2 | 7/2014 | Coda |
| 8,767,190 B2 | 7/2014 | Hall |
| 8,775,081 B2 | 7/2014 | Welty |
| 8,781,790 B2 | 7/2014 | Zhu |
| 8,786,835 B1 | 7/2014 | Reardon |
| 8,797,512 B2 | 8/2014 | Stettner |
| 8,798,372 B1 | 8/2014 | Korchev |
| 8,798,841 B1 | 8/2014 | Nickolaou |
| 8,804,101 B2 | 8/2014 | Spagnolia |
| 8,818,124 B1 | 8/2014 | Kia |
| 8,818,722 B2 | 8/2014 | Elgersma |
| 8,829,417 B2 | 9/2014 | Krill |
| 8,836,922 B1 | 9/2014 | Pennecot |

(56) References Cited

U.S. PATENT DOCUMENTS

| | | |
|---|---|---|
| 8,855,848 B2 | 10/2014 | Zeng |
| 8,855,849 B1 | 10/2014 | Ferguson |
| 8,885,883 B2 | 11/2014 | Goodman |
| 8,891,069 B2 | 11/2014 | Pedersen |
| 8,896,818 B2 | 11/2014 | Walsh |
| 8,915,709 B2 | 12/2014 | Westergaard |
| 8,938,362 B2 | 1/2015 | Ionov |
| 8,939,081 B1 | 1/2015 | Smith |
| 8,947,644 B2 | 2/2015 | Halmos |
| 8,947,647 B2 | 2/2015 | Halmos |
| 8,958,057 B2 | 2/2015 | Kane |
| 8,976,339 B2 | 3/2015 | Phillips |
| 8,976,340 B2 | 3/2015 | Gilliland |
| 8,976,342 B2 | 3/2015 | Lacondemine |
| 9,002,511 B1 | 4/2015 | Hickerson |
| 9,007,569 B2 | 4/2015 | AmZajerdian |
| 9,007,570 B1 | 4/2015 | Beyon |
| 9,041,915 B2 | 5/2015 | Earhart |
| 9,046,600 B2 | 6/2015 | James |
| 9,056,395 B1 | 6/2015 | Ferguson |
| 9,057,605 B2 | 6/2015 | Halmos |
| 9,069,059 B2 | 6/2015 | Vogt |
| 9,069,061 B1 | 6/2015 | Harwit |
| 9,069,080 B2 | 6/2015 | Stettner |
| 9,081,090 B2 | 7/2015 | Sebastian |
| 9,086,275 B2 | 7/2015 | Weinberg |
| 9,086,486 B2 | 7/2015 | Gilliland |
| 9,098,753 B1 | 8/2015 | Zhu |
| 9,103,907 B2 | 8/2015 | Sebastian |
| 9,110,154 B1 | 8/2015 | Bates |
| 9,110,163 B2 | 8/2015 | Rogan |
| 9,110,169 B2 | 8/2015 | Stettner |
| 9,111,444 B2 | 8/2015 | Kaganovich |
| 9,128,185 B2 | 9/2015 | Zeng |
| 9,128,190 B1 | 9/2015 | Ulrich |
| 9,129,211 B2 | 9/2015 | Zeng |
| 9,134,402 B2 | 9/2015 | Sebastian |
| 9,146,102 B2 | 9/2015 | Pernstich |
| 9,146,316 B2 | 9/2015 | Gammenthaler |
| 9,165,383 B1 | 10/2015 | Mendez-Rodriguez |
| 9,170,096 B2 | 10/2015 | Fowler |
| 9,188,674 B2 | 11/2015 | Suzuki |
| 9,188,677 B2 | 11/2015 | Bossert |
| 9,201,146 B2 | 12/2015 | Beyon |
| 9,215,382 B1 | 12/2015 | Hilde |
| 9,223,025 B2 | 12/2015 | Debrunner |
| 9,229,108 B2 | 1/2016 | Debrunner |
| 9,229,109 B2 | 1/2016 | Stettner |
| 9,244,272 B2 | 1/2016 | Schiltz |
| 9,255,989 B2 | 2/2016 | Joshi |
| 9,277,204 B2 | 3/2016 | Gilliland |
| 9,285,464 B2 | 3/2016 | Pennecot |
| 9,300,321 B2 | 3/2016 | Zalik |
| 9,310,471 B2 | 4/2016 | Sayyah |
| 9,310,487 B2 | 4/2016 | Sakimura |
| 9,315,192 B1 | 4/2016 | Zhu |
| 9,335,414 B2 | 5/2016 | Leyva |
| 9,354,317 B2 | 5/2016 | Halmos |
| 9,354,825 B2 | 5/2016 | Kozak |
| 9,360,554 B2 | 6/2016 | Retterath |
| 9,360,555 B2 | 6/2016 | Oh |
| 9,361,412 B1 | 6/2016 | Hilde |
| 9,366,938 B1 | 6/2016 | Anderson |
| 9,369,689 B1 | 6/2016 | Tran |
| 9,378,463 B2 | 6/2016 | Zeng |
| 9,383,447 B2 | 7/2016 | Schmitt |
| 9,383,753 B1 | 7/2016 | Tempelton |
| 9,407,285 B2 | 8/2016 | Kozak |
| 9,420,177 B2 | 8/2016 | Pettegrew |
| 9,420,264 B2 | 8/2016 | Gilliland |
| 9,425,654 B2 | 8/2016 | Lenius |
| 9,448,110 B2 | 9/2016 | Wong |
| 9,453,907 B2 | 9/2016 | Zheleznyak |
| 9,453,914 B2 | 9/2016 | Stettner |
| 9,453,941 B2 | 9/2016 | Stainvas Olshansky |
| 9,465,112 B2 | 10/2016 | Stettner |
| 9,470,520 B2 | 10/2016 | Schwarz |
| 9,476,968 B2 | 10/2016 | Anderson |
| 9,476,983 B2 | 10/2016 | Zeng |
| 9,489,746 B2 | 11/2016 | Sebastian |
| 9,495,466 B2 | 11/2016 | Geringer |
| 9,519,979 B1 | 12/2016 | Hilde |
| 9,523,772 B2 | 12/2016 | Rogan |
| 9,525,863 B2 | 12/2016 | Nawasra |
| 9,529,087 B2 | 12/2016 | Stainvas Olshansky |
| 9,530,062 B2 | 12/2016 | Nguyen |
| 9,547,074 B2 | 1/2017 | Schulz |
| 9,575,162 B2 | 2/2017 | Owechko |
| 9,575,164 B2 | 2/2017 | Kim |
| 9,575,184 B2 | 2/2017 | Gilliland |
| 9,575,341 B2 | 2/2017 | Heck |
| 9,588,220 B2 | 3/2017 | Rondeau |
| 9,599,468 B2 | 3/2017 | Walsh |
| 9,599,714 B2 | 3/2017 | Imaki |
| 9,602,224 B1 | 3/2017 | McLaughlin |
| 9,606,236 B2 | 3/2017 | Rojas |
| 9,625,580 B2 | 4/2017 | Kotelnikov |
| 9,625,582 B2 | 4/2017 | Gruver |
| 9,651,658 B2 | 5/2017 | Pennecot |
| 9,658,322 B2 | 5/2017 | Lewis |
| 9,658,337 B2 | 5/2017 | Ray |
| 9,678,199 B2 | 6/2017 | Hutson |
| 9,702,975 B2 | 7/2017 | Brinkmeyer |
| 9,710,714 B2 | 7/2017 | Chen |
| 9,735,885 B1 | 8/2017 | Sayyah |
| 9,753,124 B2 | 9/2017 | Hayes |
| 9,753,462 B2 | 9/2017 | Gilliland |
| 9,759,809 B2 | 9/2017 | Derenick |
| 9,772,399 B2 | 9/2017 | Schwarz |
| 9,778,362 B2 | 10/2017 | Rondeau |
| 9,784,840 B2 | 10/2017 | Pedersen |
| 9,790,924 B2 | 10/2017 | Bayon |
| 9,791,555 B2 | 10/2017 | Zhu |
| 9,791,557 B1 | 10/2017 | Wyrwas |
| 9,797,995 B2 | 10/2017 | Gilliland |
| 9,804,264 B2 | 10/2017 | Villeneuve |
| 9,810,775 B1 | 11/2017 | Welford |
| 9,810,776 B2 | 11/2017 | Sapir |
| 9,810,777 B2 | 11/2017 | Williams |
| 9,810,786 B1 | 11/2017 | Welford |
| 9,812,838 B2 | 11/2017 | Villeneuve |
| 9,823,118 B2 | 11/2017 | Doylend |
| 9,823,350 B2 | 11/2017 | Fluckiger |
| 9,823,351 B2 | 11/2017 | Haslim |
| 9,823,353 B2 | 11/2017 | Eichenholz |
| 9,830,509 B2 | 11/2017 | Zang |
| 9,831,630 B2 | 11/2017 | Lipson |
| 9,834,209 B2 | 12/2017 | Stettner |
| 9,841,495 B2 | 12/2017 | Campbell |
| 9,851,433 B2 | 12/2017 | Sebastian |
| 9,851,442 B1 | 12/2017 | Lo |
| RE46,672 E | 1/2018 | Hall |
| 9,857,473 B2 | 1/2018 | Kim |
| 9,860,770 B1 | 1/2018 | McLaughlin |
| 9,869,753 B2 | 1/2018 | Eldada |
| 9,869,754 B1 | 1/2018 | Campbell |
| 9,870,512 B2 | 1/2018 | Rogan |
| 9,872,010 B2 | 1/2018 | Tran |
| 9,874,635 B1 | 1/2018 | Eichenholz |
| 9,877,009 B2 | 1/2018 | Tran |
| 9,880,263 B2 | 1/2018 | Droz |
| 9,880,281 B2 | 1/2018 | Gilliland |
| 9,881,220 B2 | 1/2018 | Korvadi |
| 9,882,433 B2 | 1/2018 | Lenius |
| 9,885,778 B2 | 2/2018 | Dussan |
| 9,891,711 B1 | 2/2018 | Lee |
| 9,892,567 B2 | 2/2018 | Binion |
| 9,897,687 B1 | 2/2018 | Campbell |
| 9,897,689 B2 | 2/2018 | Dussan |
| 9,904,375 B1 | 2/2018 | Donnelly |
| 9,905,032 B2 | 2/2018 | Rogan |
| 9,905,987 B2 | 2/2018 | Seo |
| 9,905,992 B1 | 2/2018 | Welford |
| 9,910,136 B2 | 3/2018 | Heo |

(56) References Cited

U.S. PATENT DOCUMENTS

| | | |
|---|---|---|
| 9,910,139 B2 | 3/2018 | Pennecot |
| 9,910,155 B2 | 3/2018 | Lundquist |
| 9,915,726 B2 | 3/2018 | Bailey |
| 9,921,297 B2 | 3/2018 | Jungwirth |
| 9,921,307 B2 | 3/2018 | Schmalengurg |
| 9,927,524 B2 | 3/2018 | Kaiser |
| 9,933,513 B2 | 4/2018 | Dussan |
| 9,933,514 B1 | 4/2018 | Gylys |
| 9,945,950 B2 | 4/2018 | Newman |
| 9,958,545 B2 | 5/2018 | Eichenholz |
| 9,971,024 B2 | 5/2018 | Schwarz |
| 9,971,035 B2 | 5/2018 | Imaki |
| 9,983,297 B2 | 5/2018 | Hall |
| 9,983,590 B2 | 5/2018 | Templeton |
| 9,985,071 B2 | 5/2018 | Irish |
| 9,989,969 B2 | 6/2018 | Eustice |
| 10,000,000 B2 | 6/2018 | Marron |
| 10,012,474 B2 | 7/2018 | Teetzel |
| 10,012,723 B2 | 7/2018 | Lindskog |
| 10,012,732 B2 | 7/2018 | Eichenholz |
| 10,018,711 B1 | 7/2018 | Sebastian |
| 10,018,725 B2 | 7/2018 | Liu |
| 10,018,726 B2 | 7/2018 | Hall |
| 10,019,803 B2 | 7/2018 | Venable |
| 10,024,964 B2 | 7/2018 | Pierce |
| 10,031,214 B2 | 7/2018 | Rosenweig |
| 10,031,231 B2 | 7/2018 | Zermas |
| 10,031,232 B2 | 7/2018 | Zohar |
| 10,032,369 B2 | 7/2018 | Korvadi |
| 10,036,801 B2 | 7/2018 | Reterrath |
| 10,036,803 B2 | 7/2018 | Pacala |
| D826,746 S | 8/2018 | Qiu |
| 10,042,042 B2 | 8/2018 | Miremadi |
| 10,042,043 B2 | 8/2018 | Dussan |
| 10,042,159 B2 | 8/2018 | Dussan |
| 10,046,187 B2 | 8/2018 | Doten |
| 10,048,359 B2 | 8/2018 | Zhelenyzak |
| 10,048,374 B2 | 8/2018 | Hall |
| 10,054,841 B2 | 8/2018 | Nomura |
| 10,061,019 B1 | 8/2018 | Campbell |
| 10,061,020 B2 | 8/2018 | Slobodyanyuk |
| 10,061,266 B2 | 8/2018 | Christmas |
| 10,067,230 B2 | 9/2018 | Smits |
| 10,073,166 B2 | 9/2018 | Dussan |
| 10,078,133 B2 | 9/2018 | Dussan |
| 10,078,137 B2 | 9/2018 | Ludwig |
| 10,088,557 B2 | 10/2018 | Yeun |
| 10,088,558 B2 | 10/2018 | Dussan |
| 10,094,657 B2 | 10/2018 | Kiss |
| 10,094,916 B1 | 10/2018 | Droz |
| 10,094,925 B1 | 10/2018 | LaChapelle |
| 10,094,928 B2 | 10/2018 | Josset |
| 10,107,914 B2 | 10/2018 | Kalscheur |
| 10,107,915 B2 | 10/2018 | Rozenzweig |
| 10,109,208 B2 | 10/2018 | Cherepinsky |
| 10,114,109 B2 | 10/2018 | Gazit |
| 10,114,112 B2 | 10/2018 | Slobodyanyuk |
| 10,115,024 B2 | 10/2018 | Stein |
| 10,120,076 B2 | 11/2018 | Scheim |
| 10,121,813 B2 | 11/2018 | Eichenholz |
| 10,126,411 B2 | 11/2018 | Gilliland |
| 10,126,412 B2 | 11/2018 | Eldada |
| 10,131,446 B1 | 11/2018 | Stambler |
| 10,132,928 B2 | 11/2018 | Eldada |
| 10,139,478 B2 | 11/2018 | Gaalema |
| 10,142,538 B2 | 11/2018 | Hurd |
| 10,145,941 B2 | 12/2018 | Lee |
| 10,145,944 B1 | 12/2018 | Shchemelinin |
| 10,145,945 B2 | 12/2018 | Harada |
| 10,148,060 B2 | 12/2018 | Hong |
| 10,151,836 B2 | 12/2018 | O'Keeffe |
| 10,168,423 B2 | 1/2019 | Lombrozo |
| 10,168,429 B2 | 1/2019 | Maleki |
| 10,175,344 B2 | 1/2019 | Jungwirth |
| 10,175,361 B2 | 1/2019 | Haines |
| 10,180,493 B2 | 1/2019 | Eldada |
| 10,185,027 B2 | 1/2019 | O'Keeffe |
| 10,185,028 B2 | 1/2019 | Dussan |
| 10,185,033 B2 | 1/2019 | Justice |
| 10,191,156 B2 | 1/2019 | Steinberg |
| 10,197,669 B2 | 2/2019 | Hall |
| 10,197,676 B2 | 2/2019 | Slobodyyanyuk |
| 10,197,765 B2 | 2/2019 | Schulz |
| 10,203,399 B2 | 2/2019 | Retterath |
| 10,203,401 B2 | 2/2019 | Sebastian |
| 10,209,349 B2 | 2/2019 | Dussan |
| 10,209,359 B2 | 2/2019 | Russell |
| 10,209,709 B2 | 2/2019 | Peters |
| 10,214,299 B2 | 2/2019 | Jackowski |
| 10,215,846 B2 | 2/2019 | Carothers |
| 10,215,847 B2 | 2/2019 | Scheim |
| 10,215,848 B2 | 2/2019 | Dussan |
| 10,215,859 B2 | 2/2019 | Steinberg |
| 10,222,474 B1 | 3/2019 | Raring |
| 10,222,477 B2 | 3/2019 | Keilaf |
| 10,223,806 B1 | 3/2019 | Luo |
| 10,223,807 B1 | 3/2019 | Luo |
| 10,241,196 B2 | 3/2019 | Bailey |
| 10,241,198 B2 | 3/2019 | LaChappelle |
| 10,247,811 B2 | 4/2019 | Clifton |
| 10,254,402 B2 | 4/2019 | Lane |
| 10,254,405 B2 | 4/2019 | Campbell |
| 10,261,006 B2 | 4/2019 | Ray |
| 10,261,187 B2 | 4/2019 | Halmos |
| 10,262,234 B2 | 4/2019 | Li |
| 10,267,898 B2 | 4/2019 | Campbell |
| 10,267,918 B2 | 4/2019 | LaChapelle |
| 10,274,377 B1 | 4/2019 | Rabb |
| 10,274,599 B2 | 4/2019 | Schmalenberg |
| D849,573 S | 5/2019 | Haban |
| 10,281,254 B2 | 5/2019 | Ginsberg |
| 10,281,322 B2 | 5/2019 | Doyland |
| 10,281,564 B2 | 5/2019 | Low |
| 10,281,581 B2 | 5/2019 | Lipson |
| 10,281,582 B2 | 5/2019 | Elooz |
| 10,288,736 B2 | 5/2019 | Lipson |
| 10,288,737 B2 | 5/2019 | Mooney |
| 10,295,656 B1 | 5/2019 | Li |
| 10,295,660 B1 | 5/2019 | McMichael |
| 10,295,668 B2 | 5/2019 | LaChapelle |
| 10,295,670 B2 | 5/2019 | Stettner |
| 10,295,671 B2 | 5/2019 | Grazit |
| 10,295,672 B2 | 5/2019 | Abari |
| 10,295,673 B1 | 5/2019 | Tucker |
| 10,302,746 B2 | 5/2019 | O'Keeffee |
| 10,302,749 B2 | 5/2019 | Droz |
| D850,306 S | 6/2019 | Bainter |
| 10,310,058 B1 | 6/2019 | Campbell |
| 10,310,087 B2 | 6/2019 | Laddha |
| 10,317,529 B2 | 6/2019 | Shy |
| 10,317,533 B2 | 6/2019 | Cherepinsky |
| 10,324,170 B1 | 6/2019 | Enberg |
| 10,324,185 B2 | 6/2019 | McWhirter |
| 10,330,777 B2 | 6/2019 | Popovich |
| 10,330,778 B2 | 6/2019 | Kaneda |
| 10,330,780 B2 | 6/2019 | Hall |
| 10,331,956 B2 | 6/2019 | Solar |
| 10,337,996 B2 | 7/2019 | Blagojevic |
| 10,338,201 B2 | 7/2019 | Slobodyyanyuk |
| 10,338,202 B2 | 7/2019 | Mashtare |
| 10,338,220 B1 | 7/2019 | Raring |
| 10,338,224 B2 | 7/2019 | Eken |
| 10,338,225 B2 | 7/2019 | Boehmke |
| 10,340,651 B1 | 7/2019 | Drummer |
| 10,345,446 B2 | 7/2019 | Raring |
| 10,345,447 B1 | 7/2019 | Hicks |
| 10,346,695 B2 | 7/2019 | Clifford |
| 10,351,103 B2 | 7/2019 | Yeo |
| 10,353,057 B2 | 7/2019 | Suzuki |
| 10,353,074 B2 | 7/2019 | Justice |
| 10,353,075 B2 | 7/2019 | Buskila |
| 10,359,507 B2 | 7/2019 | Berger |
| 10,366,282 B2 | 7/2019 | Lee |
| 10,372,138 B2 | 8/2019 | Gilliland |

(56) References Cited

U.S. PATENT DOCUMENTS

| | | |
|---|---|---|
| 10,377,373 B2 | 8/2019 | Stettner |
| 10,379,135 B2 | 8/2019 | Maryfield |
| 10,379,205 B2 | 8/2019 | Dussan |
| 10,379,220 B1 | 8/2019 | Smits |
| 10,379,540 B2 | 8/2019 | Droz |
| 10,386,464 B2 | 8/2019 | Dussan |
| 10,386,465 B2 | 8/2019 | Hall |
| 10,386,467 B2 | 8/2019 | Dussan |
| 10,386,487 B1 | 8/2019 | Wilton |
| 10,386,488 B2 | 8/2019 | Ridderbusch |
| 10,393,863 B2 | 8/2019 | Sun |
| 10,393,877 B2 | 8/2019 | Hall |
| 10,394,345 B2 | 8/2019 | Donnelly |
| 10,401,480 B1 | 9/2019 | Gaalema |
| 10,401,484 B2 | 9/2019 | Lee |
| 10,401,500 B2 | 9/2019 | Yang |
| 10,401,866 B2 | 9/2019 | Rust |
| 10,408,926 B2 | 9/2019 | Slobodyyabnyuk |
| 10,408,936 B2 | 9/2019 | Van Voorst |
| 10,408,939 B1 | 9/2019 | Kim |
| 10,408,940 B2 | 9/2019 | O'Keeffe |
| 10,416,292 B2 | 9/2019 | de Mersseman |
| 10,418,776 B2 | 9/2019 | Welford |
| 10,422,862 B2 | 9/2019 | Gnecchi |
| 10,422,863 B2 | 9/2019 | Choi |
| 10,422,865 B2 | 9/2019 | Irish |
| 10,429,243 B2 | 10/2019 | Yu |
| 10,429,495 B1 | 10/2019 | Wang |
| 10,429,496 B2 | 10/2019 | Weinberg |
| 10,429,507 B2 | 10/2019 | Sebastian |
| 10,429,511 B2 | 10/2019 | Bosetti |
| 10,430,970 B2 | 10/2019 | Bier |
| 10,436,882 B2 | 10/2019 | Meng |
| 10,436,904 B2 | 10/2019 | Moss |
| 10,436,907 B1 | 10/2019 | Murray |
| 10,444,330 B2 | 10/2019 | Stann |
| 10,444,356 B2 | 10/2019 | Wu |
| 10,444,362 B2 | 10/2019 | Schaefer |
| 10,444,367 B2 | 10/2019 | Lodden |
| 10,445,928 B2 | 10/2019 | Nehmadi |
| 10,447,973 B2 | 10/2019 | Droz |
| 10,451,716 B2 | 10/2019 | Hughes |
| 10,451,740 B2 | 10/2019 | Pei |
| 10,451,742 B2 | 10/2019 | Christmas |
| 10,458,904 B2 | 10/2019 | Batholomew |
| 10,466,342 B1 | 11/2019 | Zhu |
| 10,469,753 B2 | 11/2019 | Yang |
| 10,473,763 B2 | 11/2019 | Schwarz |
| 10,473,767 B2 | 11/2019 | Xiang |
| 10,473,768 B2 | 11/2019 | Walsh |
| 10,473,770 B1 | 11/2019 | Zhu |
| 10,473,784 B2 | 11/2019 | Puglia |
| 10,474,160 B2 | 11/2019 | Huang |
| 10,474,161 B2 | 11/2019 | Huang |
| 10,481,267 B2 | 11/2019 | Wang |
| 10,481,268 B2 | 11/2019 | Vlaiko |
| 10,482,740 B2 | 11/2019 | Fang |
| 10,488,495 B2 | 11/2019 | Sebastian |
| 10,488,496 B2 | 11/2019 | Campbell |
| 10,488,497 B2 | 11/2019 | Cheong |
| 10,491,052 B2 | 11/2019 | Lenius |
| 10,491,855 B2 | 11/2019 | Gates |
| 10,495,757 B2 | 12/2019 | Dussan |
| 10,502,813 B2 | 12/2019 | Schultz |
| 10,503,174 B1 | 12/2019 | Lim |
| 10,503,175 B2 | 12/2019 | Agarwal |
| 10,509,111 B2 | 12/2019 | Park |
| 10,509,112 B1 | 12/2019 | Pan |
| 10,509,120 B2 | 12/2019 | Bilik |
| 10,509,198 B1 | 12/2019 | Zhou |
| 10,514,444 B2 | 12/2019 | Donovan |
| 10,514,447 B2 | 12/2019 | Schwarz |
| 10,520,591 B2 | 12/2019 | Kotelnikov |
| 10,520,592 B2 | 12/2019 | Droz |
| 10,520,602 B2 | 12/2019 | Villeneuve |
| 10,523,880 B2 | 12/2019 | Gassend |
| 10,527,726 B2 | 1/2020 | Bartlett |
| 10,531,004 B2 | 1/2020 | Wheeler |
| 10,534,074 B2 | 1/2020 | Slobodyyanyuk |
| 10,534,079 B2 | 1/2020 | Kim |
| 10,539,116 B2 | 1/2020 | Davoust |
| 10,539,661 B2 | 1/2020 | Hall |
| 10,539,663 B2 | 1/2020 | Liu |
| 10,545,222 B2 | 1/2020 | Hall |
| 10,545,238 B1 | 1/2020 | Rezk |
| 10,545,240 B2 | 1/2020 | Campbell |
| 10,545,289 B1 | 1/2020 | Chriqui |
| 10,551,501 B1 | 2/2020 | LaChapelle |
| 10,552,691 B2 | 2/2020 | Li |
| 10,556,585 B1 | 2/2020 | Berger |
| 10,557,923 B2 | 2/2020 | Watnik |
| 10,557,924 B1 | 2/2020 | Jang |
| 10,557,926 B2 | 2/2020 | Gilliland |
| 10,557,927 B2 | 2/2020 | Marron |
| 10,557,929 B2 | 2/2020 | Kajiyama |
| 10,557,939 B2 | 2/2020 | Campbell |
| 10,557,940 B2 | 2/2020 | Eichenholz |
| 10,557,942 B2 | 2/2020 | Belsey |
| 10,564,261 B2 | 2/2020 | Huebner |
| 10,564,263 B2 | 2/2020 | Efimov |
| 10,564,266 B2 | 2/2020 | O'Keeffe |
| 10,564,285 B2 | 2/2020 | Belsley |
| 10,565,457 B2 | 2/2020 | Luo |
| 10,571,552 B1 | 2/2020 | Gao |
| 10,571,567 B2 | 2/2020 | Campbell |
| 10,571,570 B1 | 2/2020 | Paulsen |
| 10,571,574 B1 | 2/2020 | Yavid |
| 10,571,683 B2 | 2/2020 | Low |
| 10,576,011 B1 | 3/2020 | Krishnan |
| 10,578,717 B2 | 3/2020 | Bucina |
| 10,578,719 B2 | 3/2020 | O'Keeffe |
| 10,578,720 B2 | 3/2020 | Hughes |
| 10,578,721 B2 | 3/2020 | Jang |
| 10,578,724 B2 | 3/2020 | Droz |
| 10,578,742 B2 | 3/2020 | Guo |
| 10,585,174 B2 | 3/2020 | Gnecchi |
| 10,585,175 B2 | 3/2020 | Reterath |
| 10,591,598 B2 | 3/2020 | Jeong |
| 10,591,599 B2 | 3/2020 | O'Keeffe |
| 10,591,600 B2 | 3/2020 | Villeneuve |
| 10,591,601 B2 | 3/2020 | Hicks |
| 10,591,604 B2 | 3/2020 | Xu |
| 10,591,740 B2 | 3/2020 | McMichael |
| 10,598,769 B2 | 3/2020 | Rodrigo |
| 10,598,770 B2 | 3/2020 | Singer |
| 10,598,788 B1 | 3/2020 | Dussan |
| 10,598,791 B2 | 3/2020 | Jain |
| 10,598,922 B2 | 3/2020 | Low |
| 10,600,930 B2 | 3/2020 | Suzuki |
| 10,605,899 B2 | 3/2020 | Singer |
| 10,605,900 B2 | 3/2020 | Spuler |
| 10,605,918 B2 | 3/2020 | Wong |
| 10,605,924 B2 | 3/2020 | Slutsky |
| RE47,942 E | 4/2020 | Hall |
| D882,430 S | 4/2020 | Haban |
| 10,613,200 B2 | 4/2020 | Hallstig |
| 10,613,201 B2 | 4/2020 | Pacala |
| 10,613,204 B2 | 4/2020 | Warke |
| 10,613,224 B2 | 4/2020 | Jeong |
| 10,620,301 B2 | 4/2020 | Wilton |
| 10,620,302 B2 | 4/2020 | Zhu |
| 10,620,315 B2 | 4/2020 | Zellinger |
| 10,620,317 B1 | 4/2020 | Chai |
| 10,620,318 B2 | 4/2020 | Yi |
| 10,627,490 B2 | 4/2020 | Hall |
| 10,627,491 B2 | 4/2020 | Hall |
| 10,627,492 B2 | 4/2020 | Shand |
| 10,627,495 B2 | 4/2020 | Gaalema |
| 10,627,512 B1 | 4/2020 | Hicks |
| 10,627,516 B2 | 4/2020 | Eichenholz |
| 10,629,072 B2 | 4/2020 | Felix |
| 10,630,913 B2 | 4/2020 | Wei |
| 10,634,772 B2 | 4/2020 | Eckstein |
| 10,634,793 B1 | 4/2020 | Siao |

(56) References Cited

U.S. PATENT DOCUMENTS

| | | |
|---|---|---|
| 10,641,870 B1 | 5/2020 | Magnani |
| 10,641,872 B2 | 5/2020 | Dussan |
| 10,641,873 B2 | 5/2020 | Dussan |
| 10,641,874 B2 | 5/2020 | Campbell |
| 10,641,876 B2 | 5/2020 | Field |
| 10,641,877 B2 | 5/2020 | Lombrozo |
| 10,641,878 B2 | 5/2020 | Yeo |
| 10,641,897 B1 | 5/2020 | Dussan |
| 10,641,900 B2 | 5/2020 | Dussan |
| 10,642,029 B2 | 5/2020 | Dussan |
| 10,649,072 B2 | 5/2020 | Bozchalooi |
| 10,649,086 B2 | 5/2020 | Raring |
| 10,650,531 B2 | 5/2020 | Lakshmi Narayanan |
| 10,656,252 B1 | 5/2020 | Dussan |
| 10,656,272 B1 | 5/2020 | Dussan |
| 10,656,277 B1 | 5/2020 | Dussan |
| 10,663,584 B2 | 5/2020 | Sakai |
| 10,663,587 B1 | 5/2020 | Sandborn |
| 10,663,590 B2 | 5/2020 | Rzeszutek |
| 10,663,596 B2 | 5/2020 | Dussan |
| RE48,042 E | 6/2020 | Pennecot |
| 10,670,460 B1 | 6/2020 | Waterbury |
| 10,670,702 B2 | 6/2020 | Choi |
| 10,670,718 B1 | 6/2020 | Dussan |
| 10,670,721 B2 | 6/2020 | Efimov |
| 10,670,724 B2 | 6/2020 | Moon |
| 10,677,897 B2 | 6/2020 | LaChapelle |
| 10,677,925 B2 | 6/2020 | Boehmke |
| 10,684,359 B2 | 6/2020 | Axelsson |
| 10,684,360 B2 | 6/2020 | Campbell |
| 10,690,754 B2 | 6/2020 | Pei |
| 10,690,756 B2 | 6/2020 | Warke |
| 10,690,772 B2 | 6/2020 | Van Voorst |
| 10,697,582 B2 | 6/2020 | Campbell |
| 10,698,088 B2 | 6/2020 | Droz |
| 10,698,114 B2 | 6/2020 | Keilaf |
| 10,705,189 B2 | 7/2020 | Qiu |
| 10,705,190 B2 | 7/2020 | Jang |
| 10,712,433 B2 | 7/2020 | Carothers |
| 10,712,434 B2 | 7/2020 | Hall |
| 10,714,889 B2 | 7/2020 | Hong |
| 10,725,156 B2 | 7/2020 | Halmos |
| 10,725,177 B2 | 7/2020 | Smits |
| 10,726,567 B2 | 7/2020 | Lee |
| 10,726,579 B1 | 7/2020 | Huang |
| 10,732,264 B2 | 8/2020 | Bailey |
| 10,732,266 B2 | 8/2020 | Popovich |
| 10,732,279 B2 | 8/2020 | Schlotterbeck |
| 10,732,281 B2 | 8/2020 | LaChapelle |
| 10,732,283 B2 | 8/2020 | Gilliland |
| 10,732,287 B2 | 8/2020 | Korsgard Jensen |
| 10,739,440 B2 | 8/2020 | Shimizu |
| 10,739,441 B2 | 8/2020 | Nabbe |
| 10,739,444 B2 | 8/2020 | Hall |
| 10,739,459 B2 | 8/2020 | Castorena Martinez |
| 10,739,461 B2 | 8/2020 | Agarwal |
| 10,746,858 B2 | 8/2020 | Bradley |
| 10,754,009 B2 | 8/2020 | Sung |
| 10,754,012 B2 | 8/2020 | Galloway |
| 10,754,015 B2 | 8/2020 | Dussan |
| 10,754,033 B2 | 8/2020 | Shand |
| 10,754,034 B1 | 8/2020 | Chamberlain |
| 10,761,191 B2 | 9/2020 | Qiu |
| 10,761,195 B2 | 9/2020 | Donovan |
| 10,761,196 B2 | 9/2020 | Dussan |
| 10,762,673 B2 | 9/2020 | Luo |
| 10,763,290 B2 | 9/2020 | Akselrod |
| 10,768,282 B2 | 9/2020 | Crouch |
| 10,768,303 B2 | 9/2020 | Xiong |
| 10,775,484 B2 | 9/2020 | Jeong |
| 10,775,485 B2 | 9/2020 | Shim |
| 10,775,488 B2 | 9/2020 | Bradley |
| 10,775,507 B2 | 9/2020 | Mandai |
| 10,782,393 B2 | 9/2020 | Dussan |
| 10,782,399 B2 | 9/2020 | Lee |
| 10,782,409 B2 | 9/2020 | Wang |
| 10,788,574 B2 | 9/2020 | Shim |
| 10,791,884 B2 | 10/2020 | Starkey |
| 10,794,998 B2 | 10/2020 | Spuler |
| 10,795,000 B2 | 10/2020 | Singer |
| 10,796,457 B2 | 10/2020 | Beek |
| 10,802,119 B2 | 10/2020 | Yoon |
| 10,802,120 B1 | 10/2020 | LaChapelle |
| 10,802,122 B1 | 10/2020 | Goldberg |
| 10,802,149 B2 | 10/2020 | Stettner |
| 10,809,361 B2 | 10/2020 | Vallespi-Gonzalez |
| 10,809,362 B2 | 10/2020 | Fredericksen |
| 10,809,380 B2 | 10/2020 | Pacala |
| 10,816,647 B2 | 10/2020 | Xiang |
| 10,816,648 B2 | 10/2020 | Pennecot |
| 10,816,649 B1 | 10/2020 | Keyser |
| 10,818,091 B2 | 10/2020 | Evans |
| 10,819,082 B2 | 10/2020 | Josset |
| 10,821,942 B2 | 11/2020 | Green |
| 10,823,855 B2 | 11/2020 | Li |
| 10,830,877 B1 | 11/2020 | Chawla |
| 10,830,878 B2 | 11/2020 | McMichael |
| 10,830,880 B2 | 11/2020 | Subasingha |
| 10,830,890 B1 | 11/2020 | Keyser |
| 10,837,773 B2 | 11/2020 | Yang |
| 10,838,042 B2 | 11/2020 | Badoni |
| 10,838,045 B2 | 11/2020 | Crouch |
| 10,838,046 B2 | 11/2020 | Qui |
| 10,838,047 B2 | 11/2020 | Chong |
| 10,838,048 B2 | 11/2020 | Field |
| 10,838,049 B1 | 11/2020 | Schwiesow |
| 10,838,062 B2 | 11/2020 | de Mersseman |
| 10,841,496 B2 | 11/2020 | Wheeler |
| 10,844,838 B2 | 11/2020 | Schlipf |
| 10,845,464 B2 | 11/2020 | Schwarz |
| 10,845,466 B2 | 11/2020 | Pei |
| 10,845,468 B2 | 11/2020 | Marron |
| 10,845,470 B2 | 11/2020 | Verghese |
| 10,845,480 B1 | 11/2020 | Shah |
| 10,845,482 B2 | 11/2020 | Frederiksen |
| 10,845,587 B2 | 11/2020 | Low |
| 10,852,397 B2 | 12/2020 | Schwarz |
| 10,852,398 B2 | 12/2020 | Yu |
| 10,852,426 B2 | 12/2020 | Shan |
| 10,852,433 B2 | 12/2020 | Chen |
| 10,852,437 B2 | 12/2020 | Eken |
| 10,852,438 B2 | 12/2020 | Hartman |
| 10,859,683 B2 | 12/2020 | Lin |
| 10,859,684 B1 | 12/2020 | Nabatchian |
| 10,866,312 B2 | 12/2020 | Crouch |
| 10,866,319 B2 | 12/2020 | Brinkmeyer |
| 10,871,554 B1 | 12/2020 | Keyser |
| 10,871,779 B2 | 12/2020 | Templeton |
| 10,872,269 B2 | 12/2020 | Roy Chowdhury |
| 10,877,131 B2 | 12/2020 | Singer |
| 10,877,134 B2 | 12/2020 | Han |
| 10,877,154 B2 | 12/2020 | Bronstein |
| 10,878,282 B2 | 12/2020 | Mei |
| 10,878,580 B2 | 12/2020 | Mei |
| 10,879,415 B2 | 12/2020 | Kwon |
| 10,884,126 B2 | 1/2021 | Shu |
| 10,884,129 B2 | 1/2021 | Wu |
| 10,884,130 B1 | 1/2021 | Viswanatha |
| 10,884,131 B1 | 1/2021 | Allais |
| 10,884,411 B1 | 1/2021 | Allais |
| 10,890,650 B2 | 1/2021 | Droz |
| 10,891,744 B1 | 1/2021 | Wyffels |
| 10,897,575 B2 | 1/2021 | Wheeler |
| 10,901,074 B1 | 1/2021 | Pan |
| 10,901,089 B2 | 1/2021 | Zhang |
| 10,901,292 B2 | 1/2021 | Jeong |
| D909,216 S | 2/2021 | Vuletici |
| 10,908,080 B2 | 2/2021 | Salazar |
| 10,908,262 B2 | 2/2021 | Dussan |
| 10,908,264 B2 | 2/2021 | O'Keeffe |
| 10,908,265 B2 | 2/2021 | Dussan |
| 10,908,267 B1 | 2/2021 | Gagne |
| 10,908,268 B2 | 2/2021 | Zhou |
| 10,908,282 B2 | 2/2021 | Meyers |

(56) References Cited

U.S. PATENT DOCUMENTS

| | | |
|---|---|---|
| 10,908,287 B2 | 2/2021 | Warke |
| 10,908,372 B2 | 2/2021 | Moebius |
| 10,908,409 B2 | 2/2021 | Zhou |
| 10,914,821 B2 | 2/2021 | Patterson |
| 10,914,822 B2 | 2/2021 | Kremer |
| 10,914,824 B2 | 2/2021 | Meng |
| 10,914,825 B2 | 2/2021 | Coda |
| 10,914,839 B2 | 2/2021 | Hartmann |
| 10,914,841 B2 | 2/2021 | Crouch |
| 10,921,431 B2 | 2/2021 | Pei |
| 10,921,450 B2 | 2/2021 | Dussan |
| 10,921,452 B2 | 2/2021 | Crouch |
| 10,921,453 B2 | 2/2021 | Dumais |
| 10,922,880 B2 | 2/2021 | Scanlon |
| 10,928,485 B1 | 2/2021 | Karadeniz |
| 10,928,486 B2 | 2/2021 | Donovan |
| 10,928,487 B2 | 2/2021 | O'Keeffe |
| 10,928,488 B2 | 2/2021 | Sun |
| 10,928,490 B2 | 2/2021 | Tatipamula |
| 10,928,519 B2 | 2/2021 | Schaffner |
| 10,929,694 B1 | 2/2021 | Zhang |
| RE48,490 E | 3/2021 | Hall |
| RE48,491 E | 3/2021 | Hall |
| 10,935,637 B2 | 3/2021 | Cullumber |
| 10,935,640 B2 | 3/2021 | Jackson |
| 10,935,658 B2 | 3/2021 | Park |
| 10,935,659 B2 | 3/2021 | Smits |
| 10,939,057 B2 | 3/2021 | Gassend |
| 10,942,257 B2 | 3/2021 | Bao |
| 10,942,260 B2 | 3/2021 | Low |
| 10,942,272 B2 | 3/2021 | Droz |
| 10,942,277 B1 | 3/2021 | Angus |
| 10,948,598 B1 | 3/2021 | Prabhakar |
| 10,951,864 B2 | 3/2021 | Droz |
| 10,955,530 B2 | 3/2021 | Pei |
| 10,955,532 B2 | 3/2021 | Gilliland |
| 10,955,533 B2 | 3/2021 | Konrad |
| 10,955,534 B2 | 3/2021 | Halmos |
| 10,955,545 B1 | 3/2021 | Hunt |
| 10,955,952 B2 | 3/2021 | Gwon |
| 10,962,644 B1 | 3/2021 | Kong |
| 10,962,647 B2 | 3/2021 | Shin |
| 10,965,379 B2 | 3/2021 | Brown |
| RE48,503 E | 4/2021 | Hall |
| RE48,504 E | 4/2021 | Hall |
| 10,969,474 B2 | 4/2021 | O'keeffe |
| 10,969,475 B2 | 4/2021 | Li |
| 10,969,489 B2 | 4/2021 | Schmitt |
| 10,969,491 B1 | 4/2021 | Krause Perin |
| 10,976,413 B2 | 4/2021 | Han |
| 10,976,414 B2 | 4/2021 | Sayyah |
| 10,976,417 B2 | 4/2021 | LaChapelle |
| 10,979,644 B2 | 4/2021 | Jamjoom |
| 10,983,197 B1 | 4/2021 | Zhu |
| 10,983,201 B2 | 4/2021 | Pimentel |
| 10,983,213 B2 | 4/2021 | Eichenholz |
| 10,983,215 B2 | 4/2021 | Li |
| 10,983,218 B2 | 4/2021 | Hall |
| 10,983,219 B2 | 4/2021 | Kotov |
| 10,984,540 B2 | 4/2021 | Mei |
| 10,989,796 B2 | 4/2021 | Liu |
| 10,989,914 B2 | 4/2021 | Ramsey |
| 10,996,322 B2 | 5/2021 | Buettner |
| 10,996,334 B2 | 5/2021 | Datta |
| 10,999,511 B2 | 5/2021 | Yang |
| 11,002,832 B2 | 5/2021 | Sayyah |
| 11,002,834 B2 | 5/2021 | Kaestner |
| 11,002,837 B2 | 5/2021 | Barber |
| 11,002,839 B2 | 5/2021 | Shi |
| 11,002,852 B2 | 5/2021 | Cao |
| 11,002,853 B2 | 5/2021 | McWhirter |
| 11,002,857 B2 | 5/2021 | Dussan |
| 11,003,137 B2 | 5/2021 | Christmas |
| 11,009,592 B2 | 5/2021 | Wilton |
| 11,009,605 B2 | 5/2021 | Li |
| 11,016,178 B2 | 5/2021 | Donovan |
| 11,016,181 B2 | 5/2021 | Schwarz |
| 11,016,183 B2 | 5/2021 | Gill |
| 11,016,195 B2 | 5/2021 | Margallo Balbas |
| 11,016,197 B1 | 5/2021 | Barber |
| 11,016,496 B2 | 5/2021 | Chen |
| 11,022,682 B2 | 6/2021 | Konrad |
| 11,022,688 B2 | 6/2021 | Eichenholz |
| 11,022,689 B2 | 6/2021 | Villeneuve |
| 11,022,691 B2 | 6/2021 | Frederiksen |
| 11,022,693 B1 | 6/2021 | Allais |
| 11,024,669 B2 | 6/2021 | Rezk |
| 11,027,726 B2 | 6/2021 | Stettner |
| 11,029,393 B2 | 6/2021 | Li |
| 11,029,394 B2 | 6/2021 | Li |
| 11,029,395 B1 | 6/2021 | Barber |
| 11,029,398 B2 | 6/2021 | Hwang |
| 11,029,406 B2 | 6/2021 | LaChapelle |
| 11,035,933 B2 | 6/2021 | Demir |
| 11,035,957 B2 | 6/2021 | Shotan |
| 11,041,942 B2 | 6/2021 | Ruchatz |
| 11,041,944 B2 | 6/2021 | Zhu |
| 11,041,954 B2 | 6/2021 | Crouch |
| 11,041,956 B2 | 6/2021 | Harris |
| 11,041,957 B2 | 6/2021 | Uehara |
| 11,043,005 B2 | 6/2021 | Wallin |
| 11,047,958 B1 | 6/2021 | Choiniere |
| 11,047,963 B1 | 6/2021 | Viswanatha |
| 11,047,983 B1 | 6/2021 | Prabhakar |
| 11,054,505 B2 | 7/2021 | Droz |
| 11,054,508 B2 | 7/2021 | Li |
| 11,054,523 B1 | 7/2021 | Buchter |
| 11,054,524 B2 | 7/2021 | Rezk |
| 11,061,116 B2 | 7/2021 | Gao |
| 11,061,140 B2 | 7/2021 | Hosseini |
| 11,063,408 B2 | 7/2021 | Jang |
| 11,067,670 B2 | 7/2021 | Patterson |
| 11,067,671 B2 | 7/2021 | Chong |
| 11,067,673 B2 | 7/2021 | Wei |
| 11,067,676 B2 | 7/2021 | Yang |
| 11,067,693 B2 | 7/2021 | Walls |
| 11,119,218 B2 | 9/2021 | Patterson |
| 11,150,349 B2 | 10/2021 | Chen |
| 2002/0140294 A1 | 10/2002 | Iwata |
| 2002/0140924 A1 | 10/2002 | Wangler |
| 2005/0173770 A1 | 8/2005 | Linden et al. |
| 2007/0035624 A1 | 2/2007 | Lubard |
| 2009/0273770 A1 | 11/2009 | Bauhahn |
| 2010/0053715 A1 | 3/2010 | O'Neill |
| 2010/0204974 A1 | 8/2010 | Israelsen |
| 2012/0170024 A1 | 7/2012 | Azzazy |
| 2012/0170029 A1 | 7/2012 | Azzazy |
| 2012/0236379 A1 | 9/2012 | da Silva |
| 2013/0120734 A1 | 5/2013 | Ogata |
| 2013/0242283 A1 | 9/2013 | Bailey |
| 2015/0032911 A1 | 1/2015 | Zhu |
| 2015/0192677 A1 | 7/2015 | Yu |
| 2015/0301180 A1 | 10/2015 | Stettner |
| 2015/0329111 A1 | 11/2015 | Prokhorov |
| 2016/0162743 A1 | 6/2016 | Chundrlik |
| 2017/0328990 A1 | 11/2017 | Magee |
| 2018/0167602 A1* | 6/2018 | Pacala .............. G02B 5/208 |
| 2019/0041524 A1* | 2/2019 | Korsgaard Jensen ................ G01S 7/4817 |
| 2020/0101890 A1 | 4/2020 | Solar |
| 2020/0386876 A1* | 12/2020 | Kudla ............... G01S 7/4865 |
| 2021/0109199 A1* | 4/2021 | Hennecke .......... G01S 17/10 |
| 2022/0050201 A1* | 2/2022 | Sun ................... G01S 17/34 |

FOREIGN PATENT DOCUMENTS

| | | |
|---|---|---|
| CN | 2681085 Y | 2/2006 |
| CN | 2773714 Y | 4/2006 |
| CN | 103278808 B | 12/2015 |
| CN | 104299244 B | 7/2017 |
| CN | 206773192 U | 12/2017 |
| CN | 106443699 B | 2/2019 |
| CN | 106597471 B | 5/2019 |
| CN | 208902906 U | 5/2019 |

(56) References Cited

FOREIGN PATENT DOCUMENTS

| | | |
|---|---|---|
| CN | 109997057 B | 7/2020 |
| DE | 930909 C | 7/1955 |
| DE | 3134815 A1 | 3/1983 |
| DE | 3216312 A1 | 11/1983 |
| DE | 3216313 A1 | 11/1983 |
| DE | 3701340 A1 | 7/1988 |
| DE | 3741259 A1 | 6/1989 |
| DE | 3808972 A1 | 10/1989 |
| DE | 3821892 C1 | 2/1990 |
| DE | 4040894 C1 | 4/1992 |
| DE | 4115747 A1 | 11/1992 |
| DE | 4124192 A1 | 1/1993 |
| DE | 4127168 A1 | 2/1993 |
| DE | 4137550 A1 | 3/1993 |
| DE | 4215272 A1 | 11/1993 |
| DE | 4243631 A1 | 6/1994 |
| DE | 4340756 A1 | 6/1994 |
| DE | 4411448 A1 | 10/1995 |
| DE | 4412044 A1 | 10/1995 |
| DE | 19512644 A1 | 10/1996 |
| DE | 19512681 A1 | 10/1996 |
| DE | 4345446 C2 | 7/1998 |
| DE | 4345448 C2 | 7/1998 |
| DE | 19727792 A1 | 2/1999 |
| DE | 19741730 A1 | 4/1999 |
| DE | 19741731 A1 | 4/1999 |
| DE | 19752145 A1 | 5/1999 |
| DE | 19717399 A1 | 6/1999 |
| DE | 19757847 A1 | 7/1999 |
| DE | 19757848 A1 | 7/1999 |
| DE | 19757849 A1 | 7/1999 |
| DE | 19757840 C1 | 9/1999 |
| DE | 19815149 A1 | 10/1999 |
| DE | 19828000 A1 | 1/2000 |
| DE | 19902903 C1 | 5/2000 |
| DE | 19911375 A1 | 9/2000 |
| DE | 19919925 A1 | 11/2000 |
| DE | 19927501 A1 | 11/2000 |
| DE | 19936440 A1 | 3/2001 |
| DE | 19953006 A1 | 5/2001 |
| DE | 19953007 A1 | 5/2001 |
| DE | 19953009 A1 | 5/2001 |
| DE | 19953010 A1 | 5/2001 |
| DE | 10025511 C1 | 12/2001 |
| DE | 10110420 A1 | 9/2002 |
| DE | 10114362 A1 | 10/2002 |
| DE | 10127417 A1 | 12/2002 |
| DE | 10128954 A1 | 12/2002 |
| DE | 10141055 A1 | 3/2003 |
| DE | 10143060 A1 | 3/2003 |
| DE | 10146692 A1 | 4/2003 |
| DE | 10148070 A1 | 4/2003 |
| DE | 10151983 A1 | 4/2003 |
| DE | 10162668 A1 | 7/2003 |
| DE | 10217295 A1 | 11/2003 |
| DE | 10222797 A1 | 12/2003 |
| DE | 10229408 A1 | 1/2004 |
| DE | 10244638 A1 | 4/2004 |
| DE | 10244640 A1 | 4/2004 |
| DE | 10244643 A1 | 4/2004 |
| DE | 10258794 A1 | 6/2004 |
| DE | 10303015 A1 | 8/2004 |
| DE | 10331529 A1 | 1/2005 |
| DE | 10341548 A1 | 3/2005 |
| DE | 102004010197 A1 | 9/2005 |
| DE | 102004014041 A1 | 10/2005 |
| DE | 102005050824 A1 | 5/2006 |
| DE | 102005003827 A1 | 7/2006 |
| DE | 102005019233 A1 | 11/2006 |
| DE | 102007013023 A1 | 9/2008 |
| DE | 102007044536 A1 | 3/2009 |
| DE | 202015009250 U1 | 1/2017 |
| EP | 0185816 A1 | 7/1986 |
| EP | 0361188 A2 | 4/1990 |
| EP | 0396865 A2 | 11/1990 |
| EP | 0412395 A1 | 2/1991 |
| EP | 0412398 A1 | 2/1991 |
| EP | 0412399 A1 | 2/1991 |
| EP | 0412400 A1 | 2/1991 |
| EP | 0468175 A2 | 1/1992 |
| EP | 0486430 A2 | 5/1992 |
| EP | 0653720 A2 | 5/1995 |
| EP | 0656868 A1 | 6/1995 |
| EP | 0897120 A2 | 2/1999 |
| EP | 0913707 A1 | 5/1999 |
| EP | 0937996 A2 | 8/1999 |
| EP | 0967492 A1 | 12/1999 |
| EP | 1046938 A2 | 10/2000 |
| EP | 1055937 A2 | 11/2000 |
| EP | 1148345 A1 | 10/2001 |
| EP | 1160718 A2 | 12/2001 |
| EP | 1174733 A2 | 1/2002 |
| EP | 1267177 A1 | 12/2002 |
| EP | 1267178 A1 | 12/2002 |
| EP | 1286178 A2 | 2/2003 |
| EP | 1286181 A1 | 2/2003 |
| EP | 1288677 A2 | 3/2003 |
| EP | 1291673 A2 | 3/2003 |
| EP | 1291674 A2 | 3/2003 |
| EP | 1298012 A2 | 4/2003 |
| EP | 1298454 A2 | 4/2003 |
| EP | 1298543 A2 | 4/2003 |
| EP | 1300715 A2 | 4/2003 |
| EP | 1302784 A2 | 4/2003 |
| EP | 1304583 A2 | 4/2003 |
| EP | 1306690 A2 | 5/2003 |
| EP | 1308747 A2 | 5/2003 |
| EP | 1355128 A1 | 10/2003 |
| EP | 1403657 A1 | 3/2004 |
| EP | 1408318 A1 | 4/2004 |
| EP | 1418444 A1 | 5/2004 |
| EP | 1460454 A2 | 9/2004 |
| EP | 1475764 A2 | 11/2004 |
| EP | 1515157 A1 | 3/2005 |
| EP | 1531342 A1 | 5/2005 |
| EP | 1531343 A1 | 5/2005 |
| EP | 1548351 A2 | 6/2005 |
| EP | 1557691 A1 | 7/2005 |
| EP | 1557693 A1 | 7/2005 |
| EP | 1557694 A1 | 7/2005 |
| EP | 1557992 A1 | 7/2005 |
| EP | 1700763 A2 | 9/2006 |
| EP | 1914564 A1 | 4/2008 |
| EP | 1927867 A1 | 6/2008 |
| EP | 1939652 A1 | 7/2008 |
| EP | 1947377 A1 | 7/2008 |
| EP | 1965225 | 9/2008 |
| EP | 1983354 A1 | 10/2008 |
| EP | 2003471 A1 | 12/2008 |
| EP | 2177931 A2 | 4/2010 |
| EP | 2503360 A1 | 9/2012 |
| EP | 2631667 | 8/2013 |
| EP | 2994772 | 3/2016 |
| EP | 3029488 | 6/2016 |
| EP | 2122599 B1 | 11/2019 |
| EP | 3671261 A1 | 6/2020 |
| GB | 2041687 A | 9/1980 |
| GB | 2251150 A | 6/1992 |
| GB | 2463815 | 3/2010 |
| JP | H36407 | 1/1991 |
| JP | H05240940 A | 9/1993 |
| JP | H6288725 | 10/1994 |
| JP | 2011264871 | 9/1999 |
| JP | 2001216592 | 8/2001 |
| JP | 20012656576 | 9/2001 |
| JP | 2009086787 A | 4/2009 |
| JP | 6039704 B2 | 12/2016 |
| JP | 2017162204 A | 9/2017 |
| JP | 2020521955 A | 7/2020 |
| RU | 2480712 | 4/2013 |
| WO | WO1999/003080 A1 | 1/1999 |
| WO | WO2000/025089 A1 | 5/2000 |
| WO | WO01/31608 A1 | 5/2001 |
| WO | WO03/019234 A1 | 3/2003 |

(56) References Cited

FOREIGN PATENT DOCUMENTS

| | | |
|---|---|---|
| WO | WO03/040755 A2 | 5/2003 |
| WO | WO2004/019293 A2 | 3/2004 |
| WO | WO2004/036245 A2 | 4/2004 |
| WO | WO2008008970 A2 | 1/2008 |
| WO | WO2009/120706 A2 | 10/2009 |
| WO | WO2010141631 A1 | 12/2010 |
| WO | WO2015/079300 A1 | 6/2015 |
| WO | WO2015/104572 A1 | 7/2015 |
| WO | WO2016/162568 A1 | 10/2016 |
| WO | WO2017/033419 A1 | 3/2017 |
| WO | WO2017/089063 A1 | 6/2017 |
| WO | WO2017/132703 A1 | 8/2017 |
| WO | WO2017/164989 A1 | 9/2017 |
| WO | WO2017/165316 A1 | 9/2017 |
| WO | WO2017/193269 A1 | 11/2017 |
| WO | WO2018/125823 A1 | 7/2018 |
| WO | WO2018/196001 A1 | 11/2018 |

\* cited by examiner

FIG. 3A
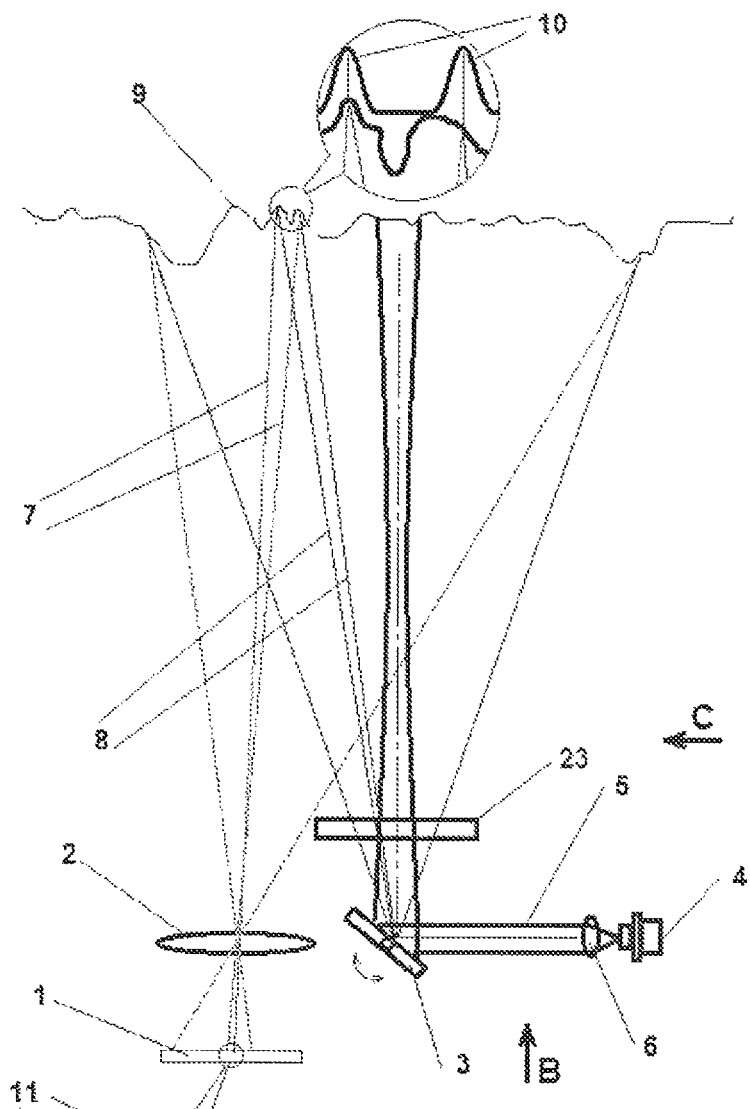
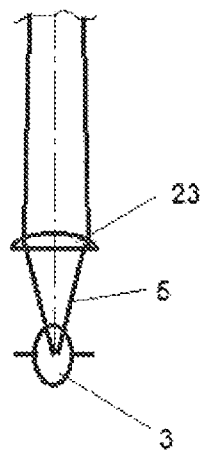
FIG. 3C
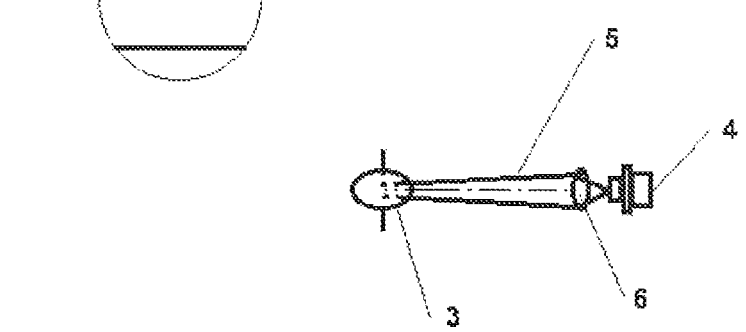
FIG. 3B

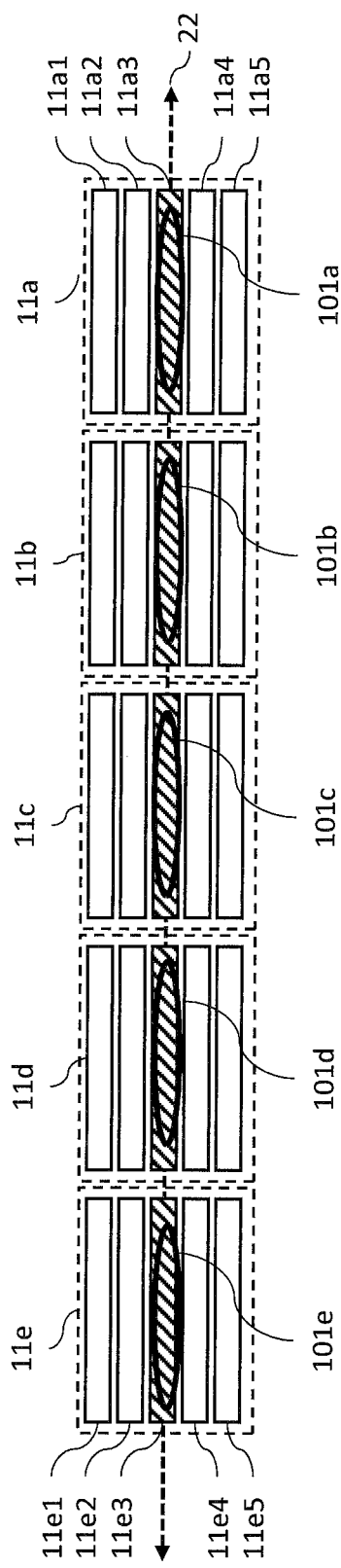
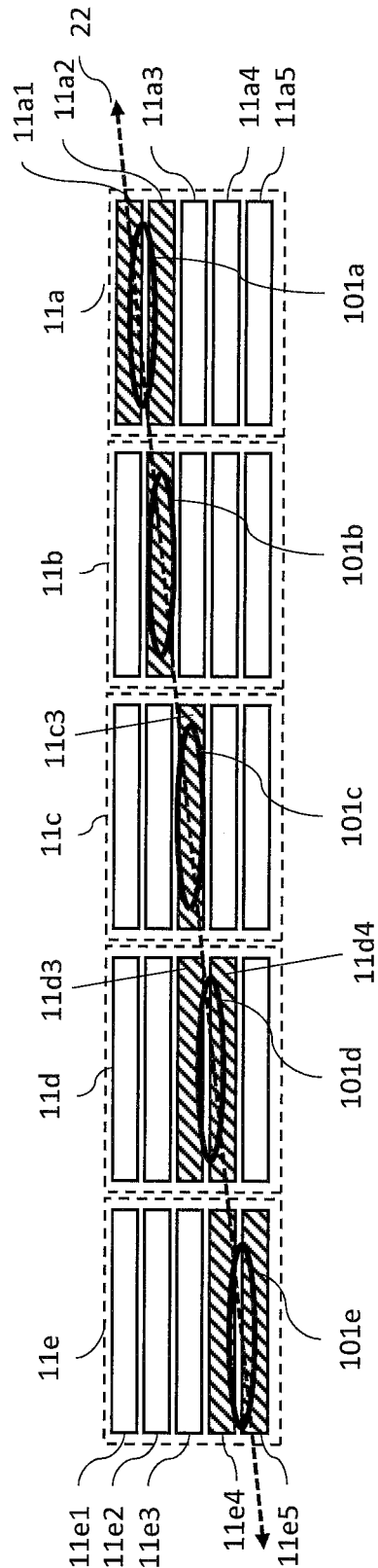
FIG. 10A
FIG. 10B

HYBRID LIDAR WITH OPTICALLY ENHANCED SCANNED LASER

CROSS REFERENCES TO RELATED APPLICATIONS

This application claims priority on U.S. Provisional Patent Application Ser. No. 63/154,990, filed on Mar. 1, 2021; and this application is also a continuation in part of U.S. application Ser. No. 17/000,464, filed on Aug. 24, 2020, which claims priority on U.S. Provisional Application Ser. No. 62/890,189, filed on Aug. 22, 2019; and this application is also a continuation in part of U.S. application Ser. No. 16/744,410, filed on Jan. 16, 2020, which is a continuation of U.S. application Ser. No. 15/432,105, filed on Feb. 14, 2017, now issued as U.S. Pat. No. 10,571,574, which claims priority on U.S. Provisional Patent Application Ser. No. 62/295,210, filed on Feb. 15, 2016, all disclosures of which are incorporated herein by reference.

FIELD OF THE INVENTION

The present invention relates generally to the field of optical Time-of-Flight (ToF) measurement, and more specifically, to directionally-resolved ToF measurement technology, known as Laser Radar (LADAR).

BACKGROUND OF THE INVENTION

In the modern era, beginning in World War II, radio detection and ranging (RADAR) systems were deployed, and which utilize reflected radio waves to identify the position of enemy aircraft. Sonar similarly uses sound waves to locate vessels within the oceans. Soon after the development of laser technologies, light/laser detection and ranging (LIDAR/LADAR) systems underwent development.

LADAR is generally based on emitting short pulses of light within certain Field-Of-View (FOV) at precisely-controlled moments, collecting the reflected light and determining its Time-of-Arrival, possibly, separately from different directions. Subtraction of the pulse emission time from ToA yields ToF, and that, in turns, allows one to determine the distance to the target the light was reflected from. LADAR is the most promising vision technology for autonomous vehicles of different kinds, as well as surveillance, security, industrial automation, and many other areas, where detailed information about the immediate surroundings is required. While lacking the range of radar, LADAR has a much higher resolution due to much shorter wavelengths that are used for sensing, and hence, comparatively relaxed diffractive limitations. It may be especially useful for moving vehicles, both manned, self-driving, and unmanned, if it could provide detailed 3D information in real-time, with the potential to revolutionize vehicles' sensing abilities and enable a variety of missions and applications.

However, until recently, LADARs have been prohibitively large and expensive for vehicular use. They were also lacking in desirable performance: to become a true real-time vision technology, LADAR must provide high-resolution imagery, at high frame rates, comparable with video cameras, in the range of 15-60 fps, and cover a substantial solid angle. Ideally, a LADAR with omnidirectional coverage of 360° azimuth and 180° elevation would be very beneficial. Collectively, these requirements may be called "real-time 3D vision".

A variety of approaches has been suggested and tried, including mechanical scanning, non-mechanical scanning, and imaging time-of-flight (ToF) focal-plane arrays (FPA). There is also a variety of laser types, detectors, signal processing techniques, etc. that have been used to date, as shown by the following.

U.S. Patent Application Pub. No. 2012/0170029 by Azzazy teaches 2D focal plane array (FPA) in the form of a micro-channel plate, illuminated in its entirety by a short power pulse of light. This arrangement is generally known as flash LADAR.

U.S. Patent Application Pub. No. 2012/0261516 by Gilliland teaches another embodiment of flash LADAR, with a two dimensional array of avalanche photodiodes illuminated in its entirety as well.

U.S. Patent Application Pub. No. 2007/0035624 by Lubard teaches a similar arrangement with a 1D array of detectors, still illuminated together, while U.S. Pat. No. 6,882,409 to Evans further adds sensitivity to different wavelengths to flash LADAR. Another approach is the use a 2D scanner and only one detector receiving reflected light sequentially from every point in the FOV, as taught by US Patent Application Pub. No. 2012/0236379 by da Silva.

Additional improvements to this approach are offered by U.S. Pat. No. 9,383,753 to Templeton, teaching a synchronous scan of the FOV of a single receiver via an array of synchronized MEMS mirrors. This arrangement is known as retro-reflective.

Yet another approach is to combine multiple lasers and multiple detectors in a single scanned FOV, as taught by U.S. Pat. No. 8,767,190 to Hall.

See also, the laser range camera of U.S. Pat. No. 5,870,180 to Wangler.

The herein disclosed apparatus provides improvements upon certain prior art LADAR systems.

It is noted that the citing of any reference within this disclosure, i.e., any patents, published patent applications, and non-patent literature, is not an admission regarding a determination as to its availability as prior art with respect to the herein disclosed and claimed method/apparatus.

OBJECTS OF THE INVENTION

The present invention is aimed at overcoming the limitations of both scanning and imaging approaches to LADAR by combining their advantages and alleviating their problems, including but not limited to:
1. Improve Signal-to-Noise Ratio (SNR);
2. Lower the peak power of illumination sources, reduce their cost and improve efficiency;
3. Reduce overall cost and power consumption; and
4. Increase the resolution.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A laser radar (LIDAR) system for an autonomous vehicle may include: a laser configured to emit a beam of light at a wavelength; an optical transmission system configured to shape the beam of light emitted by the laser, and to scan the beam along a plurality of transmission light paths toward a target; an optical reception system configured to collect the laser light reflected from the target along a plurality of reception light paths; and an electronic control system configured to synchronize the scan of the beam with a respective time-of-arrival measurement, to perform a time-of-arrival measurement, and determine a range of the target.

The optical reception system is formed of an objective lens and a one-dimensional array of light sensing devices ("sensors"), with each sensor of the array being sensitive to the wavelength of light emitted by the laser, and being configured to detect and image the laser light reflected from the target. Each sensor of the one-dimensional sensor array is formed of an n by m grid of sub-pixels, with each sub-pixel configured to receive the laser light reflected from the target.

A first embodiment of the optical transmission system includes: a first cylindrical lens, a scanning mirror, and a second lens. The first cylindrical lens is positioned and configured to expand the laser beam in a first orthogonal direction to the optical path and to have no effect on the beam in a second orthogonal direction to the optical path, to produce an expanding beam comprising an oval-shaped cross-section. The mirror oscillates about an axis to scan the expanding beam of light along a plurality of optical paths toward the target surface. The second lens is positioned in the plurality of optical paths, and is configured to collimate the scanned expanding beam to produce a collimated oval beam being scanned across the target to create a series of oval spots on the target.

A second embodiment of the optical transmission system includes: a first lens, a scanning mirror, a second lens, and third lens. The first lens is positioned and configured to focus and fit the laser beam onto the mirror. The mirror oscillates about an axis and is positioned to scan the focused light along a plurality of optical paths toward the target surface. The second lens is positioned in the plurality of optical paths, and is formed with a plurality of lenslets, where each of the plurality of lenslets is positioned in line to be sequentially illuminated by the plurality of optical paths. The plurality of lenslets are configured to individually focus the light, which is collimated by the third lens to create a series of spots on the target.

In one embodiment the optical reception system may further include one readout channel per sensor. Each readout channel may include timing circuitry configured to determine the time-of-flight of the beam from the emission from the laser to the reception of the laser light reflected from the target. The optical reception system may further include a field effect transistor (FET). The system may be configured such that only one of the sub-pixels within each sensor is connected to the readout channel through the FET at a time, being any one of the grid of sub-pixels determined by the FET to receive a maximum signal. Alternatively, the system may be configured such that two or more of the sub-pixels within each the sensor is connected to the readout channel through the FET, and the FET is configured to sum output signals of the two or more sub-pixels and transmit the summed output signals to the readout channel. The FET may also be configured to sum output from only the sub-pixels that receive signals.

Hundreds of sensors may be used, and the sensors used may be any suitable sensor known in the art, or which may later be developing, including, but not limited to, avalanche photodiodes. For a LIDAR system to be used in an autonomous vehicle, the laser may advantageously be: a master oscillator power amplifier (MOPA) laser, or a continuous wave (CW) fiber laser. One exemplary embodiment of a LIDAR system for an autonomous vehicle that achieves a 200 meter detection range may utilize: a one-dimensional sensor array formed of 512 sensors; a mirror configured to oscillate at about 80 KHz; and approximately 10 watts of power for the laser. Each sub-pixel may be a rectangle with sides in a range being between five um and ten um, or in a range being between one um and five um.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description of the various example embodiments is explained in conjunction with appended drawings, in which:

FIG. 3A illustrates tight focusing of the laser beam on the scanning mirror of a LADAR and subsequent re-collimation with a cylindrical lens.

FIG. 3B is a bottom view of the LADAR of FIG. 3A.

FIG. 3C is a side view of the LADAR of FIG. 3A.

FIG. 6A illustrates the laser of the LADAR system being continuously ON.

FIG. 10A is an enlarged detail view of one of the detection pixels shown in FIG. 9D, showing that each pixel may be composed of an array of small sized sub-pixels, and in which the scanning line 22 is parallel to the array of sub-pixels.

FIG. 10B is view of the detection pixels shown in FIG. 10A, but where the scanning line 22 is aligned at an acute angle relative to the array of pixels.

DETAILED DESCRIPTION OF THE INVENTION

Figure 1:
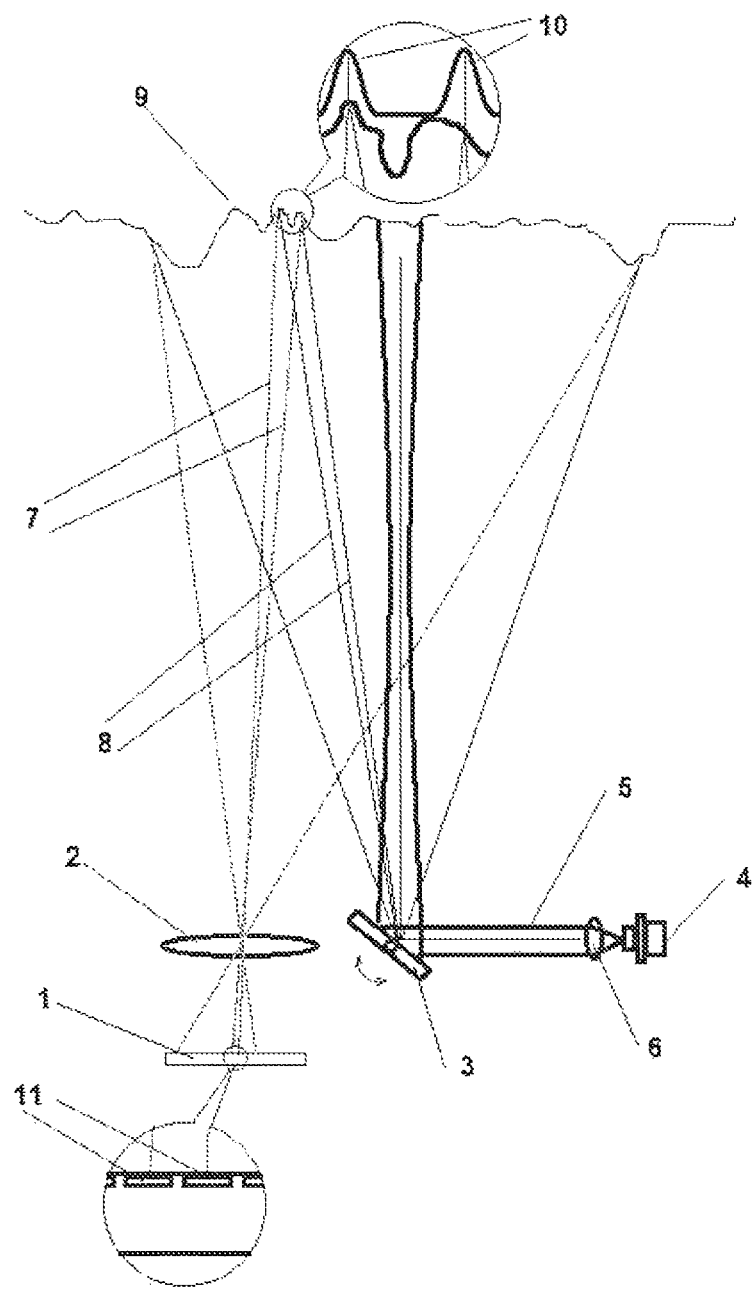
FIG. 1 illustrates a concept for a 1D scanning and imaging hybrid system.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

The word "pixel" is used throughout this specification to denote a discrete element of an optical sensor, such as a CCD, a CMOS device, an APD, etc.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

In accordance with at least one embodiment of the hybrid LADAR system disclosed herein, a fast 1D scanner/imager hybrid can collect one line of high-resolution ToF data within 6.5 microseconds. If needed, that hybrid can also be coupled to a secondary, slow scanning stage, producing raster ToF frames of thousands of lines at high frame rates, with total pixel throughput of tens or even hundreds of megapixels per second. (It is noted that very often, LIDAR systems, as well as vision systems in general, are classified as either "scanning" or "imaging," implying either a single emitter and/or detector with a scanned FoV, or a multitude of emitters and/or detectors with stationary FOVs (aka "pixels"), whereas the systems disclosed herein are a hybrid between the two, by providing a single scanning emitter and a multitude of stationary detector pixels).

The following description lists several embodiments of the present invention, which are merely exemplary of many variations and permutations of the subject matter disclosed.

Mention of one or more representative features of a given embodiment is likewise exemplary: an embodiment can exist with or without a given feature, and likewise, a given feature can be part of other embodiments.

A preferable embodiment of a 1D hybrid scanner/imager is illustrated in FIG. 1. It comprises a 1D array of photodetectors 1, placed in a focal point of a receiving optical system 2, and a scanning mirror 3, its axis of rotation perpendicular to the direction of the detector array. A laser beam 5 generated by the laser 4 is directed onto the scanning mirror 3 through a collimating lens 6. The positions of the optical system 2 and the scanner 3 are adjusted in such way that the fan of imaginary rays 7 emanating from individual pixels of the array, and the fan of real laser rays 8 emanating from the scanning mirror 3 lay in the same plane. Respectively, the laser scan line on the target overlaps with the FOV of the detector array.

Preferably, the scanning mirror 3 is a resonant MEMS mirror. Such mirrors, having dimensions of the reflective area of the order of 1 sq. mm, the resonant frequencies of tens of kHz, and the scan amplitude of tens of degrees, are becoming commercially available. While generally this invention would benefit from the fastest rate of scanning, a general tendency in scanning mirrors is that the faster scanning rate typically leads to narrower scan angle and smaller mirror size, which in turn increases the divergence of the scanned laser beam, thus limiting the number and size of the detectors in the array, and the amount of light that can be collected onto the detectors, especially, at longer ranges.

This invention might further benefit from non-mechanical beam scanners (NMBS), that are undergoing development, although their specifications and commercial availability remain unclear. For example, U.S. Pat. No. 8,829,417 to Krill teaches a phase array scanner, and U.S. Pat. No. 9,366,938 to Anderson teaches an electro-optic beam deflector device. NMBS may allow scan rates, or beam cross-sections, exceeding those of mechanical scanners.

A photo-sensor array should preferably consist of high-sensitivity detectors, as the number of photons arriving to each detector, especially from longer ranges, might be exceedingly small. Significant progress has been recently achieved in design and manufacturing of Avalanche Photo Diodes (APD), working in both a linear, and a Geiger mode, which is also known as a Single-Photon Avalanche Detector (SPAD). The former are reported to be able to detect a light pulse consisting of just a few photons, while the latter can actually be triggered by a single photon, and both types would be suitable for embodiments of the present invention. It should be noted, however, that the most advanced detectors are expensive to fabricate, therefore, the present invention that needs only one row of detectors would be very cost-efficient in comparison with flash LADAR, that would typically require a 2D array of the same resolution.

One of the problems typically encountered in ground-based and vehicular LADARs intended to be used in a populated area is the eye safety hazard presented by its powerful lasers. Therefore, a preferable embodiment of this invention would use a laser with longer infra-red (IR) wavelength, exceeding approximately 1400 nm. Such longer wavelengths are not well-absorbed by human eyes and therefore don't pose much danger. Respectively, much more powerful lasers might be used in this spectral range.

Figure 2A:
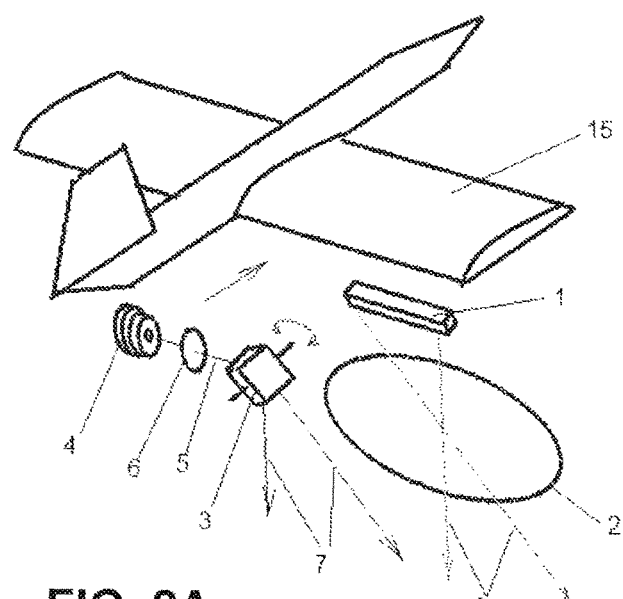
FIG. 2A illustrates a 1D hybrid LADAR installed on a Unmanned Aerial Vehicle (UAV) to obtain 2D ToF data.

Depending on a particular task the hybrid LADAR is optimized for, one of the following configurations of the slow stage may be used for ground surveillance, vehicular navigation and collision avoidance, control of industrial robots, other applications, or alternatively there may not be any slow stage at all. As depicted on FIG. 2A, the hybrid 1D LADAR of FIG. 1 is attached to an aerial platform 15, with the scan direction perpendicular to direction of platform motion.

Figure 2B:
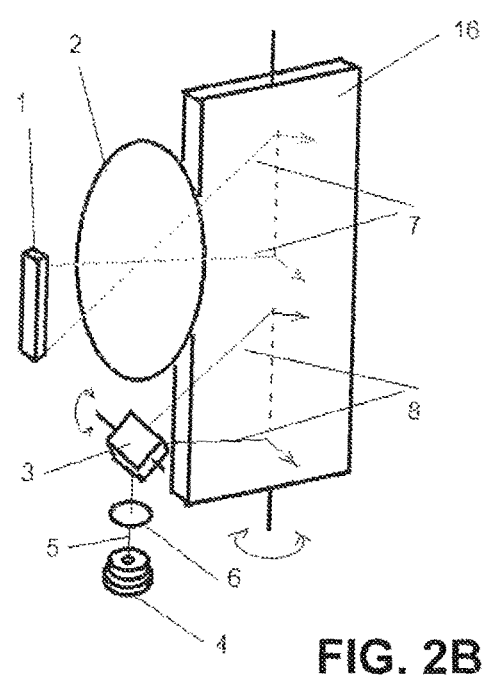
FIG. 2B illustrates a 1D hybrid LADAR coupled to an additional scanning mirror to obtain 2D ToF data.
Figure 2C:
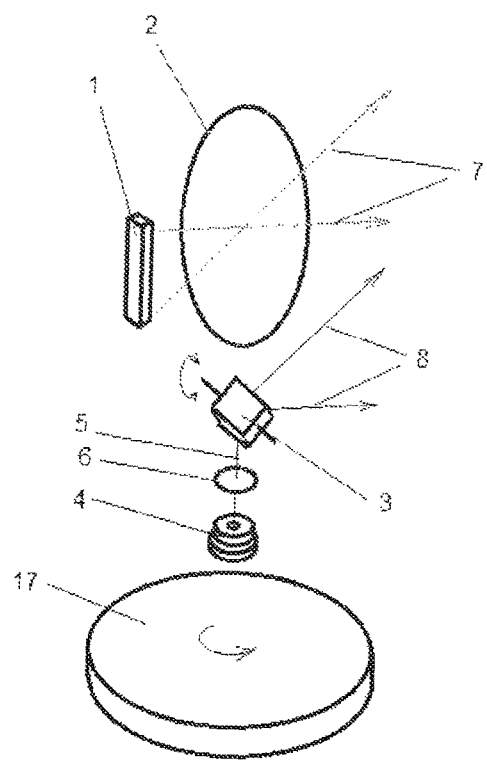
FIG. 2C illustrates a 1D hybrid LADAR installed on a rotating platform to obtain 2D ToF data.

FIG. 2B illustrates using a scanning mirror 16, with its scanning direction being perpendicular to the scanning direction of the hybrid. Combined, they constitute a 2D LADAR preferably having comparable scan angles in both directions. Finally, FIG. 2C illustrates positioning the hybrid of FIG. 1 on a rotational stage 17, which gives the combined LADAR a 360 degree FOV in a horizontal plane.

If a scanning mirror is used for the slow stage, its area should be sufficiently large to reflect the entire fan of beams emanating from the fast scanner, as well as the entire fan of rays coming to the optical reception system. However, scanning mirrors with active area of square centimeters, frequencies of tens of Hz, and scan angles of tens of degrees are commercially available. Thus, an exemplary combination of a detector array with 300 pixels, a fast scanner of 30 kHz, and a slow scanner of 30 Hz would provide a point cloud of ~18M points a second, assuming that both scanners utilize both scan directions, thus enabling real-time 3D vision with the resolution of approximately 1000×300 pixels at 60 frames a second. Rotation at 60 revolutions per second, or linear motion on board a vehicle would also provide comparable point acquisition rates, without the limitations of the reflective area of the scanning mirror.

Preferably, the optical system 2 is configured to form the FOV of each individual pixel 11 of the detector array to match the divergence angle of the laser beam, which is generally possible and usually not difficult to achieve. In an exemplary embodiment, a laser beam of near-infrared (NIR) light of approximately 1 mm in diameter will have a far-field divergence of approximately 1 milliradian (mrad). A photodetector pixel 20 μm in size will have similar FOV when placed in a focal plane of a lens with 20 mm focal length.

It might also be advantageous to use additional elements in an optical transmission system to shape the laser beam, such as, for example, a cylindrical lens 23, as depicted in FIG. 3A. In this case, the laser may still be nearly-collimated in the scanning direction, but may be tightly focused in the orthogonal direction, as illustrated by FIG. 3B, which shows the view from direction B in FIG. 3A. Cylindrical lens 23 subsequently re-collimates the beam in the orthogonal direction as illustrated on FIG. 3C, which shows the view from direction C in FIG. 3A. The advantage of such an arrangement lies in the possibility to reduce the dimension of the scanning mirror in the tightly-focused laser beam direction, as well as in reduced eye hazard presented by the laser beam expanded in at least one direction.

Figure 4:
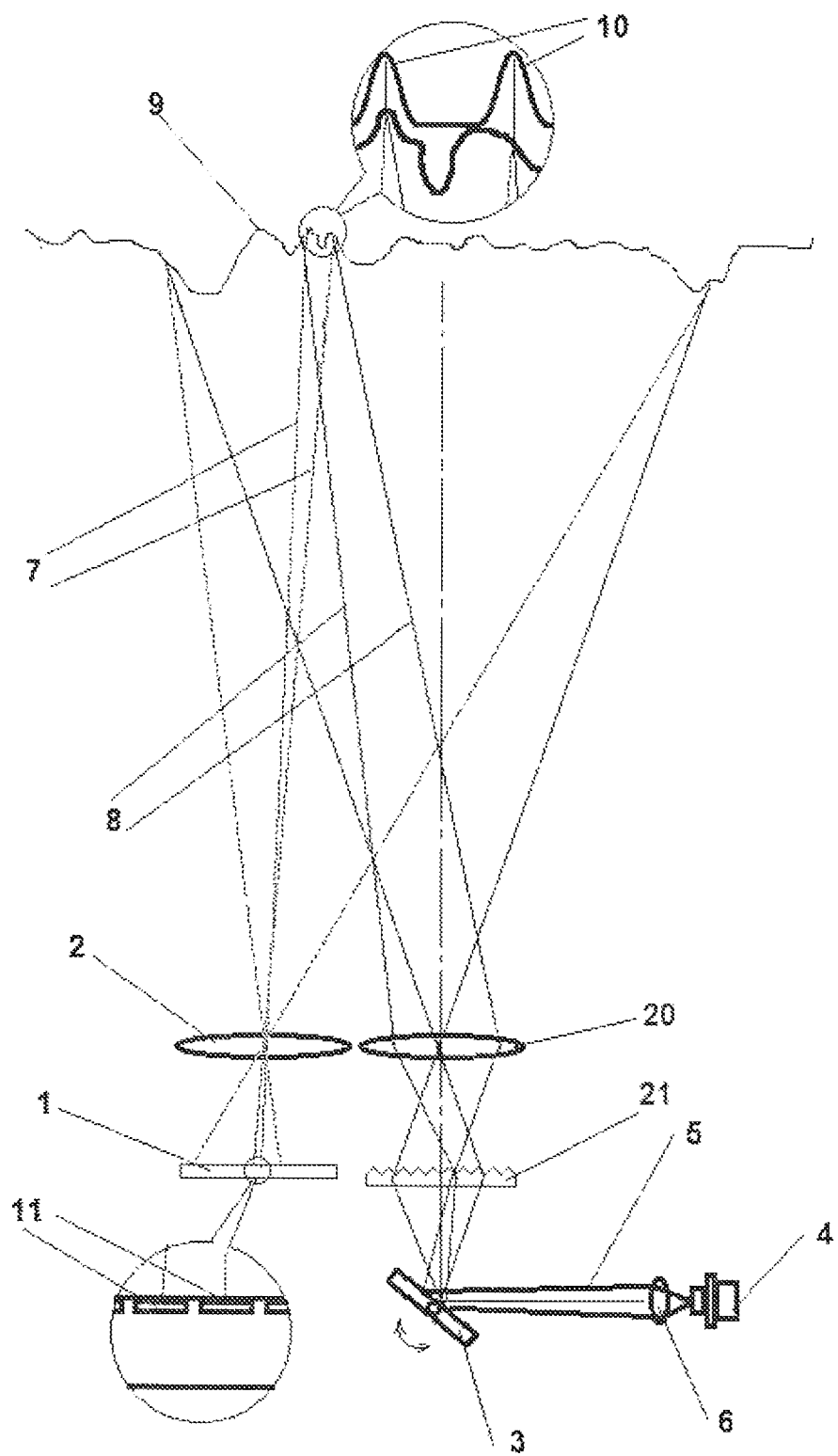
FIG. 4 illustrates forming a scan line on the surface of a diffractive element and imaging the scan line onto the target.
Figure 5A:
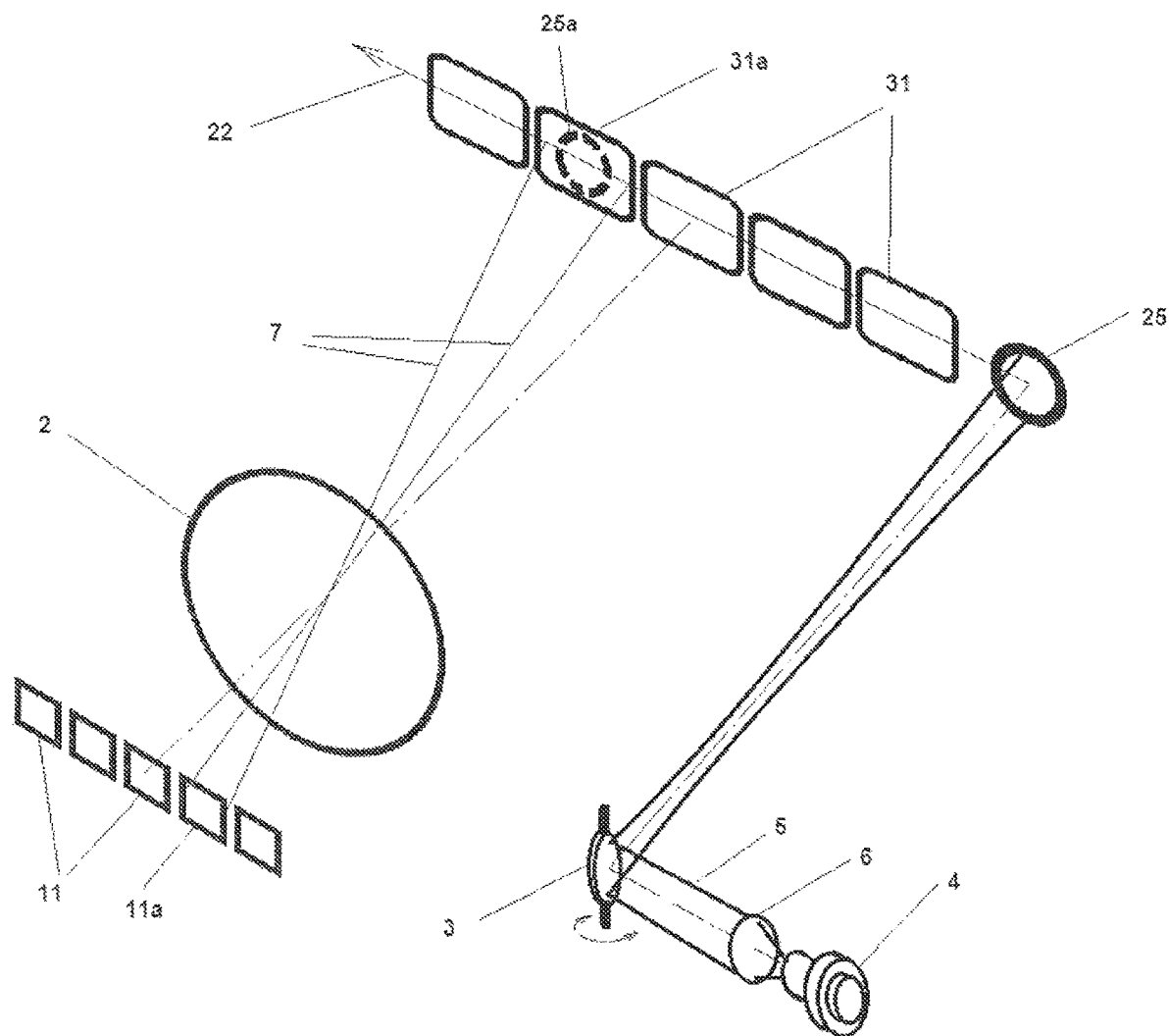
FIG. 5A illustrates a laser spot scanning across virtual detector pixels on the target.

In another embodiment of the present invention, the laser beam can be tightly focused in both directions and be scanned across a micro optical element 21, as illustrated on FIG. 4, forming a thin scan line on its surface. That scan line is subsequently imaged onto the target by the lens 20. The lens 20 may be identical to the lens 2 in the optical reception system in front of the detector array, in which case the dimensions of the scan line on the surface of a micro optical element 21 should be similar to that of the detector array, thus insuring the equal divergence of both FOVs of the illuminating laser and the detector. Alternatively, the lenses 2 and 20 may have different magnification, and respectively, the scan line may have different dimensions from the detector array, however, the design should provide for a good overlap of both FOVs on the target, as further illustrated on FIG. 5A, where virtual pixels 31 denote the projections of the detector pixels 11 onto the target through the optical system 2, while the laser spot 25 scans the same target along the scan line 22, thus sequentially illuminating pixels 11 with light reflected from the target. As shown on the figure for clarity, at the moment when the laser spot assumes position 25a, it illuminates the detector pixel 11a. It should be noted that the desired shape of laser spot 25 may be achieved by a variety of optical methods, as illustrated on FIG. 3 and FIG. 4, or other methods, without limiting the scope of this invention.

Figure 5B:
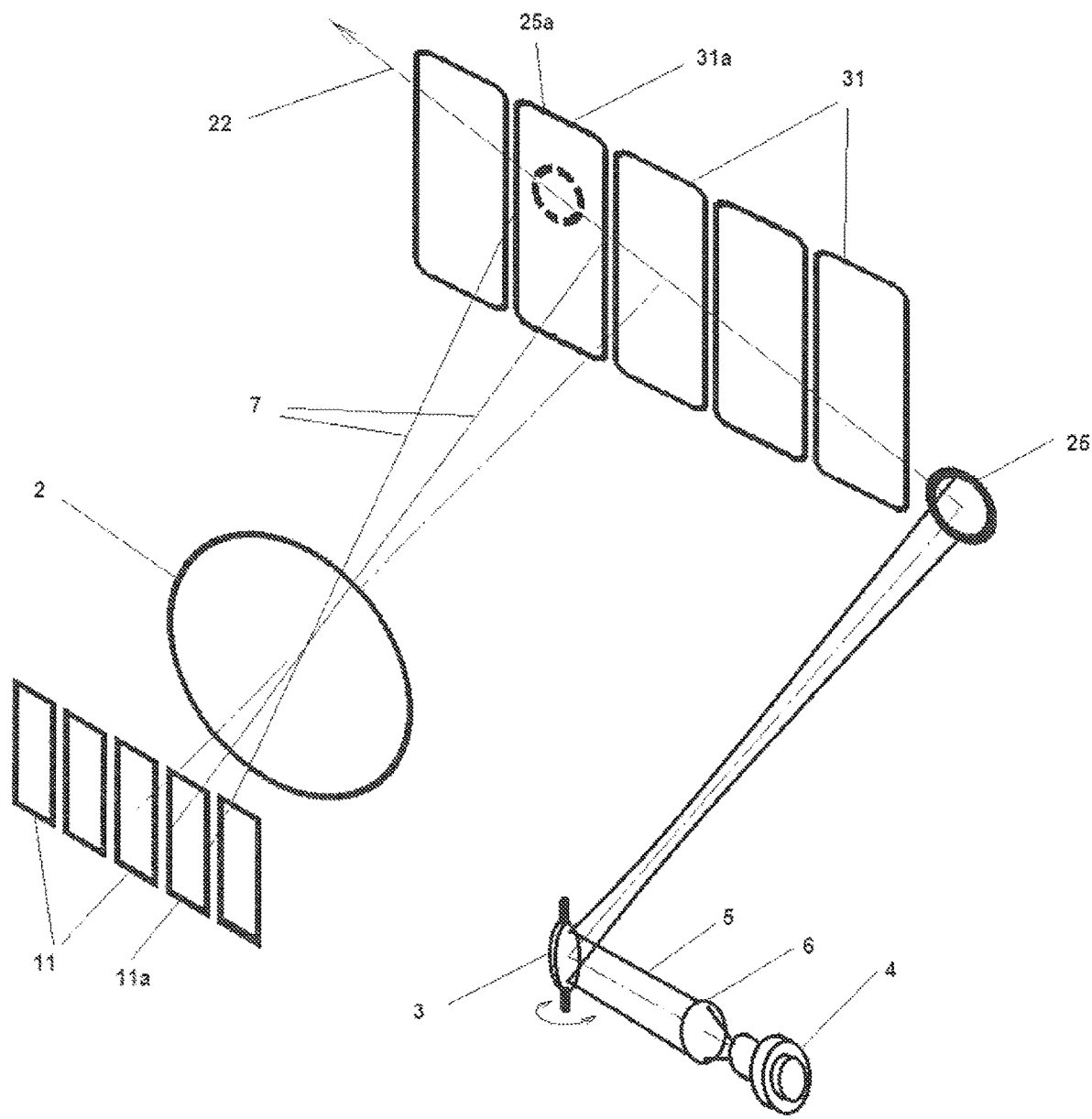
FIG. 5B illustrates permissible misalignment while the laser spot is scanning across tall virtual detector pixels on the target.
Figure 5C:
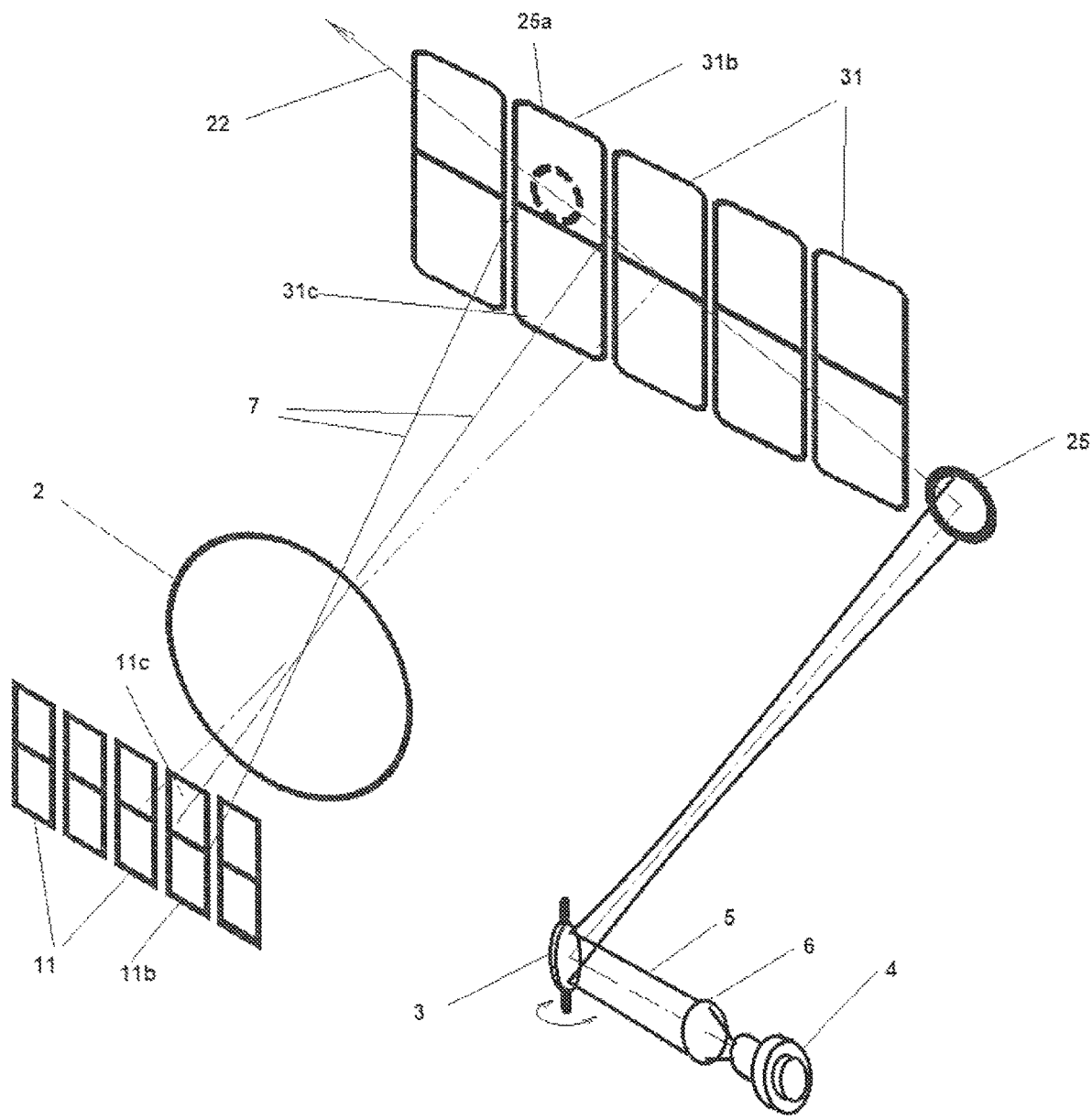
FIG. 5C illustrates splitting each of the pixels shown in FIG. 5B into two sub-pixels.

Pixels 11 may have different shapes: for example, FIG. 5B illustrates pixels with their height exceeding the pitch of the array. For example, pixels of the array may be 20 micrometers wide and 60 micrometers toll. The advantage of such arrangement is that it may accommodate slight misalignment between the laser scan line 22 and the line of virtual pixels 31. Likewise, the laser spot may also be oblong, or have some other desirable shape. It might also be advantageous to split each of the pixels 11 into two or more sub-pixels 11b, 11c, as depicted on FIG. 5C. These sub-pixels would generate redundant information, as the scan spot 25 may cross either of virtual pixels 31b, or 31c, or both of them, at the same time, and the ToA measured by either sub-pixels or both would be treated as one data point. The advantage, however, may come from the fact that smaller sub-pixels would generally have lower noise level, therefore a laser spot of the same power is more likely to generate a response when illuminating a small sub-pixel, than a larger full pixel.

Figure 5D:
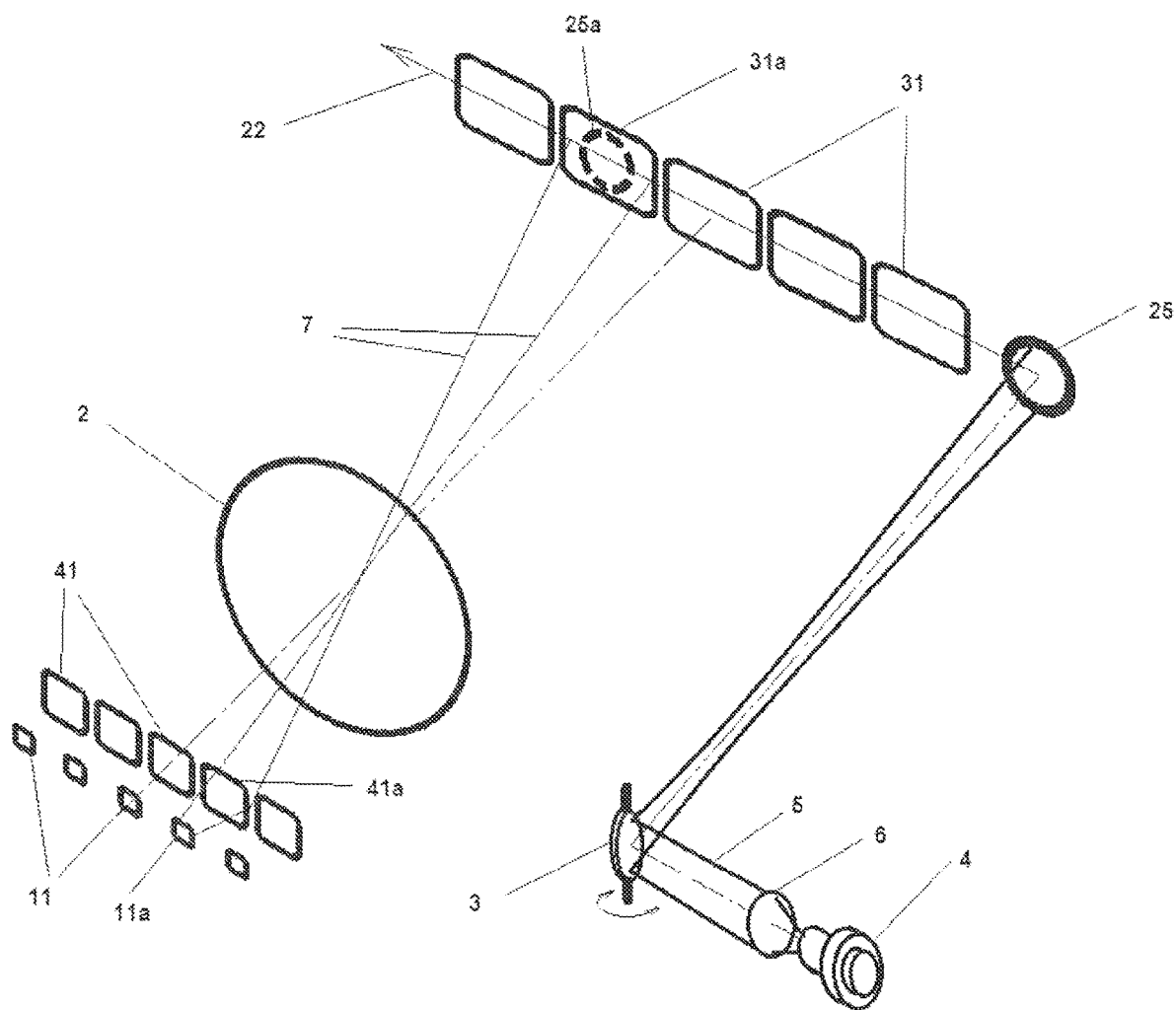
FIG. 5D illustrates positioning an array of micro-lenses in front of the detectors, and further illustrates how a relatively small pixel can be collecting light from a relatively large virtual pixel.

Some types of the high-sensitivity detectors, notably Geiger-mode APDs, are known to need considerable gaps between active pixels to eliminate cross-talk, thus limiting the fill factor of the arrays consisting of such detectors. To alleviate this problem, an array of micro-lenses 12 may be used in front of the detectors 11, as depicted on FIG. 5D, with the micro-lens 12a specifically illustrating how a relatively small pixel 11a can still be collecting light from a relatively large virtual pixel 31a.

It is also preferable to match the total extent of the array's FOV with the total scan angle, for example: 512 pixels, 20 um each, placed behind a 20-mm lens will subtend the angle of ~29°. Respectively, the total scan angle should be the same or slightly greater to utilize every pixel of the array.

Figure 6A:
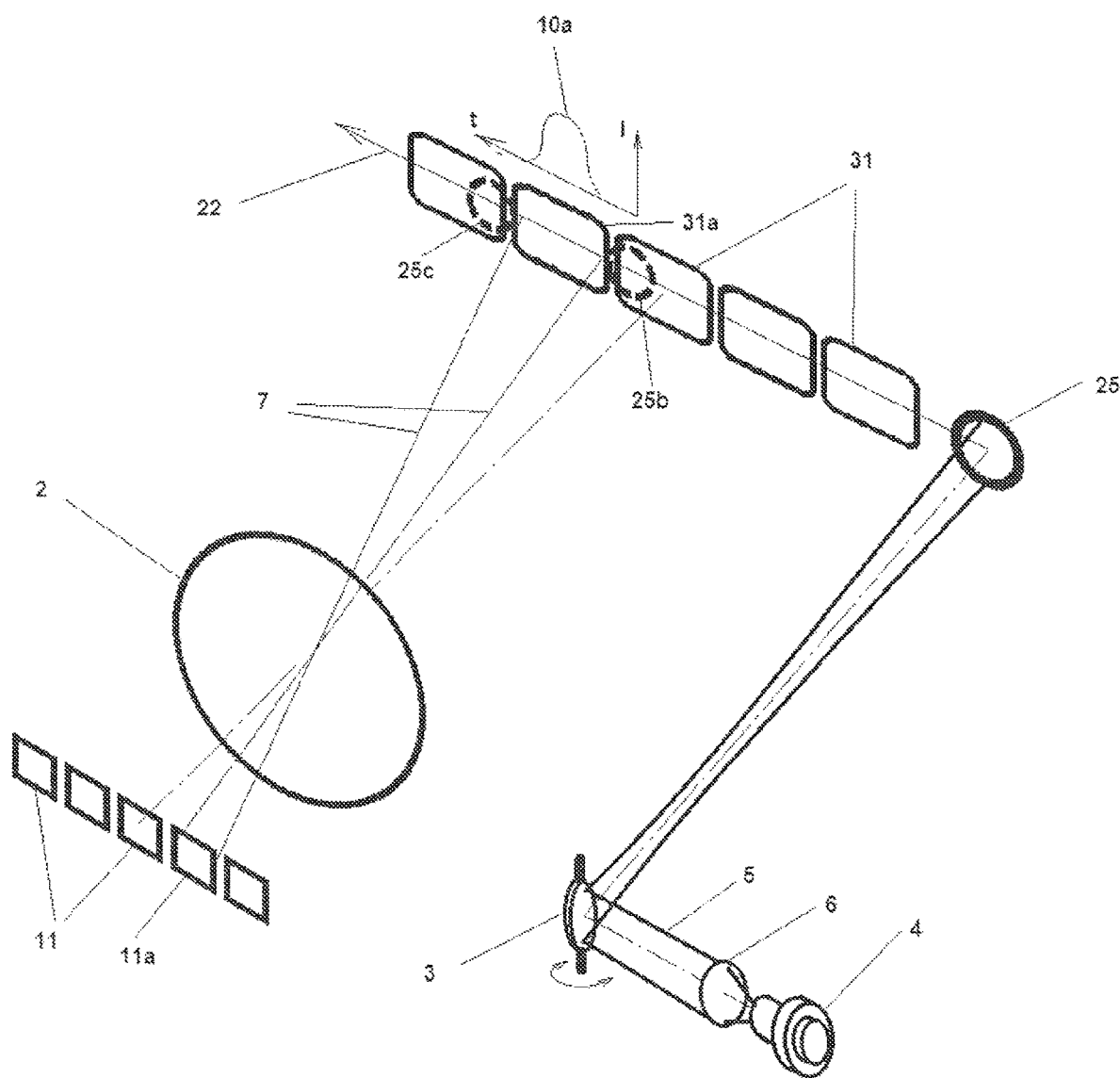

In a further embodiment of this invention, as the laser spot moves along the scan line, it is continuously energized, thus producing a time-domain response in the pixels it crosses, as illustrated on FIG. 6A, where the graph 10A represents the intensity (I) vs. time (t) response in the pixel 11a. The response starts when the laser beam in position 25b just touches the virtual pixel 31a, and ends when the laser beam moves to position 25c, just outside of the virtual pixel 31a. In such an embodiment, the laser power, and hence, the sensitivity is maximized, however, the precision of ToF measurement may suffer, due to the ambiguity of the Time of Arrival (ToA) of a relatively long light pulse.

Figure 6B:
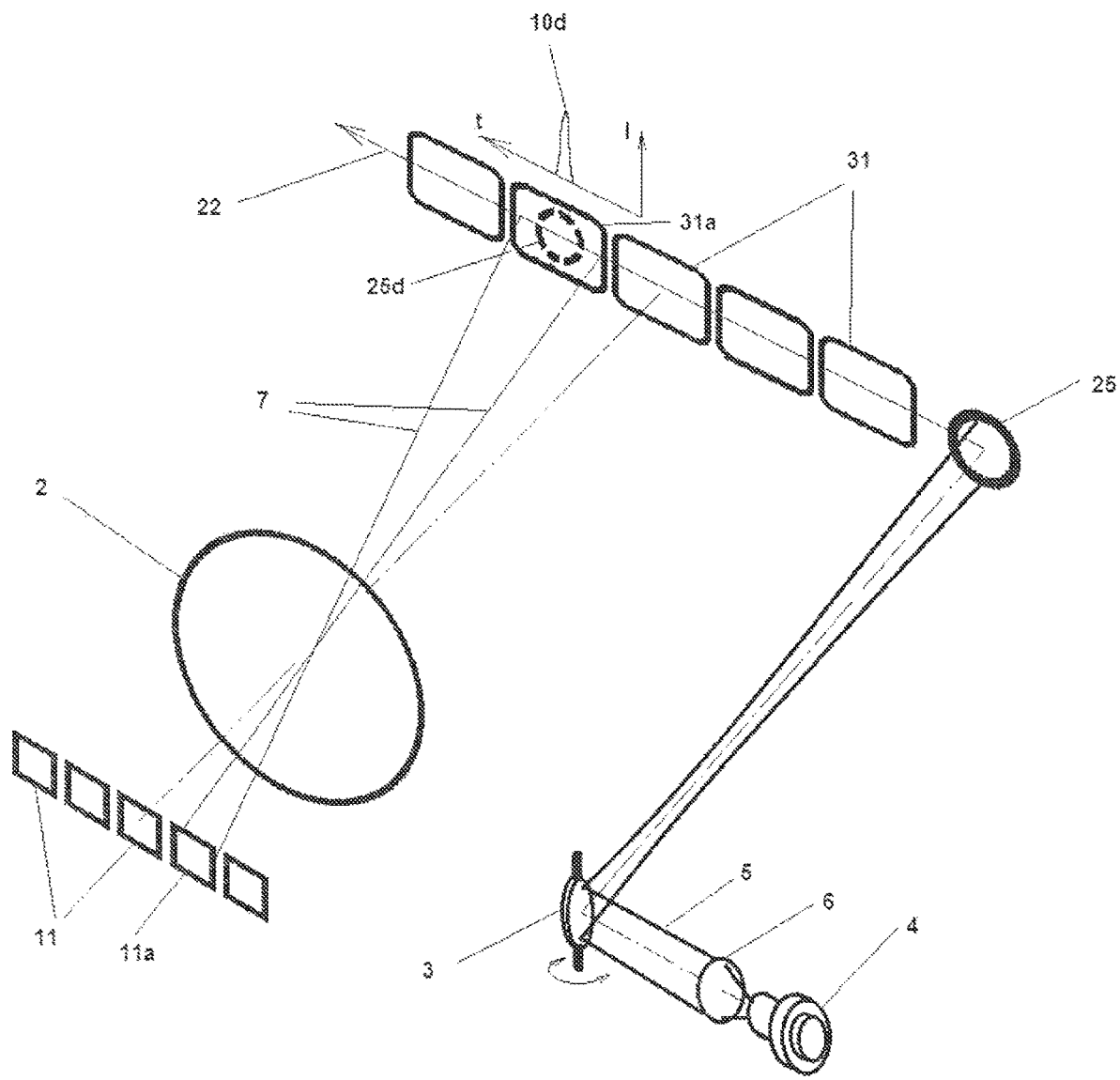
FIG. 6B illustrates the laser being modulated with one short pulse per pixel.
Figure 6C:
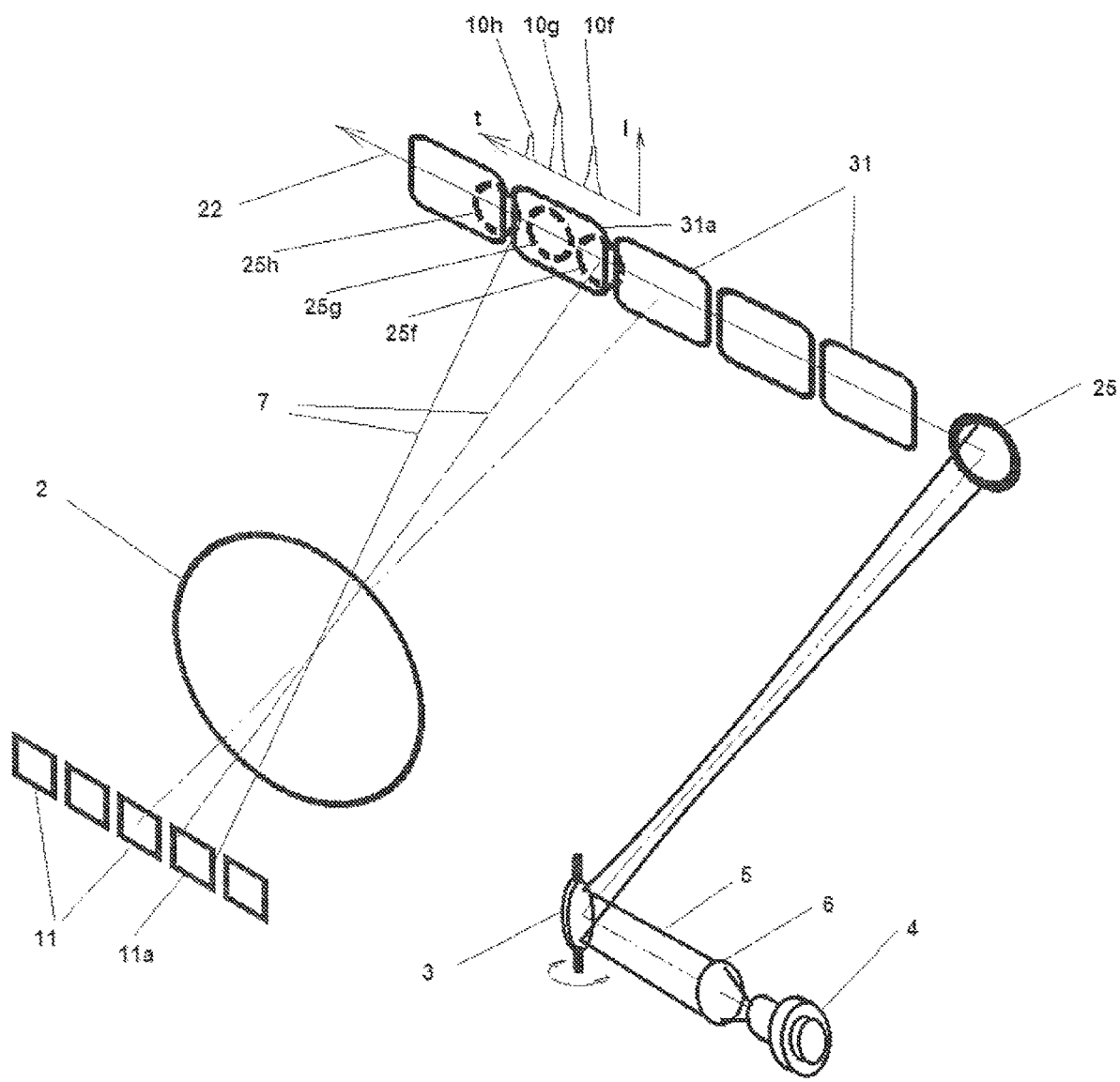
FIG. 6C illustrates the laser being modulated with multiple short pulses per pixel.

To alleviate this problem, the laser can be electrically-modulated with shorter pulses, as illustrated by FIG. 6B. For example, the laser is turned on when the laser spot is in the position 26d, producing the response 10d in the pixel 11a. Since the pulse is narrower, its ToA can be determined with greater precision.

One problem with this modulation method might arise if the laser is energized while its spot falls in between two virtual pixels, therefore each of the real pixels is getting only a fraction of the reflected light. Due to some parallax between the laser scanner and the detector array, the precise overlap between the laser spot and virtual pixels is somewhat dependent on the distance to the target, and hence not entirely predictable. To alleviate this problem, the laser may be modulated with more than one pulse per pixel, as illustrated on FIG. 6B. In this case, at least one of the consecutive modulation pulses emitted with the laser spot in positions 25f, 25g, 25h, would fully overlap with the virtual pixel 31a, thus producing full response 10g in the pixel 11a. Responses from two other pulses 10f and 10h might be shared with adjacent pixels and hence be lower.

Figure 7:
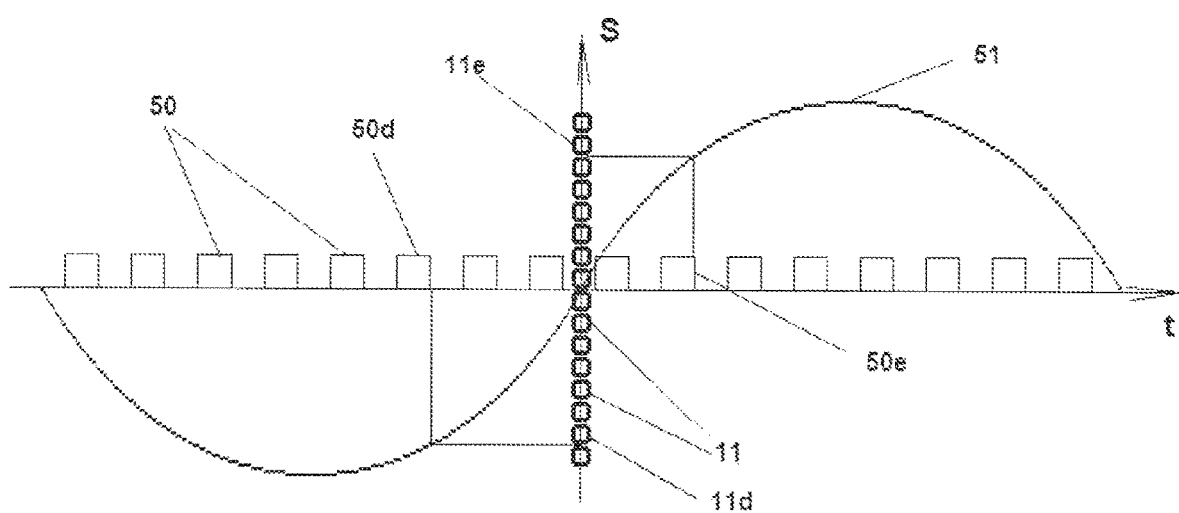
FIG. 7 illustrates synchronizing the clock of an electronic control system with the scanning process, so that there is a constant integer number of clock pulses per scanning cycle.

In any LIDAR system dependent on ToF measurements, it is important to accurately measure the ToA of a light pulse on the detector, as well as the time when the light pulse was emitted. In the present invention, additionally, it is important to precisely know the position of the scanned spot, as it determines which detector pixel will be illuminated. To achieve this, it is preferable to synchronize the clock of the electronic control system, denoted by pulses 50 on FIG. 7, with the scanning process, in such a way that there is a constant integer number of clock pulses per scanning cycle 51. The vertical axis (S) on FIG. 7 illustrates a scan angle, while the horizontal axis (t) illustrates time. Since many resonant scanners have unique, non-tunable resonant frequency, the system clock frequency may be changed instead to keep a integer number of clocks per period, preferably, by means of a Phase-Lock Loop (PLL) circuit. As long as this fixed relationship between the system clock and the scan angle is maintained, the system clock may be easily used for precise detector read-out timing, as well as for timing of the laser modulation pulses, if such modulation is used. Additionally, some types of detectors require quenching after they received a light pulse, and arming, to be able to receive the next pulse. Keeping pixels armed when they are not expected to be illuminated is undesirable, as it carries the risk of false positive due to internal noise. In most flash LADARs with such detectors, they are armed all at once, right before the illuminating laser pulse is emitted. In the present invention, it is preferable to arm detectors one-by-one, in the order they are illuminated by the scanning laser beam. As illustrated on FIG. 7, while the scanning beam proceeds from bottom to top, the pixel 11d would be armed by the system clock pulse 50d, while pixel 11e will be armed considerably later by the system clock pulse 50e.

Figure 8:
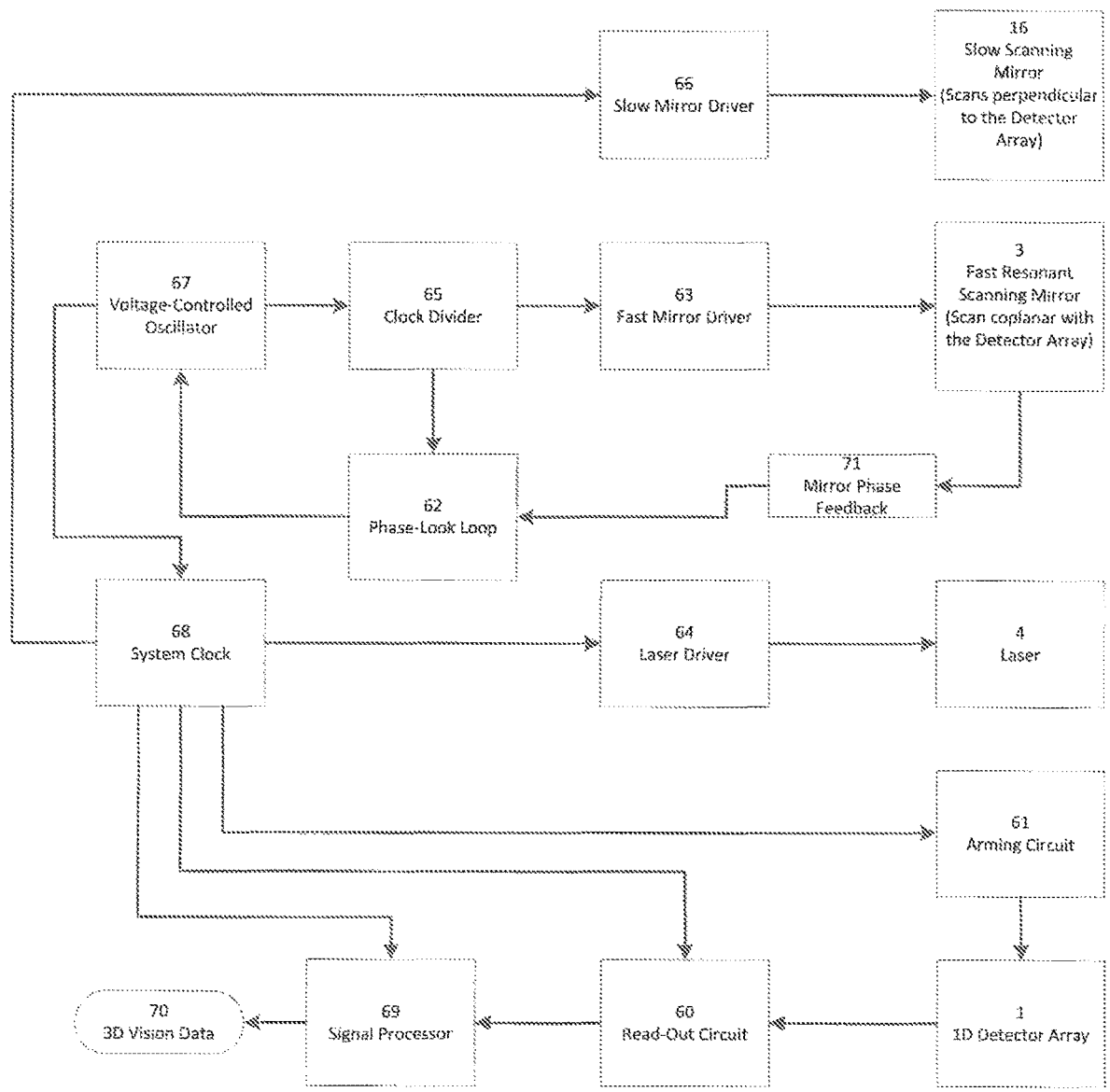
FIG. 8 illustrates the electronic control system of FIG. 7.

A preferred embodiment of the electronic control system is illustrated by FIG. 8. The fast scanning mirror 3 is driven by the driver 63 at the frequency defined by the voltage-controlled oscillator (VCO) 67 through clock divider 65. Being resonant, mirror 3 tends to oscillate at maximum amplitude while driven at its own resonant frequency and in a specific phase with respect to the drive signal. The mirror phase feedback 71 carries the information about the mirror's phase to the phase-locked loop (PLL) 62, that compares it to the phase of the clock divider and adjusts the VCO to eliminate any phase error, thus maintaining mirror oscillations close to its resonant frequency.

System clock 68 is derived from the same VCO, thus insuring that all other timing blocks function in strict synchronization with the mirror motion. Specifically, the arming circuit 61 provides sequential pixel arming and the laser driver 64 generate laser pulses in specific relationship to the scanned laser spot, as discussed above. Likewise, the same system clock synchronizes the motion of the slow mirror 16 through the driver 66 in a fixed relationship with the motion of the fast mirror, for instance, one cycle of the slow mirror per 1024 cycles of the fast mirror. Read-out circuit 60 and signal processor 69 may use the same clock as well, although they, unlike other elements discussed above, don't have to be strictly synchronized with the mirror motion. They must, however, be fast enough to be able to read and process data from all pixels within one scan cycle of the fast mirror. 3D vision data 70 is generated based on the ToF measurement coming from the detector array 1 and then supplied to users, such as navigation system of autonomous vehicles or security surveillance system.

It should be noted that the present invention offers a considerable advantage in efficiency over other types of LADARs, especially flash LADARs, where short laser pulses are used to illuminate the entire scene at relatively long intervals. The advantage comes from the fact that in the present invention the laser is energized either continuously, or with a fairly high duty cycle: for example, a LADAR of the present invention using 10 ns pulses per pixel and generating 18M data points per second would have a duty cycle of approximately 35%. A flash LADAR using the same 10 ns pulses, and having the same frame rate of 60 fps, would have the laser duty cycle of only 0.00006%. Consequently, to generate the same average power and attain comparable range, the laser of that hypothetical flash LADAR would need instantaneous power almost 6 orders of magnitude greater. While pulsed lasers capable of producing very short powerful pulses do exist, they are known to have lower efficiency, larger size and higher cost than continuous lasers of the same average power. Aside from inability to deliver high average power, pulsed sources are typically less efficient, more complex, bulkier and costlier, than continuous or high-duty sources. The general physical explanation of lower efficiency is in the fact that the emitted power of photonic sources—lasers or LEDs—is typically proportional to the current, while parasitic losses on various ohmic resistances inside those sources are proportional to the square of the current.

Additionally, high-power pulsed laser sources are typically more dangerous in terms of eye safety.

It should be noted, that it is difficult (although not impossible) to place the scanner at the center of the optical system. At any other position, there will be some parallax between the FOVs of the optical transmission and the reception systems, hence the detailed mapping of the pixels onto a scan line will depend on the distance to the target. However, in a practical system such parallax can be kept to a minimum by placing the scanner in close proximity to the optical system.

The present invention as illustrated by the above-discussed embodiments, would provide serious advantages over other types of LADAR.

In a typical imaging LADAR, the light source emits a short pulse which illuminates all pixels at once. Respectively, each pixel receives only a small fraction of the total back-scattered signal. In the proposed hybrid, only one pixel receives all the back-scattered light emitted at a given moment. If we assumed that the illumination power is the same, then the signal strength on each pixel would be up by a factor comparable to the number of pixels, i.e. hundreds, if not thousands. In practice, pulsed sources generally have higher instantaneous power than continuous ones, but their average power is still considerably lower.

Conversely, in a typical scanning LADAR, at any given moment only a small portion of the photo-detector is receiving any signal, while the rest only generates noise and contributes to unwanted capacitance. The exception is so-called retro-reflective scanners, where a small detector FOV is directed through the same scanning system. However, this approach only works with large, slow scanners, where the mirrors are large enough to provide sufficient optical collection area for back-scattered light. Contrarily, high-speed scanners are usually tiny, just sufficient to fit the beam of the laser, and are usually of the order of 1 mm.

In either case, as illustrated above, a hybrid appears would have a considerable SNR advantage: higher signal than imaging-only, or lower noise than scanning-only device.

It is anticipated that a hybrid LADAR of the present invention will be able to use a regular laser diode as its illumination source—which is by far the cheapest and most efficient source among those suitable for LADARs.

Also, both cost and power consumption are roughly proportional to the total number of sensors/pixels fabricated by a given technology. So, substituting a 2D array by a 1D array is supposed to considerably reduce both cost and power consumption for the detector array, while the cost and power consumption of both fast and slow scan stages may be considerably lower, than that of the array of sensors or the illuminating laser.

The above embodiments, which were originally disclosed in Applicant's patent application Ser. No. 15/432,105, now issued as U.S. Pat. No. 10,571,574, describe LIDAR/LADAR systems wherein a laser beam is scanned by a mirror oscillating about a single axis and directed towards a target, and the light reflected off the target is imaged by a 1D sensor array. The scanner quickly scans the laser beam and therefore the reflected image from the target falls on any given sensor in the array for a very short time. This arrangement eliminates the need for fast pulsing of the lasers thereby drastically simplifying the laser.

In other embodiments, various sensor types can be used (e.g., photo resistors, photo diodes, avalanche photo diodes, phototransistors, etc.), and there are various advantages and disadvantages of each type. A linear array of Avalanche Photo Diodes (APD) may be utilized; however, the state of the technology today would require that approximately 500 photons be received by each pixel to properly trigger a detection event (Note that many photons are needed to "properly trigger a detection event" in order to reliably overcome the internal noise of the sensor in existing linear-mode APD sensors, and estimates suggest that the number of photons needed can be improved by a factor of ~4, maybe even up to a factor of 10, but probably not down to a single photon.). In a system with an 80 KHz 1D mirror that produces 160 k scan lines per second (each mirror cycle produces two—one going up and one down), and a linear array of sensors each with 512 sensing pixels that produces a data point for each scan line, there are approximately 82 megapixels per second, and each pixel requires 500 photons. This pushes the laser power required to reach a 200-meter detection range to approximately 10 watts, which is achievable for the LIDAR system disclosed herein (being particularly useful for an autonomous vehicle) using, for example, a 10 watt MOPA (master oscillator power amplifier) laser or a continuous wave (CW) fiber laser.

Reduced laser power and/or increased detection range are each desirable features for a Lidar system. One way to achieve this is to increase the sensitivity of the sensor. With a more sensitive sensor, provided the same amount of reflected light hits the sensor, the Lidar will have an increased range. Alternatively, with a more sensitive sensor, to achieve a Lidar system of equivalent range to one with a less sensitive sensor, less laser power needs to be utilized.

Improved sensor sensitivity can be achieved by decreasing the physical area of each pixel of the sensor, which may be done with an Avalanche Photo Detector (APD). This is due to the fact that the sensor's internal noise goes down as the area is reduced. This results in an improvement in the signal to noise ratio. However, as the pixel area is reduced, from a system standpoint, it becomes difficult to focus all the reflected light from the target onto one particular pixel.

In several embodiments of the present invention described hereinafter, the improved optical scanning systems are directed to arrangements and apparatus for concentrating more captured light onto a plurality of small-area sub-pixels within each sensor.

Figure 9A:
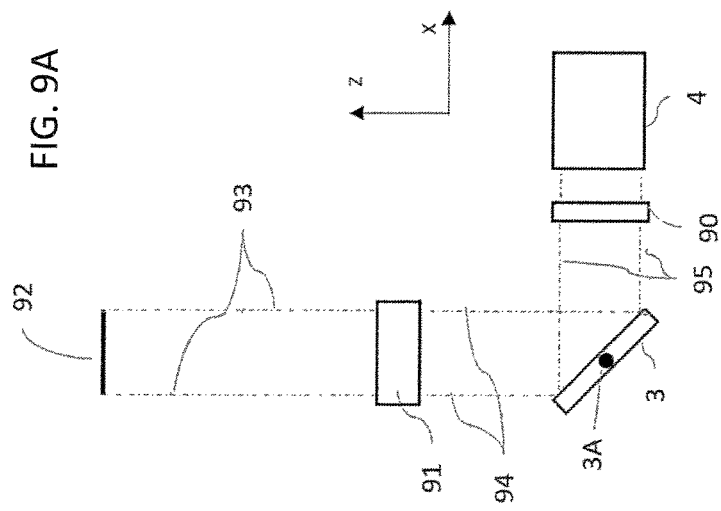
FIG. 9A, FIG. 9B, and FIG. 9C illustrate a top view, a front view, and a side view of a first embodiment of an improved optical scanning system directed to concentrating more captured light onto one or more of a plurality of pixels.

FIG. 9A is a top view of a first such embodiment, and is a 2-dimensional view taken along the Y-axis. FIG. 9A illustrates a laser 4 emitting a circular beam through a cylindrical lens 90 towards a mirror 3 that oscillates about an axis 3A. The axis 3A is orthogonal to the scanning direction of the mirror 3. It is noted that a cylindrical lens, which is often prescribed to correct astigmatism, has a curved surface that may generally focus light into a line rather than a point, and may compress the image in a direction perpendicular to the line (see e.g., Kee, C. S., Hung, L. F., Qiao, Y., Smith, E. L., "Astigmatism in Infant Monkeys Reared with Cylindrical Lenses," Vision Res. 2003; 43: 2721-2739.; and C. J. R. Sheppard, "Cylindrical Lenses-Focusing and Imaging: a Review," Appl. Opt. 52, 538-545 (2013)). However, the cylindrical lens 90 is configured to have no effect on the beam in the scanning direction and expands the beam in the direction orthogonal to the scanning direction, and the laser beam remains collimated or nearly-collimated in that direction after it reflects from the mirror 3 and after it passes through another cylindrical lens 91, which also doesn't have any effect in the scanning direction. The extent of such nearly-collimated beam in the scanning direction is shown as beam 94 after the mirror and 93 after the cylindrical lens 91. As noted above, both cylindrical lenses 90 and 91 are configured to have no effect on the beam in the scanning direction and to expand the beam in the direction orthogonal to the scanning direction, as illustrated on FIGS. 9B and 9C Since the minimal extent of the beam on a distant target is limited by diffraction, expanding the beam in the direction orthogonal to the scanning direction permits reduction of the extent of the spot on the target in that direction, resulting in the oval-shape spot 92. The advantage of the oval shape is that it reduces the extent of the beam in a non-scanning direction, thus increasing the power density. Doing so for the scanning direction may also be desirable, but requires increasing the width of the scanning mirror, and while this limitation can be circumvented with the use of a lenslet array (as described below, and shown FIG. 11), the scan line is no longer continuous, as it breaks into separate unconnected dots.

Figure 9B:
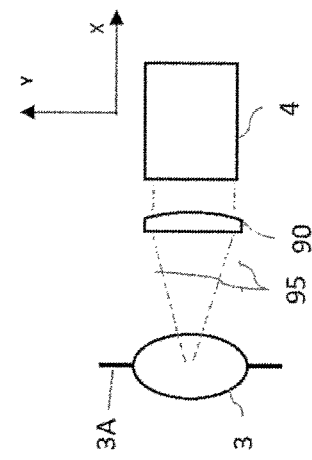
Figure 9C:
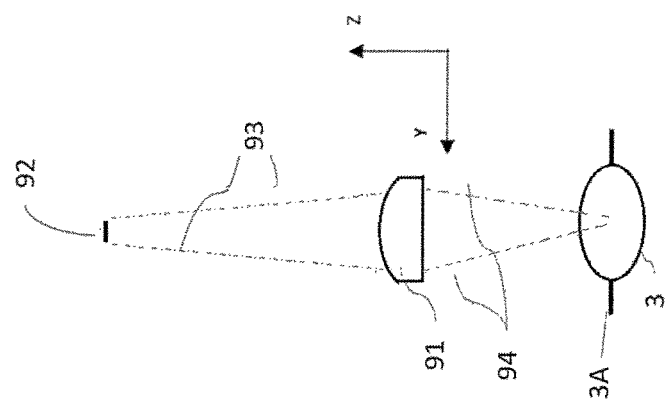
Figure 9D:
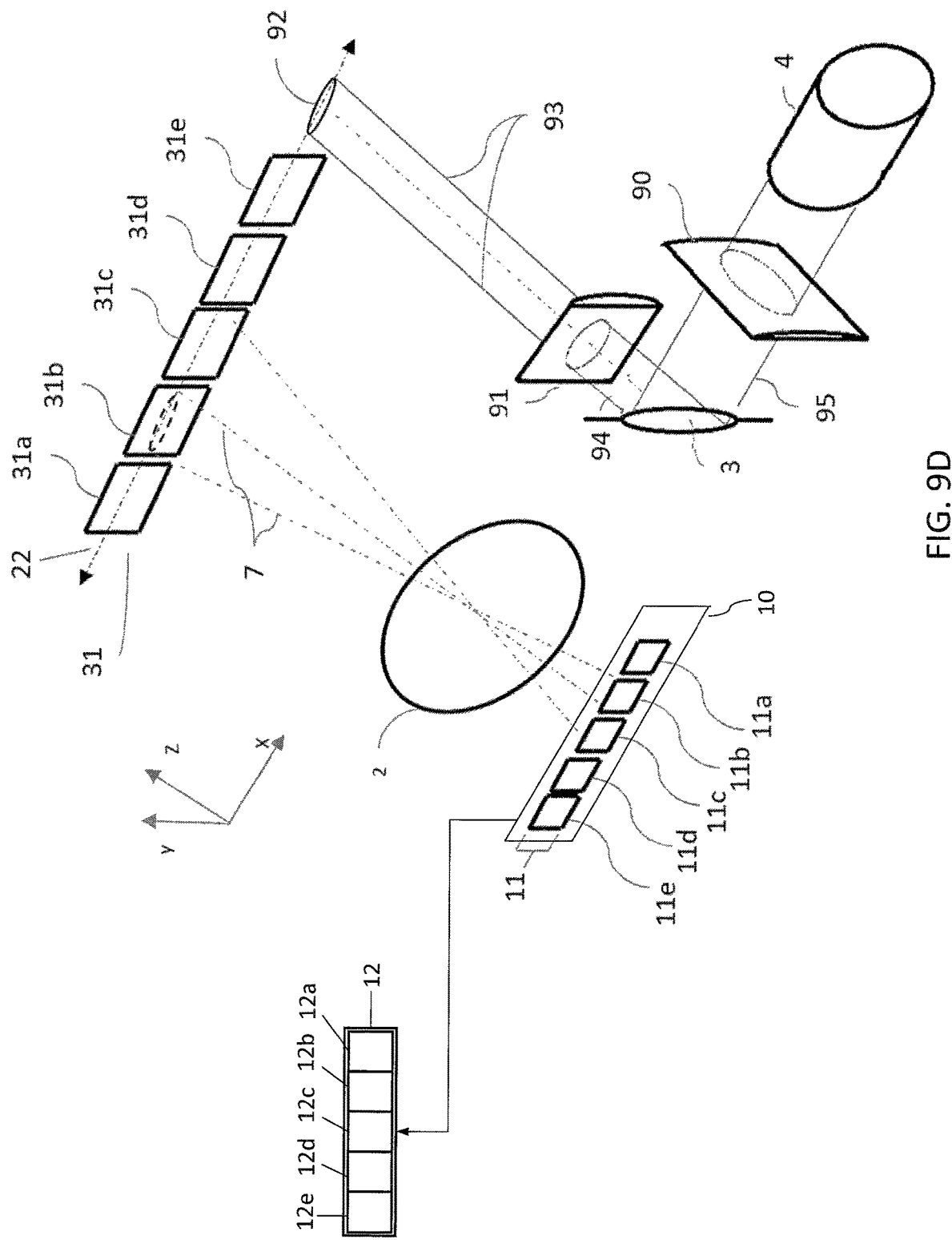
FIG. 9D is a perspective view of the embodiment illustrated in FIGS. 9A-9C.
Figure 9F:
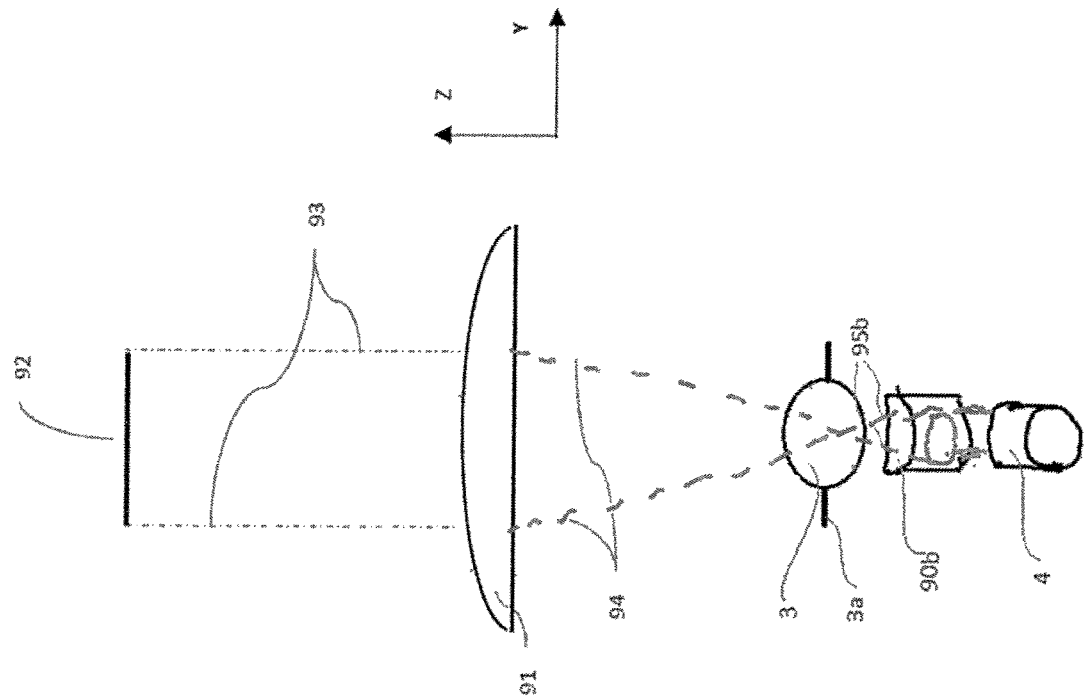
FIG. 9F illustrates the improved optical scanning system of FIGS. 9A-9D, where a Keplerian telescoping arrangement is used.
Figure 9E:
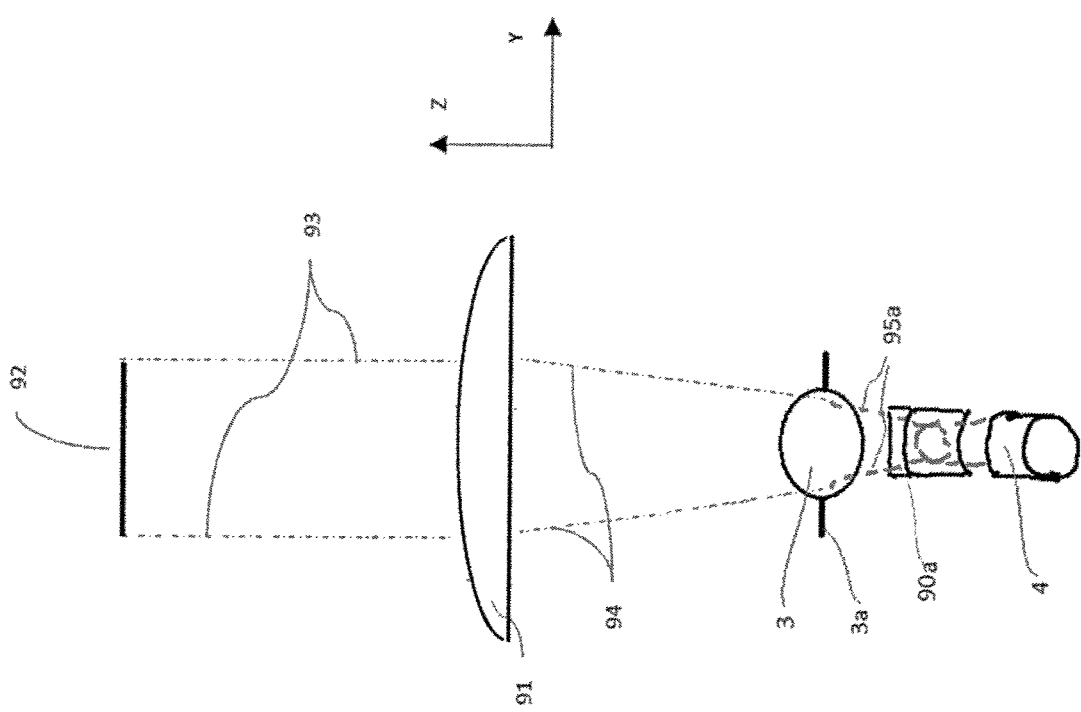
FIG. 9E is a perspective view illustrating an improved optical scanning system similar to the one shown in FIGS. 9A-9D, but where a Galilean telescoping arrangement is used.

To expand the beam in the direction orthogonal to the scanning direction, the system may be configured in either a Keplerian telescoping arrangement using the cylindrical lens 90a as seen in FIG. 9F, or a Galilean telescope arrangement using the cylindrical lens 90b as seen in FIG. 9E. Note that in both cases, the extent of the laser beam in the direction orthogonal to the scanning direction may exceed the extent of the mirror in that direction. Note that FIGS. 9B and 9C illustrate a Keplerian arrangement. An additional advantage of the Keplerian arrangement is that the extent of the laser beam in the direction orthogonal to the scanning direction on the mirror can be vanishingly small, and respectively, the mirror itself can be small in that direction.

Accordingly, a swept collimated oval beam 93 is moved across a target creating a series of oval spots 92 on the target. That oval spot is imaged onto the sensor(s) by the receiving optical system 2, where its image also have an oval shape. By way of example the imaged spot size on the sensor(s) can be 55 um (micrometers/microns) wide in scanning direction, but only a few um (e.g., 3-4 um) tall in non-scanning direction.

FIG. 9D is a perspective view that includes the components of FIG. 9A and an optical detection system. (Note that the lenses 90 and 91 in the perspective view of FIG. 9D and in FIGS. 9A-9C are meant to be illustrative of the shape of a cylindrical lenses, and may not be shown proportionately correct to produce the illustrated oval spot). Referring to FIG. 9D, the oval spot 92 is shown scanned in the direction of scan line 22. The light scanned onto the target through optical system 2 forms a series of oval laser spots 92 on a plurality of virtual target pixels 31 (shown as individual virtual pixels 31a, 31b, 31c, 31d, and 31e), which may be received/imaged by the detection sensors 11 on a chip 10, which may include a plurality of individual sensors 11a, 11b, 11c, 11d, and 11e. (Note—the optical system 2 may be an imaging objective or imaging lens, and may be a single lens or a series of such lenses that focuses the spot onto the sensors). The system scans along the scan line 22, thus sequentially illuminating sensors 11 with light reflected from the target. When viewing the oval spot 92 over time as it is continuously scanned along scan line 22, the oval spot appears as an illuminated line that is a few um thick in the direction across the scan line 22, i.e. in the non-scanning direction.

FIG. 10A shows in greater detail the detection sensors 11a through 11e. In this embodiment, each of the detection sensors 11a-11e may be respectively formed of five rectangular shaped pixels, each of which may be transmitted to form an output image 12 that is composed of output image pixels 12a, 12b, 12c, 12d, and 12e (see FIG. 9D). For example, detection sensor 11a may be formed of the five sub-pixels 11a1, 11a2, 11a3, 11a4, and 11a5. Similarly, detection sensor 11e may be formed of the five sub-pixels 11e1, 11e2, 11e3, 11e4, and 11e5 (note that the respective five sub-pixels for each of detection sensors 11b, 11c, and 11d that are shown but not explicitly labelled, would also follow the same grid pattern of labelling).

It is noted that the output image 12 may be comprised of the five pixels (12a, 12b, 12c, 12d, and 12e), which may correspond to the five pixels of the five sensors 11a, 11b, 11c, 11d, and 11e, even though the smallest addressable element(s) of each sensor (e.g., sensor 11a) is defined in this embodiment as a plurality of sub-pixels (i.e., sub-pixels 11a1, 11a2, 11a3, 11a4, and 11a5), because in one embodiment only the best signal from those five sub-pixels may be used to represent the entire pixel in the image output 12. In other embodiments several sub-pixels may be used to represent the entire pixel in the output image, and may thus be treated as the whole pixel value.

When the scanned line 22 is perfectly aligned in the center of the virtual pixels 31a-31e being imaged on the target by the sensors 11-11e, as shown in FIG. 9D, the reflected image of the spot 92 falls on positions 101a-101e, and which are shown to be vertically centered in the sensors 11a-11e. Positions 101a-101e correspond to the position of individual sub-pixels 11a3-11e3. In this case, only the signal received from individual sub-pixels 11a3-11e3 need to be processed to determine the time-of-flight information. It should be noted that each sub-pixel is smaller than the sensor size, and therefore the sensitivity of each sub-pixels will be significantly improved as compared to a pixel of the size of the entire sensor area. Further, it should be noted, as compared with previous embodiments where the spot from the scanned laser beam is reflected onto the entire sensor, where the optical arrangement compressed all of the photons into the oval spot of the sensor, each of the individual sub-pixels 11a3-11e3 receives approximately the same number of photons which previously reflected onto the entire sensor. Accordingly, receiving the same number of photons on a smaller sub-pixel area results in a more sensitive Lidar system. This would enable the Lidar to have a longer working range and/or operate with lower laser power.

In optomechanical systems, such as the one illustrated in FIGS. 9A-9C and FIG. 9D and the ones in FIGS. 11A-12C, it is often impractical to provide perfect optical alignment, particularly over expected temperature variations and in the presence of vibrations, and taking into account atmospheric conditions. Therefore, FIG. 10B illustrates an embodiment wherein scanning line 22 is at an angle relative to the virtual pixels 31a-31e shown in FIG. 9D, and therefore the reflection of the image spot 92 traverses the sensors 11a-11e at an angle along scan line 22. The system can be configured to have one readout channel (timing circuitry for determining time-of-flight) per sub-pixel, and only the individual sub-pixel which receives the maximum signal within each sensor may be connected to the readout channel using, for example, a Field Effect Transistor (FET). For example, referring to sensor 11C, in this example, only sub-pixel 11c3 receives the reflected spot 101c, and therefore only sub-pixel 11c3 may be connected via an FET to the readout channel associated with sensor 11c. However, for sensor 11d, the oval spot 101d covers both sub-pixels 11d3 and 11d4. In one embodiment, whichever sub-pixel receives the larger signal may be connected via a FET to the readout channel associated with pixel 11*d*.

Figure 13A:
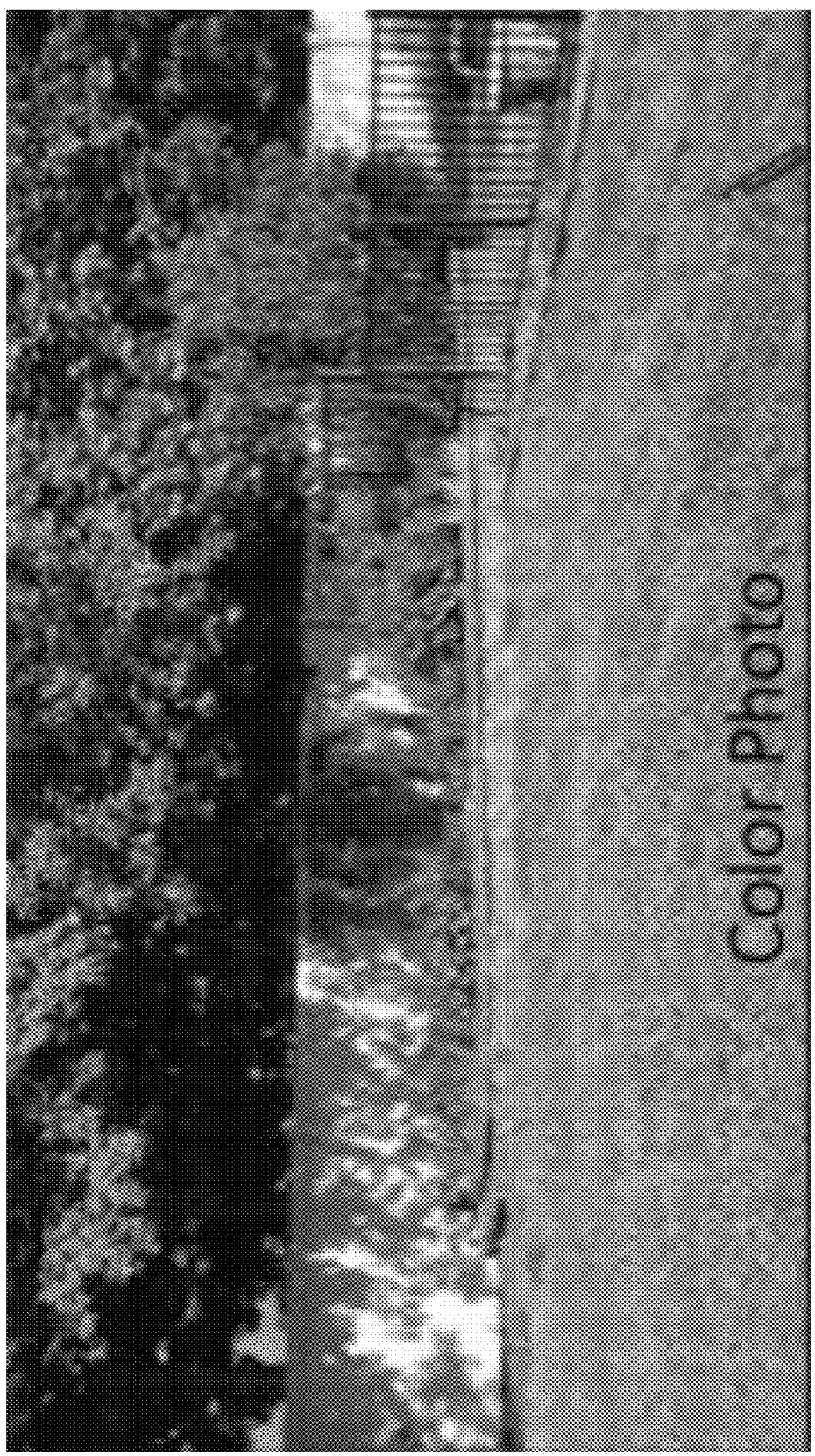
FIG. 13A is a color photographic image of a scene with objects at various ranges from the camera.
Figure 13B:
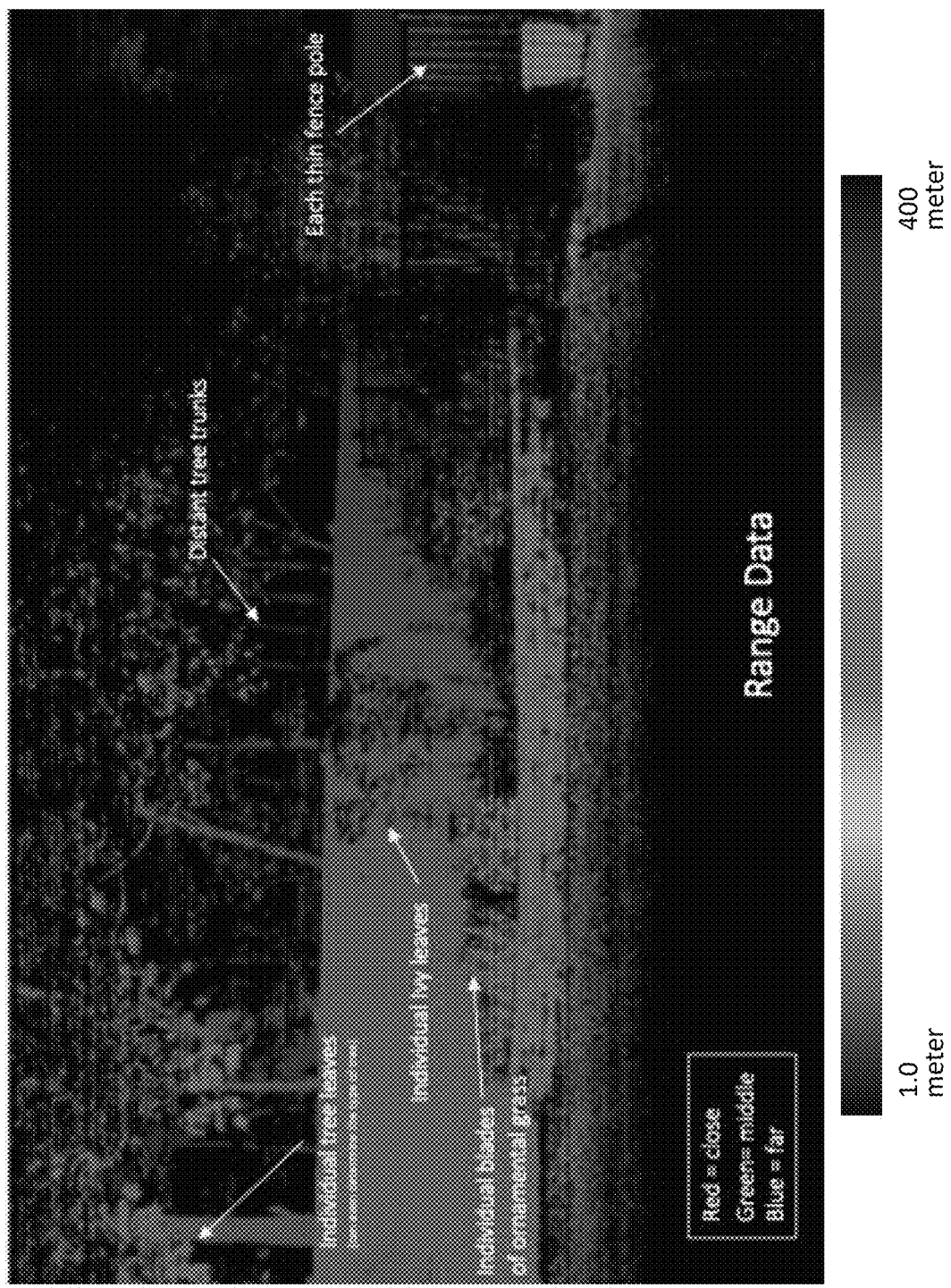
FIG. 13B shows colorized LADAR image data with objects in the field color-coded according to range, which image data was obtained using a prototype of one LADAR embodiment described herein.

As a still further embodiment, it is possible to connect two or more sub-pixels within a sensor to the readout channel for that sensor. For example, referring to sensor 11*d* in FIG. 10B, the oval spot falls on both sub-pixels 11*d*3 and 11*d*4. The output signals of these two sub-pixels may be summed and connected to the readout channel for sensor 11*d*. As a still further embodiment, the outputs of all the sub-pixels within a sensor can be connected to the readout channel for that sensor. Further, it is possible to connect only those sub-pixels receiving signals to the readout channel. In all cases, the connections between the individual sub-pixels and the readout channels can be fixed at manufacturing, or can be dynamically electrically aligned, such electronic alignment can be dynamically updated at modest frequency—say, once per second or minute—based on statistical processing of the returns. As a still further embodiment, it is possible to provide more than one readout channel per sensor, including up to one readout channel per sub-pixel. While these drawing have been shown with five target sub-pixels 31*a*-31*e* and five sensors 11*a*-11*e*, the limited number illustrated are to allow the inventions to be easily described herein. As shown by the above example, it is contemplated that the number of virtual pixels 31 and the number of sensors 11 can number in the 100s and even the thousands, (e.g., in one embodiment, a custom chip may be utilized that has 512 sensors, each being a linear mode APD that is 100 um tall (i.e., 100 um across the array direction) and 24 um wide (i.e., 24 um along the array direction), with 6 um gaps between adjacent sensors. FIG. 13B shows colorized LADAR image data of the scene shown in the photographic image of FIG. 13A. The LADAR image of FIG. 13B is obtained from a prototype constructed in accordance with this embodiment (note—to keep the objects in the LADAR image looking close to their natural proportions, the raw image is squeezed into 800(H)× 512(V), covering the field-of-view of 45 degrees×26 degrees). In the LADAR image of FIG. 13B, the ranges to each of the objects in the FOV are color coded according to the color spectrum (ROYGBIV), with various shades of red being close/closer, green being farther away, blue being even further distant, etc. A range color chart may be provided for each LADAR image, depending upon the images obtained, as shown for example on the bottom of FIG. 13B. The LADAR image is formed line-by-line, where the lines are vertical, with each line being formed while the laser spot reflected from the target traverses all of the 512 sensors of the array. While this is happening, the slow stage turns horizontally by a small angle, so the next vertical line captures a slightly different area of the target. The slow stage may make one full revolution, covering over 8000 vertical scans, and may thus produce an image of 8000(H)×512(V) =~4M pixels. Since the lines are vertical, the columns have to be horizontal, which is a somewhat unconventional definition, but is nonetheless used to keep the word "line" for the fast vertical scan direction, as the inverse may seem even more unconventional. Also note that the pixels of the 8000 (H)×512(V) image, covering a 360 degrees by 30 degrees FOV, will not be exactly square, with each covering a field of approximately 0.045×0.06 degrees.

It is noted that in one example, there may be one individual read-out channel per each sub-pixel, and the signal from each can be directly compared, which may yield the result that certain sub-pixels produce the highest correlated pulses (signals), and that certain sub-pixels produce nothing but noise, and so logically the results from the "good" (signal yielding) sub-pixels could be combined, and the rest of the sub-pixels can be ignored. Depending on the circumstances, a single sub-pixel range measurement may be corrupted and inaccurate, or even non-existent, but under good conditions each sub-pixel will be able to produce an independent, correct range measurement.

In another example, there may be only one read-out channel for all of the sub-pixels of the sensor (e.g., a 5 by 7 sub-pixel array totaling 35 sub-pixels, numbered from 1 to 35). Assuming that initially sub-pixel numbers 12, 13, 19 and 20 are connected to the read-out channel, and after 8000 scans it is determined that 7000 return pulses were collected, and 1000 pulses were missed; then for the next 8000 scans, horizontal sub-pixels numbers 11, 12, 18, and 19 are connected to the read-out channel, and only 500 pulses were missing; then for the next 8000 scans, sub-pixel numbers 10, 11, 17, and 18 are connected to the read-out channel and only 400 pulses were missing; then, for the next 8000 scans, sub-pixel numbers 9, 10, 16, and 17 are connected to the read-out channel, and 600 pulses were missing; a determination can therefore then be made that sub-pixel numbers 10, 11, 17, and 18 provides an optimal configuration for signal reception. A similar search could be done in vertical direction, and it may be repeated periodically, to compensate for possible changes in the system alignment. Although this may be slower, and less reliable than having one read-out channel per each sub-pixel, it likely would be much cheaper and less power-intensive too. It is also possible to have a combination—such as 4 read-out channels for the 35 sub-pixels, etc.

Figure 11A:
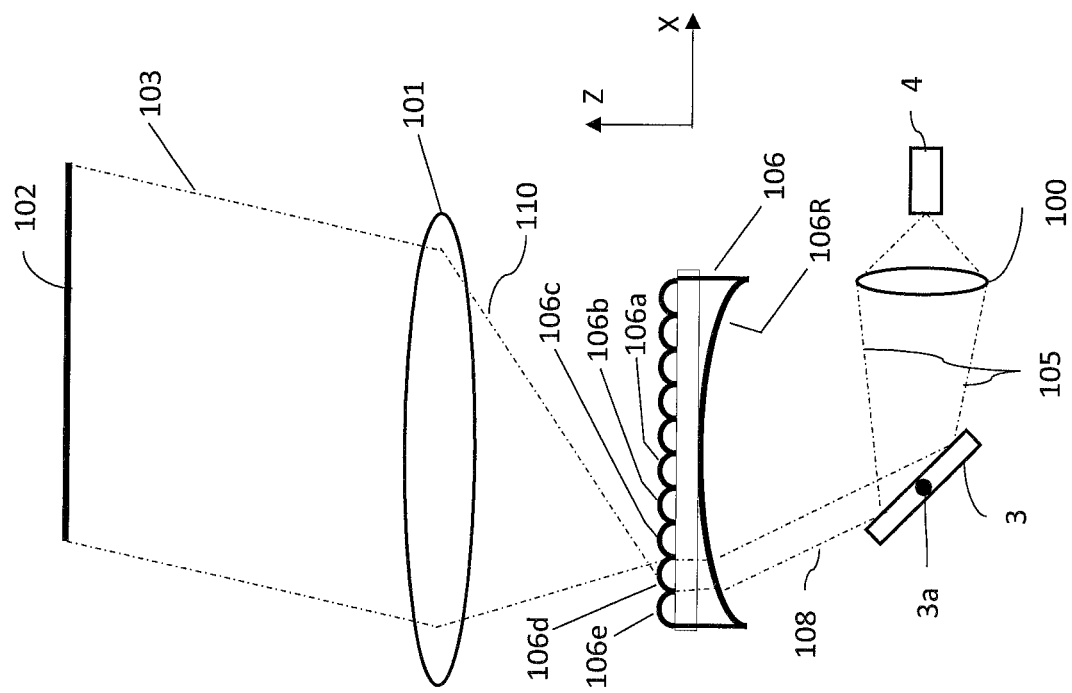
FIG. 11A and FIG. 11B illustrate a top view and a perspective view of a second embodiment of an improved optical scanning system directed to concentrating more captured light onto one or more of a plurality of pixels.

FIG. 11A is a top view of another embodiment, and which is a 2-dimensional view taken along the Y-axis. FIG. 11A illustrates a laser 4 emitting a beam, having a circular cross-section, through a focusing lens 100 towards a mirror 3 that oscillates about an axis 3A. The axis 3A is orthogonal to the scanning direction of the mirror 3. The lens 100 is configured to fit the beam 105 on the surface of the mirror 3. The beam 105 received by the mirror is reflected as beam 108 towards a micro optical element 106, the micro optical element is not a lens as conventionally known and understood (i.e., not a lens being a simple convex or concave piece of glass or other transparent substance). In one embodiment the micro optical element 106 is constructed as shown in FIG. 11A and has a linear array of individual focusing lenslets (refractive or diffractive), e.g., lenslets 106*a*, 106*b*, 106*c*, 106*d*, 106*e*, etc. If the micro optical element 106 is illuminated by a point source, it would create as many images of that point source as there are sub-elements (i.e., lenslets) to create multiple point source images. The array may be, for example, a 1×10 array of lenslets. (Note that in one embodiment the number of lenslets is equal to the number of sensors, and in another embodiment the number of lenslets is different than the number of sensors). Each individual lenslet 106*a*-106*e* is sequentially illuminated by beam 108, which is thereby shaped and transmitted as a plurality of beamlets (e.g., beamlet 110 from lenslet 106D) towards a common refractive lens 101 of relatively large diameter. As the laser beam is scanned across each lenslet (e.g., lenslets 106*a*, 106*b*, 106*c*, 106*d*, 106*e*) of the micro optical element 106, it creates corresponding points of light (i.e., points 102*a*, 102*b*, 102*c*, 102*d*, and 102*e*), and depending upon the dispersion of the light, if the scanned light falls across a pair of adjacent lenslets, it may be divided between those lenslets. Therefore, if the micro optical element 106 has 512 lenslets, then 512 spots will be created, which may be imaged by 512 sensors. The outputs from lens 101 are collimated sub-beams 103 creating a generally circular point 102. The micro optical element 106, in addition to having the plurality of lenslets on a front side thereof, also includes is a curved rear surface 106R, which refracts the scanned beam toward each of the lenslets.

Figure 11B:
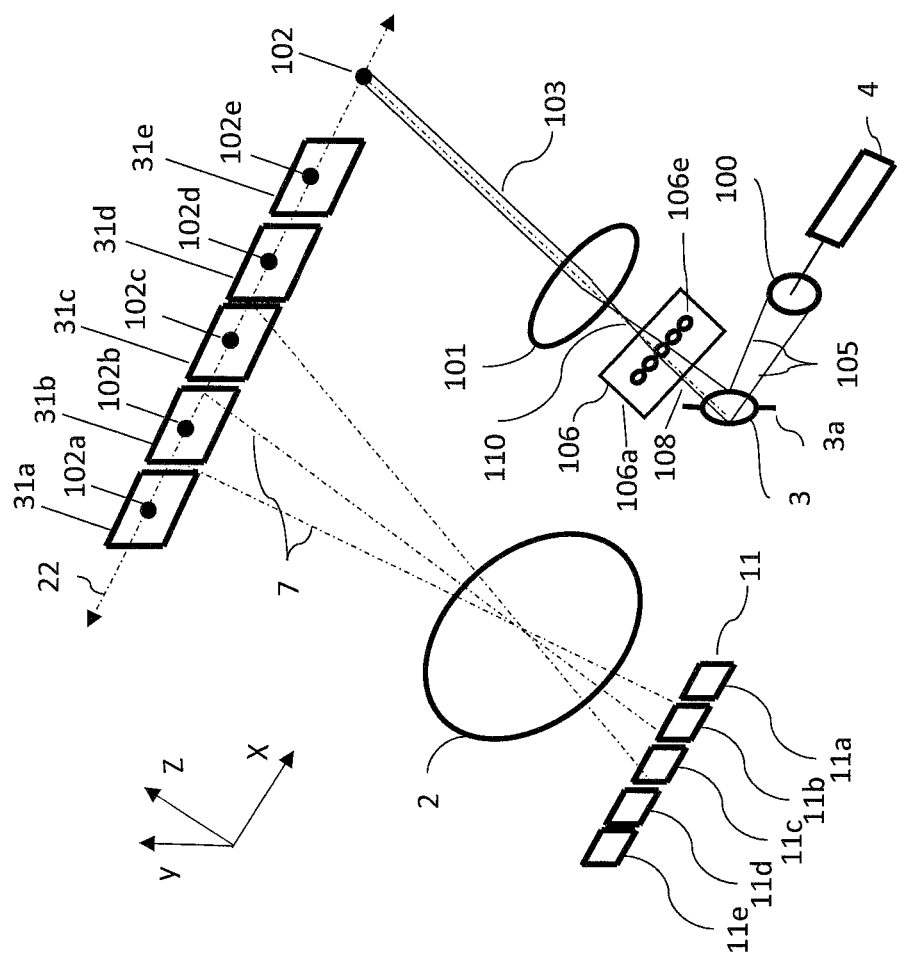

FIG. 11B is a 3-dimensional drawing containing the components of FIG. 11A and an optical detection system. (Note that the micro optical element 106 is represented symbolically in the perspective view of FIG. 11B). The light from a series of virtual pixels 31 (shown as individual virtual pixels 31a, 31b, 31c, 31d, and 31e) may be received by detection sensors 11 (shown as individual sensors 11a, 11b, 11c, 11d, and 11e) as a result of the scanned projection onto the target through the optical system 2. The sub beams 103 emanating from lens 101 form circular spots 102a, 102b, 102c, 102d, and 102e which sequentially illuminate a sub-portion of the virtual pixels 31a-31e and the circular spots 102a-102e from the target are received by detection sensors 11a-11e respectively. In this embodiment, when viewing the target area over time (longer than the time required for a single scan line 22), the optical detection system will scan a discrete set of circular points 102a-102e upon target areas represented by the virtual pixels 31a-31e. By way of example, the size of individual spot 102 received by the sensors 11a-11e size can be 5-10 um in diameter, and the spacing between the spots may be much larger that the diameter. In one embodiment, the size of the sub-pixels of each of sensors 11a-11e may be similarly sized, having sides being between 5-10 um to accommodate the entirety of the expected spot size, and in another embodiment, the sub-pixels may be square-shaped with each side being one micron in length, and in other embodiments other sub-pixel sizes may be used, with a lower limit on size today being comparable to the wavelength, e.g., about 1.5 um (seemingly being dictated by quantum mechanics and available technology, although theoretically it might be feasible to make even smaller sub-pixels). Ideally, only one sub-beam would be lit up at any time. However, it is within the scope of this invention to have, at any given moment, more than one sub-beam lit up, but in space they will be well-separated.

It is also noted that an upper limit on the number of the sub-pixels (i.e., a unit that would produce one data point per scan) is generally dictated by the optical resolution of the scanning mirror, and for practical mirror parameters would be on the order of hundreds of sub-pixels, with one embodiment herein utilizing 512 sub-pixels. Also, there is no upper limit on the pixel size. As a theoretical example, a large LIDAR may have, for example, 512 pixels, each 1 mm wide, i.e., a total length of the sensor array being about half of a meter. While such a LIDAR can be hugely sensitive, it would also be hugely expensive. The practical limits on the total size of the array, at least for use in an autonomous vehicle, is roughly on the order of 10-20 mm, making each sub-pixel reasonably limited to a few tens of um, along the direction of the array. In the perpendicular direction, sub-pixels might be somewhat bigger, but generally, there is no reason to make them very tall. Therefore, in one embodiment, a reasonable limit on the number of sub-pixels per sensor would be ~20 in the direction of the array, and ~50 in the perpendicular direction, i.e., a 20 by 50 grid totaling ~1000 sub-pixels.

Figure 12A:
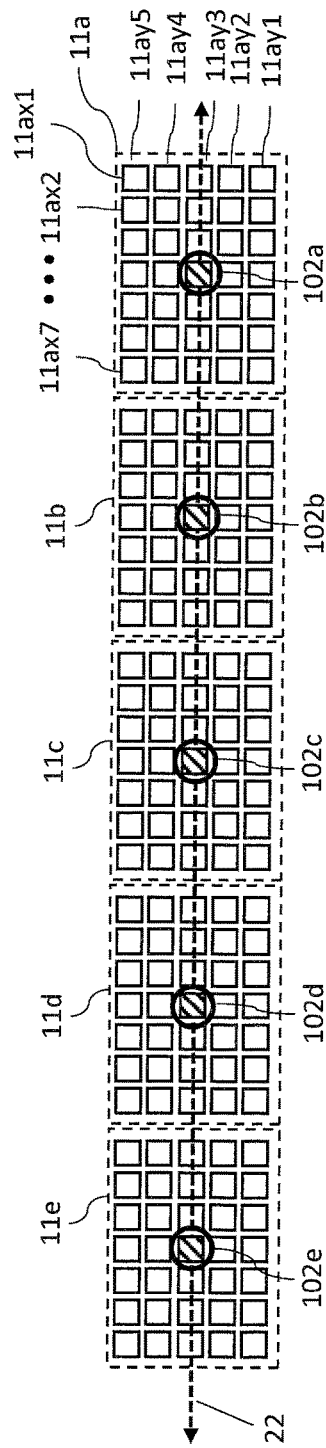
FIG. 12A is an enlarged detail view of one or the detection pixels shown in FIG. 11B, showing that each pixel may be composed of a grid of small sized sub-pixels, where each grid has five rows and seven columns of square-shaped sub-pixels, and in which the scan line is parallel to the sub-pixels.

FIG. 12A shows in greater detail the virtual pixels 11a-11e of FIG. 11B. In this embodiment, the first sensor 11a has five rows of square sub-pixels 11ay1, 11ay2, 11ay3, 11ay3, 11ay4, and 11y5 and seven columns of square sensors 11ax1 and 11ax2-11x7 for a total of 35 sensors. Note that another n by m grid of sub-pixels may also be used (e.g., n=7 and m=11 for a 7 by 11 grid of 77 sub-pixels). The sub-pixels in sensors 11b through 11e are identical to those in 11a and it is understood that they would follow the same labelling convention, however the labelling is not shown in the drawings. When the scanned line 22 is perfectly aligned in the center of the virtual pixels 31a-31e as seen in FIG. 11B, the reflected image of the spot 102 falls on positions 102a-102e that are horizontally and vertically centered in the sensors 11a-11e, and are received within the grid of sub-pixels in each of columns 11ax4, 11bx4, 11cx4, 11dx4 and 11ex4 and row 11ay3. In this case, it may be advantageous that only the signal received from individual sub-pixels upon which the spot 102a-102e is received would be connected to a channel readout for each sensor. It should be noted that the use of greater numbers of sub-pixels is advantageous, i.e., where each sub-pixel is smaller than (i.e., $\frac{1}{35}^{th}$ the size of) the sensor size, so that the sensitivity of each sensor will be significantly improved as compared to a sensor of the size of the entire pixel area. Further, it should be noted that unlike the previous embodiments described in the Applicant's issued U.S. Pat. No. 10,571,574, where the projected laser reflected onto the entire pixel, due to the optical arrangement which compressed all of the photons into the circular spot, each individual sub-pixel in the array of 35 sub-pixels per sensor of this embodiment receives approximately the same number of photons which previously were reflected onto the entire sensor. Accordingly, receiving the same number of photons on a much smaller area results in a more sensitive Lidar system. This would enable the Lidar to have a longer working range and/or operate with lower laser power.

Figure 12B:
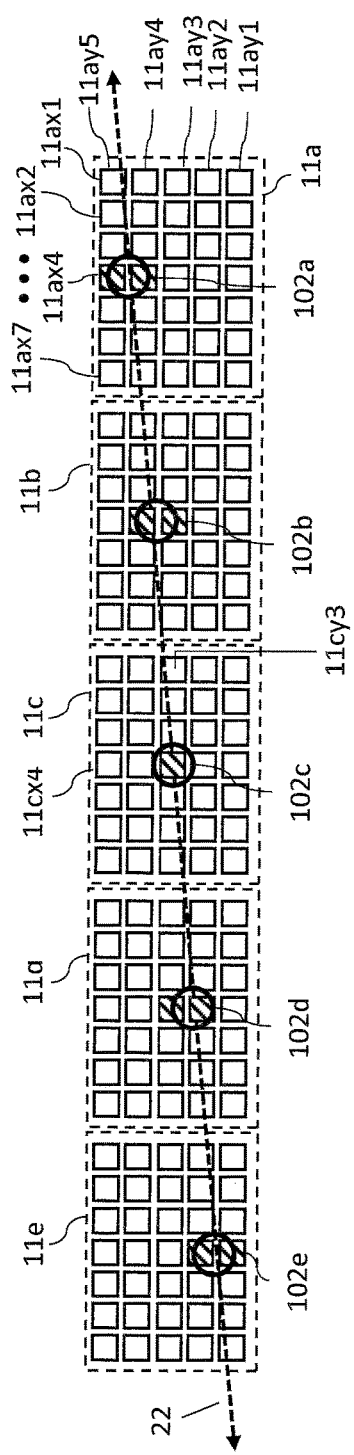
FIG. 12B shows the view of the detection pixels shown in FIG. 12A, in which the scan line is at an acute angle to the sub-pixels.

FIG. 12B illustrates an embodiment wherein scanning line 22 is aligned at an angle relative to the virtual pixels 31a-31e (from FIG. 11B) and therefore the reflection of the image spots 102a-102e fall upon sensors 11a-11e at an angle along scan line 22. In this embodiment, the first sensor 11a has five rows of square sub-pixels 11ay1-11y5 and seven columns of square sub-pixels 11ax1-11x7 for a total of 35 sub-pixels. The sub-pixels in sensors 11b through 11e are identical to those in sensor 11a and follow the same labelling convention, however the labelling is not shown in the drawings. The system can be configured to have one readout channel (timing circuitry for determining time-of-flight) per sensor, and only the individual sub-pixel which receives the maximum signal within each sensor is connected to the readout channel using, for example, an FET. For example, referring to sensor 11c, in this example, only one sub-pixel (at 11cx4, 11cy3) receives the reflected spot 102c, and therefore only sub-pixel 11c3 is connected via a FET to the readout channel associated with sensor 11c. Referring to sensor 11a, the circular spot 102a covers a portion of a first sub-pixel (i.e., the sub-pixel at 11ax4, 11ay5) and a portion of a second sub-pixel (i.e., the sub-pixel at 11ax4, 11ay4). Whichever of those two sub-pixels receives the larger signal may be connected via a FET to the readout channel associated with sensor 11d.

As a still further embodiment, it is possible to connect two or more sub-pixels within a sensor to the readout channel for that sensor. For example, referring to sensor 11a in FIG. 12B, the circular spot 102a falls on both the sub-pixels at 11ax4, 11ay5 and the sub-pixel at 11ax4, 11ay4. The output signals of these two sub-pixels can be summed and connected to the readout channel for pixel 11a. As a still further embodiment, the outputs of all the sub-pixels (e.g., all 35 sub-pixels) within a sensor can be connected to the readout channel for that sensor. In all cases, the connections between the individual sub-pixels and the readout channels can be fixed at manufacturing, or can be electrically aligned dynamically, and such electronic alignment can be dynamically updated at a modest frequency—for example, being once per second or minute—based on statistical processing of the returns. As a still further embodiment, it is possible to provide more than one readout channel per sensor, including up to one readout channel per sub-pixel.

Figure 12C:
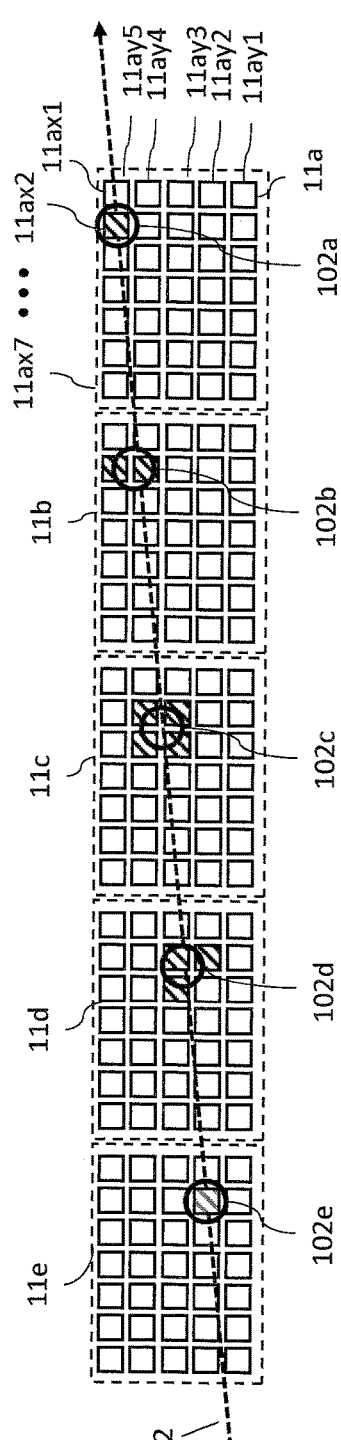
FIG. 12C shows the view of the detection pixels shown FIG. 12B, with the scan line being at an acute angle to the virtual sensors, but where the image spots do not fall within the horizontal center of the sub-pixels.

FIG. 12C illustrates an embodiment wherein scanning line 22 is aligned at an angle relative to the virtual pixels 31a-31e (from FIG. 11B), and wherein the image spots do not fall within the horizontal center of the virtual pixels 31a-31e. The reflection of the image spots 102a-102e fall upon sensors 11a-11e at an angle along scan line 22. In this embodiment, the first sensor 11a also has five rows of square sub-pixels 11ay1-11y5 and seven columns of square sub-pixels 11ax1-11x7 for a total of 35 sub-pixels. Sub-pixels in sensors 11b through 11e are identical to those in 11a and follow the same labelling convention, however the labelling is not shown in the drawings. The system can be configured to have one readout channel (timing circuitry for determining time-of-flight) per sensor, and only the individual sub-pixel which receives the maximum signal within each sensor is connected by, for example, an FET, to the readout channel. For example, referring to sensor 11a, in this example, only sub-pixel (11ax2, 11ay5) receives the reflected spot 102a, and therefore only that sub-pixel is connected via a FET to the readout channel associated with sensor 11a. Referring to sensor 11c, the circular spot 102c covers four sub-pixels: (11ex2, 11cy4), (11cx3, 11cy4), (11cx2, 11cy3), (11cx3, 11cy3). Whichever sub-pixel receives the larger signal may be connected via a FET to the readout channel associated with sensor 11d.

As a still further embodiment, it is possible to connect two or more sub-pixels within a sensor to the readout channel for that sensor. For example, referring to sensor 11c in FIG. 12B, the circular spot 102c falls on four sub-pixels: (11ex2, 11cy4), (11cx3, 11cy4), (11cx2, 11cy3), (11cx3, 11cy3). The output signals of these four sub-pixels can be summed and connected to the readout channel for sensor 11a. As a still further embodiment, the outputs of all the sub-pixels within a sensor can be connected to the readout channel for that sensor. In all cases, the connections between the individual sub-pixels and the readout channels can be fixed at manufacturing, or can be electrically aligned dynamically, such electronic alignment can be dynamically updated at a modest frequency—for example, once per second or minute—based on statistical processing of the returns. As a still further embodiment, it is possible to provide more than one readout channel per sensor, including up to one readout channel per sub-pixel. While the embodiments and drawings show a limed number of sensors and sub-pixels, it is contemplated that the number of sensors and sub-pixels can be substantially increased, and that the size and geometry of the sub-pixels and sensors can be changed. Further, the embodiments of the present illustrate circular or oval beam shapes, it is understood that alternative beam shapes can be utilized.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A laser radar (LIDAR) system for an autonomous vehicle, said LIDAR system comprising:
   a laser configured to emit a beam of light at a wavelength;
   an optical transmission system configured to shape the beam of light emitted by said laser, and to scan said beam along a plurality of transmission light paths toward a target;
   an optical reception system configured to collect said laser light reflected from the target along a plurality of reception light paths;
   an electronic control system configured to synchronize said scan of said beam with a respective time-of-arrival measurement;
   wherein said optical reception system comprises: a one-dimensional sensor array, each said sensor of said one-dimensional sensor array being sensitive to said wavelength of light emitted by said laser, and configured to detect and image said laser light reflected from the target;
   wherein each said sensor of said one-dimensional sensor array comprises:
      an n by m grid of sub-pixels, each said sub-pixel configured to receive said laser light reflected from the target; and
      one readout channel per sensor, each said readout channel comprising: timing circuitry configured to determine the time-of-flight of said beam from said emission from said laser to said reception of said laser light reflected from the target;
   a field effect transistor (FET);
   wherein only one of said sub-pixels within each said sensor is connected to said readout channel through said FET at a time, being any one of said grid of sub-pixels determined by said FET to receive a maximum signal; and
   wherein said electronic control system is configured to perform a time-of-arrival measurement and determine a range of the target.

2. The optical scanning system according to claim 1, wherein said one-dimensional sensor array comprises an array of avalanche photodiodes.

3. The optical scanning system according to claim 2, wherein said laser is from the group of lasers consisting of: a master oscillator power amplifier (MOPA) laser; and a continuous wave (CW) fiber laser.

4. The optical scanning system according to claim 3, wherein said one-dimensional sensor array comprises a linear array of at least one hundred sensors.

5. The optical scanning system according to claim 2,
   wherein said one-dimensional sensor array comprises a linear array of 512 sensors;
   wherein said optical transmission system comprises: a mirror said mirror configured to oscillate at about 80 KHz; and
   wherein said LIDAR is configured to provide a 200-meter detection range utilizing approximately 10 watts of power for said laser.

6. An optical scanning system configured to obtain a range to a target based on a time-of-flight measurement, said system comprising:
   a laser, said laser configured to emit a substantially cylindrical beam of light along a first optical path;

a first lens, said first lens being a cylindrical lens positioned in said optical and configured to expand said cylindrical beam in a first orthogonal direction to said optical path and to have no effect on said beam in a second orthogonal direction to said optical path, to produce an expanding beam comprising an oval-shaped cross-section;

a mirror, said mirror configured to oscillate about an axis; said mirror positioned to scan said expanding beam of light along a plurality of optical paths toward a target surface;

a second lens; said second lens positioned in said plurality of optical paths, and configured to collimate said scanned expanding beam to produce a collimated oval beam being scanned across the target to create a series of oval spots on the target;

a plurality of detection sensors;

a third lens, said third lens positioned between the target and said plurality of detection sensors;

a grid of sub-pixels for each said sensor, each said sub-pixel configured to receive at least a portion of one or more of said oval spots of light reflected from the target.

7. The optical scanning system according to claim 6, wherein said second lens is a cylindrical lens.

8. The optical scanning system according to claim 7, wherein each said sub-pixel is square-shaped.

9. The optical scanning system according to claim 8, wherein each said sub-pixel has sides in a range being between five um and ten um.

10. The optical scanning system according to claim 9, wherein each said sub-pixel has sides in a range being between one um and five um.

11. An optical scanning system configured to obtain a range to a target based on a time-of-flight measurement, said system comprising:

a laser, said laser configured to emit a substantially cylindrical beam of light along a first optical path;

a first lens, said first lens positioned in said optical and configured to focus said beam;

a mirror, said mirror configured to oscillate about an axis; said mirror positioned to scan said focused beam of light along a plurality of optical paths toward a target surface;

a second lens and a third lens; wherein said second lens positioned in said plurality of optical paths; said second lens comprising a front surface with a plurality of lenslets, each of said plurality of lenslets positioned in line and sequentially illuminated by said focused beam in said plurality of optical paths; said plurality of lenslets configured to individually focus said light of said plurality of optical paths; said second lens configured to collimate said focused light to create a series of spots on the target;

a plurality of detection sensors;

a third lens, said third lens positioned between the target and said plurality of detection sensors;

a grid of sub-pixels for each said sensor, each said sub-pixel configured to receive at least a portion of one or more of said oval spots of light reflected from the target.

12. The optical scanning system according to claim 11, wherein said second lens comprises a concave rear surface.

13. The optical scanning system according to claim 11, wherein said first lens is configured to fit said beam of light onto said mirror.

* * * * *